US011113084B2

(12) United States Patent
Kliuchnikov et al.

(10) Patent No.: US 11,113,084 B2
(45) Date of Patent: Sep. 7, 2021

(54) METHOD AND SYSTEM FOR APPROXIMATE QUANTUM CIRCUIT SYNTHESIS USING QUATERNION ALGEBRA

(71) Applicant: Microsoft Technology Licensing, LLC, Redmond, WA (US)

(72) Inventors: Vadym Kliuchnikov, Redmond, WA (US); Jon Yard, Seattle, WA (US); Martin Roetteler, Woodinville, WA (US); Alexei Bocharov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 832 days.

(21) Appl. No.: 15/761,836

(22) PCT Filed: Sep. 26, 2016

(86) PCT No.: PCT/US2016/053808
§ 371 (c)(1),
(2) Date: Mar. 21, 2018

(87) PCT Pub. No.: WO2017/053986
PCT Pub. Date: Mar. 30, 2017

(65) Prior Publication Data
US 2018/0276014 A1    Sep. 27, 2018

Related U.S. Application Data

(63) Continuation-in-part of application No. PCT/US2016/025958, filed on Apr. 5, 2016.
(Continued)

(51) Int. Cl.
*G06F 9/44* (2018.01)
*G06F 9/455* (2018.01)
*G06N 10/00* (2019.01)

(52) U.S. Cl.
CPC ......... *G06F 9/45508* (2013.01); *G06N 10/00* (2019.01)

(58) Field of Classification Search
CPC .................................................... G06F 9/44
See application file for complete search history.

(56) References Cited

U.S. PATENT DOCUMENTS

| 6,472,681 | B1 | 10/2002 | Kane |
| 7,028,275 | B1 | 4/2006 | Chen et al. |

(Continued)

FOREIGN PATENT DOCUMENTS

| CN | 1773450 | 5/2006 |
| WO | WO 2014/015200 | 1/2014 |

(Continued)

OTHER PUBLICATIONS

Blass et al., "Optimal Ancilla-free Pauli+V Circuits for Axial Rotations," downloaded from https://arxiv.org/abs/1412.1033, 27 pp. (Dec. 2014).

(Continued)

*Primary Examiner* — Jae U Jeon
(74) *Attorney, Agent, or Firm* — Klarquist Sparkman, LLP

(57) ABSTRACT

This application concerns methods, apparatus, and systems for performing quantum circuit synthesis and/or for implementing the synthesis results in a quantum computer system. In certain example embodiments: a universal gate set, a target unitary described by a target angle, and target precision is received (input); a corresponding quaternion approximation of the target unitary is determined; and a quantum circuit corresponding to the quaternion approximation is synthesized, the quantum circuit being over a single qubit (Continued)

gate set, the single qubit gate set being realizable by the given universal gate set for the target quantum computer architecture.

13 Claims, 23 Drawing Sheets

Related U.S. Application Data

(60) Provisional application No. 62/233,293, filed on Sep. 25, 2015, provisional application No. 62/146,182, filed on Apr. 10, 2015.

(56) References Cited

U.S. PATENT DOCUMENTS

| | | | |
|---|---|---|---|
| 7,364,923 | B2 | 4/2008 | Lidar et al. |
| 7,398,507 | B2 | 7/2008 | Chang et al. |
| 8,190,553 | B2 | 5/2012 | Routt |
| 8,527,437 | B1 | 9/2013 | Tucci |
| 8,671,369 | B2 | 3/2014 | Ahn |
| 8,744,075 | B2 | 6/2014 | Tanaka |
| 2006/0123363 | A1 | 6/2006 | Williams et al. |
| 2006/0175606 | A1 | 8/2006 | Wang et al. |
| 2007/0162262 | A1 | 7/2007 | Tucci |
| 2009/0164435 | A1 | 6/2009 | Routt |
| 2010/0091890 | A1 | 4/2010 | Al-dhahir et al. |
| 2012/0157008 | A1 | 6/2012 | Prihed et al. |
| 2013/0046806 | A1 | 2/2013 | Hashimoto |
| 2013/0051176 | A1 | 2/2013 | Tustin et al. |
| 2014/0264288 | A1 | 9/2014 | Svore et al. |
| 2014/0280427 | A1* | 9/2014 | Bocharov ............. B82Y 10/00 708/523 |
| 2015/0057742 | A1 | 2/2015 | Steckel et al. |
| 2015/0106418 | A1 | 4/2015 | Kliuchnikov et al. |
| 2016/0284347 | A1 | 9/2016 | Sainath et al. |
| 2016/0327396 | A1* | 11/2016 | Hallberg ............. G01C 21/165 |
| 2017/0032512 | A1* | 2/2017 | Sun ..................... G06K 9/4614 |

FOREIGN PATENT DOCUMENTS

| | | |
|---|---|---|
| WO | WO 2014/015203 | 1/2014 |
| WO | WO 2014/151571 | 9/2014 |
| WO | WO 2015/057742 | 4/2015 |

OTHER PUBLICATIONS

Bocharov et al., "Efficient Decomposition of Single-Qubit Gates into V Basis Circuits," *Phys. Rev. A* 88, 13 pp. (Mar. 2013).
Bocharov et al., "Efficient Synthesis of Universal Repeat-Until-Success Quantum Circuits," *Physical Review Letters*, 15 pp. (Feb. 2015).
International Preliminary Report on Patentability dated Jan. 15, 2018, from International Patent Application No. PCT/US2016/053808, 13 pp.
International Search Report dated Jan. 23, 2017, from International Patent Application No. PCT/US2016/053808, 12 pp.
Kliuchnikov et al., "A Framework for Approximating Qubit Unitaries," downloaded from https://arxiv.org/abs/1510.03888, 60 pp. (Oct. 2015).
Kliuchnikov et al., "A Framework for Exact Synthesis," downloaded from https://arxiv.org/abs/1504.04350, 40 pp. (Apr. 2015).
Lye et al., "Determining the Minimal Number of SWAP Gates for Multi-dimensional Nearest Neighbor Quantum Circuits," *Design Automation Conf.*, 6 pp. (Jan. 2015).
Paler et al., "Synthesis of Topological Quantum Circuits," *IEEE/ACM Int'l Symp. on Nanoscale Architectures*, 7 pp. (Jul. 2012).
Perkowski et al., "Synthesis of quantum circuits in Linear Nearest Neighbor model using Positive Davio Lattices," *Elec. Energ.*, vol. 24, No. 1, pp. 71-87 (Apr. 2011).

Ross, "Algebraic and Logical Methods in Quantum Computation," Ph.D. Thesis, Dalhousie University, 160 pp. (Aug. 2015).
Welch et al., "Efficient Approximation of Diagonal Unitaries over the Clifford+T Basis," downloaded from https://arxiv.org/abs/1412.5608v1, 16 pp. (Dec. 2014).
Written Opinion of the International Preliminary Examining Authority dated Sep. 1, 2017, from International Patent Application No. PCT/US2016/053808, 8 pp.
Zhang et al., "Optimal quantum circuit synthesis from controlled-unitary gates," *Physical Review A*, vol. 69, 6 pp. (2004).
Alaca et al., *Introductory Algebraic Number Theory*, Cambridge University Press, pp. 1-13 (2004).
Anderson et al., "Classification of transversal gates in qubit stabilizer codes," *Quantum Information & Computation*, vol. 16, 23 pp. (Sep. 2014).
Bocharov et al., "Efficient Synthesis of Probabilistic Quantum Circuits with Fallback," *Physical Review A*, vol. 91, No. 5, 17 pp. (May 2015).
Bourgain et al., "On the spectral gap for finitely-generated subgroups of SU(2)*," *Invent. Math.*, Vo. 171, pp. 83-121 (Sep. 2007).
Bourgain et al., "Spectral gaps in SU(d)," *C.R. Acad. Sci. Paris, Ser. I*, pp. 609-611 (May 2010).
Bugeaud, "Approximation by Algebraic Numbers," listing of book on Google books, 1 p. (2004).
Cafaro et al., "A Geometric Algebra Perspective on Quantum Computational Gates and Universality in Quantum Computing," *Advances in Applied Clifford Algebras*, vol. 21, No. 3, 18 pp. (Sep. 2011).
Camejo et al., "Room temperature high-fidelity holonomic single-qubit gate on a solid-state spin," *Nature Communications*, 5 pp. (Sep. 2014).
Cerri et al., "Euclidean Totally Definite Quatemion Fields Over the Rational Field and Over Quadratic Number Fields," *Int'l Journal of Number Theory*, vol. 9, No. 3, pp. 653-673 (May 2013).
Cohen, "A Course in Computational Algebraic Number Theory," Springer Science & Business Media, 563 pp. (1993).
Cohen, "Advanced Topics in Computational Number Theory," Springer-Verlag, 591 pp. (2000).
Conway et al., "Relations in SO(3) Supported by Geodetic Angles," *Discrete & Computational Geometry*, vol. 23, No. 4, pp. 453-463 (Jan. 2000).
Coulangeon et al., "Computing in arithmetic groups with Voronoi's algorithm," *Algebra*, vol. 435, 22 pp. (Aug. 2015).
Dawson et al., "The Solovay-Kitaev Algorithm," *Quantum Information and Computation*, vol. 6, No. 1, 15 pp. (Aug. 2005).
Duclos-Cianci et al., "Reducing the quantum computing overhead with complex gate distillation," *Physical Review A*, vol. 91, No. 4, 9 pp. (Apr. 2015).
Final Office Action dated Jan. 31, 2020, from U.S. Appl. No. 15/565,413, 8 pp.
Forest et al., "Exact Synthesis of Single-Qubit Unitaries Over Clifford-Cyclotomic Gate Sets," *Mathematical Physics*, vol. 56, No. 8, 29 pp. (Aug. 2015).
Giles et al., "Exact synthesis of multiqubit Clifford+T circuits," *Physical Review*, vol. 87, No. 3, 7 pp. (Mar. 2013).
Giles et al., "Remarks on Matsumoto and Amano's normal form for single-qubit Clifford+T operators," arXiv:1312.6584v1, 13 pp. (Dec. 2013).
Gosset et al., "An Algorithm for the T-Count," *Quantum Information and Computations*, vol. 14, No. 15-16, pp. 1261-1276 (Nov. 2014).
Gottesman et al., "Demonstrating the viability of universal quantum computation using teleportation and single-qubit operations," *Letters to Nature*, vol. 402, pp. 390-393 (Nov. 1999).
Harrow et al., "Efficient Discrete Approximations of Quantum Gates," *Mathematical Physics*, vol. 43, No. 9, 7 pp. (Jul. 2002).
Hull, "On the Units of Indefinite Quaternion Algebras," *American Journal of Mathematics*, vol. 61, No. 2, pp. 365-374 (Apr. 1939).
International Preliminary Report on Patentability dated Jul. 17, 2017, from International Patent Application No. PCT/US2016/025958, 8 pp.
International Search Report and Written Opinion dated Jul. 11, 2016, from International Patent Application No. PCT/US2016/025958, 12 pp.

(56) References Cited

OTHER PUBLICATIONS

"Jacobians over Number Fields or Q," Magma Computer Algebra, downloaded from http://magma.maths.usyd.edu.au/magma/handbook/text/1531, 16 pp. (downloaded on Dec. 13, 2019).

Khosropour et al., "Quantum Division Circuit Based on Restoring Division Algorithm," *Int'l Conf on Information Technology: New Generations*, pp. 1037-1040 (Apr. 2011).

Kirschmer et al., "Algorithmic Enumeration of Ideal Classes for Quaternion Orders," *SIAM Journal on Computing*, vol. 39, No. 5, 39 pp. (Jan. 2010).

Kleinert, "Units in Skew Fields," 89 pp. (2000).

Kliuchnikov et al., "Asymptotically optimal approximation of single qubit unitaries by Clifford and T circuits using a constant number of ancillary qubits," *Physical Review Letters*, vol. 110, No. 19, 5 pp. (Dec. 2012).

Kliuchnikov et al., "Asymptotically Optimal Topological Quantum Compiling," *Physical Review Letters*, vol. 112, No. 14, 24 pp. (Oct. 2013).

Kliuchnikov et al., "Fast and efficient exact synthesis of single qubit unitaries generated by Clifford and T gates," *Quantum Information & Computation*, vol. 13, Nos. 7-8, 23 pp. (Mar. 2013).

Kliuchnikov, "New methods for Quantum Compiling," Ph.D. Thesis, University of Waterloo, 144 pp. (Apr. 2014).

Kliuchnikov et al., "Practical approximation of single-qubit unitaries by single-qubit quantum Clifford and T circuits," *IEEE Trans. on Computers*, vol. 65, No. 1, 11 pp. (Dec. 2015).

Kliuchnikov, "Synthesis of unitaries with Clifford+T circuits," arXiv:1306.3200v1, 4 pp. (Jun. 2013).

Knus et al., "The Book of Involutions," *American Mathematical Society*, vol. 44, 588 pp. (1998).

Kohel, "Hecke Module Structure of Quaternions," *Class Field Theory—Its Centenary and Prospect*, pp. 177-195 (2001).

Landahl et al., "Complex instruction set computing architecture for performing accurate quantum Z rotations with less magic," arXiv:1302.3240v2, 13 pp. (Feb. 2013).

Lemmermeyer, "Conics—a Poor Man's Elliptic Curves," arXiv:math/0311306v1, 11 pp. (Nov. 2003).

Li et al., "A Quantum CAD Accelerator Based on Grover's Algorithm for Finding the Minimum Fixed Polarity Reed-Muller Form," *Int'l Symp. on Multiple-Valued Logic*, 6 pp. (May 2006).

Lubotzky et al., "Hecke Operators and Distributing Points on $S^2$.II," *Comm. on Pure and Applied Mathematics*, vol. 40, No. 4, 20 pp. (Jul. 1987).

Lubotzky et al., "Hecke Operators and Distributing Points on the Sphere I," *Comm. on Pure and Applied Mathematics*, vol. 39, No. 1, 38 pp. (1986).

Matzke, "Quantum Computation Using Geometric Algebra," Ph.D. Dissertation, University of Texas at Dallas, 206 pp. (May 2002).

Natapov, "Projective bases of division algebras and groups of central type II," *Mathematics*, vol. 164, No. 1, 12 pp. (Mar. 2008).

Neukirch, "Algebraic Number Theory," Springer, 581 pp. (1999).

Nguyen et al., "The LLL Algorithm—Survey and Applications," Springer, 504 pp. (2010).

Office Action dated Sep. 24, 2019, from U.S. Appl. No. 15/565,413, 14 pp.

Paetznick et al., "Repeat-Until-Success: Non-deterministic decomposition of single-qubit unitaries," *Quantum Information & Computation*, vol. 14, 26 pp. (Oct. 2014).

"PARI/GP home," downloaded from http://pari.math.u-bordeaux.fr/, 1 p. (2003).

U.S. Appl. No. 61/977,570, filed Apr. 9, 2014, 30 pp.
U.S. Appl. No. 62/009,066, filed Jun. 6, 2014, 22 pp.
U.S. Appl. No. 62/049,238, filed Sep. 11, 2014, 40 pp.

Radin et al., "On 2-Generator Subgroups of SO(3)," *Trans. of the American Mathematical Society*, vol. 351, No. 11, pp. 4469-4480 (Jun. 1999).

Radin et al., "Subgroups of SO(3) Associated with Tilings," *Journal of Algebra*, vol. 202, No. 2, pp. 611-633 (1998).

Ross et al., "Optimal ancilla-free Clifford+T approximation of z-rotations," *Quantum Information and Computation*, vol. 16, 40 pp. (Jun. 2016).

Ruican et al., "Genetic Algorithm Based Quantum Circuit Synthesis with Adaptive Parameters Control," *IEEE Congress on Evolutionary Computation*, pp. 896-903 (May 2009).

Russell, "The Exact Synthesis of 1- and 2-Qubit Clifford+T Circuits," Honours Thesis, 21 pp. (May 2014).

Second Written Opinion dated Jan. 2, 2017, from International Patent Application No. PCT/US2016/025958, 7 pp.

Selinger, "Efficient Clifford+T approximation of single-qubit operators," arXiv:1212.6253v2, 17 pp. (Jul. 2014).

Serre, "Le groupe quaquaversal, vu comme groupe S-arithmetique," Olberwolfach Report, vol. 6, No. 2, pp. 1421-1422 (2009).

Shastri, "Integral Points on the Unit Circle," *Journal of Number Theory*, vol. 91, pp. 67-70 (Nov. 2001).

Shimura, "On Dirichlet Series and Abelian Varieties Attached to Automorphic Forms," *Annals of Mathematics*, vol. 72, No. 2, pp. 237-294 (Sep. 1962).

Shor, "Polynomial-Time Algorithms for Prime Factorization and Discrete Logarithms on a Quantum Computer," *SIAM Review*, vol. 41, No. 2, pp. 303-332 (1999).

Voight, "Computing fundamental domains for Fuchsian groups," *Journal de Theorie des Nombres de Bordeaux*, vol. 21, No. 2, 23 pp. (Jan. 2009).

Washington, "Introduction to Cyclotomic Fields," Graduate Texts in Mathematics, 504 pp., (1997).

Wikipedia, "Algebraic number field," downloaded from https://en.wikipedia.org/wiki/Algebraic_number_field, 13 pp. (document marked Sep. 2019).

Wikipedia, "Associative Algebra," downloaded from https://en.wikipedia.org/wiki/Associative_algebra, 7 pp. (document marked Oct. 2019).

Wikipedia, "Encyclopedia of Mathematics," Main Page, downloaded from https://www.encyclopediaofmath.org/index.php/Main_Page, 2 pp. (downloaded on Dec. 13, 2019).

Wikipedia, "Field extension," downloaded from https://en.wikipedia.org/wiki/Field_extension, 6 pp. (document marked Nov. 2019).

Wikipedia, "Module (mathematics)," downloaded from https://en.wikipedia.org/wiki/Module_(mathematics), 10 pp. (document marked Dec. 2019).

Wikipedia, "Ring (mathematics)," downloaded from https://en.wikipedia.org/wiki/Ring_(mathematics), 28 pp. (document marked Dec. 2019).

Wikipedia, "Semisimple algebra," downloaded from https://en.wikipedia.org/wiki/Semisimple_algebra, 10 pp. (document marked Sep. 2019).

Wikipedia, "Simple algebra," downloaded from https://en.wikipedia.org/wiki/Simple_algebra, 2 pp. (document marked Aug. 2019).

\* cited by examiner

Fixed input: $F, \sigma, a, b, S = \{\mathfrak{p}_1, \ldots, \mathfrak{p}_M\}, P$ $F$ is a totally real number field of degree $d$, $a, b$ are totally negative elements of $\mathbb{Z}_F$ $\mathfrak{p}_1, \ldots, \mathfrak{p}_M$ are prime ideals of $\mathbb{Z}_F$, $P$ is a natural number

Input: $L_1, \ldots, L_M, \varphi, \varepsilon$ $L_1, \ldots, L_M$ are natural numbers, $\varphi$ is a real number that defines $R_z(\varphi)$ to be approximated, real number $\varepsilon$ is the required approximation quality 1: procedure APPROXIMATE

Offline:

2:     $C_{\min}, C_{\max} \leftarrow$ RANDOM-INTEGER-POINT($\mathbb{Z}_K$)     ▷ See Fig. 2

3:     IS-EASILY-SOLVABLE($F, \mathbb{Z}_F, P$)     ▷ See Fig. 4

4:     return $C_{\min}, C_{\max}$

Specification: $C_{\min}, C_{\max}$ are real numbers; contstants defining the quality of the approximation

Online:

5:     assert $L_1 \log N(\mathfrak{p}_1) + \ldots + L_M \log N(\mathfrak{p}_M) - 4 \log(1/\varepsilon) \in [C_{\min}, C_{\max}]$ 6:     NORM-EXISTS, $r \leftarrow$ SUITABLE-Q-NORM($L_1, \ldots, L_M, \varepsilon$)     ▷ See Fig. 3

7:     Solution-found $\leftarrow$ FALSE

8:     while not Solution-found do

9:         $z_1 \leftarrow$ RANDOM-INTEGER-POINT($\varphi, \varepsilon, r$)     ▷ See Fig. 2

10:        $e \leftarrow (r - z_1 z_1^*)/(-b)$

11:        if $e \in \mathbb{Z}_F$ and IS-EASILY-SOLVABLE($e$) then     ▷ See Fig. 4

12:            Solution-found, $z_2 \leftarrow$ FAST-SOLVE-NORM-EQ($e$)     ▷ See Fig. 5

13:        end if

14:     end while

15:     return $q = e_1^{-1}(z_1) + e_2^{-1}(z_2)$     ▷ $\mathrm{nrd}(q) = r$ 16: end procedure

Output: Quaternion $q$ from generalized Lipshitz order, such that $$\rho(U_q, R_z(\varphi)) \leq \varepsilon, \; \mathrm{nrd}(q)\mathbb{Z}_F = \mathfrak{p}_1^{L_1} \cdot \ldots \cdot \mathfrak{p}_M^{L_M}$$

FIG. 1 Description of example approximation algorithm

Fixed input: $\mathbb{Z}_K$ – ring of integers of a CM field of degree $2d$
Input: $\varphi, \varepsilon, r$ 1: procedure RANDOM-INTEGER-POINT
Offline:
2:     $z_1, \ldots, z_{2d}$ is a fixed integral basis of $\mathbb{Z}_F$
3:     $B = [\boldsymbol{\sigma}(z_1), \ldots, \boldsymbol{\sigma}(z_{2d})]$ is a basis of the lattice associated to $\mathbb{Z}_K$,
4:     $R_k^{\min} = \frac{1}{2}\sqrt{\max_j \operatorname{Re}(\sigma_{k,+}(z_j))^2 + \max_j \operatorname{Im}(\sigma_{k,+}(z_j))^2}$ for $k = 1, \ldots, d$
5:     $C_{\min}, C_{\max}, R^{\max} \leftarrow$ SUITABLE-Q-NORM$(\mathfrak{p}_1, \ldots, \mathfrak{p}_M, R^{\min})$         ▷ See Fig. 3
6:     SHIFTS $\leftarrow \left\{ z \in \mathbb{Z}_K : \|P_1\boldsymbol{\sigma}(z)\| \leq 2\sqrt{5}R_1^{\max}, \|P_k\boldsymbol{\sigma}(z)\| \leq R_k^{\max} + R_k^{\min}, k = 2, \ldots, d \right.$
7:                                    ▷ $P_k : \mathbb{R}^{2d} \to \mathbb{R}^2$ is a projector to coordinates $2k-1$ and $2k$
8:     $p_0 \leftarrow 1/(8|\text{SHIFTS}|), M \leftarrow |\text{SHIFTS}|$     ▷ $p_0$ indicates how close the distribution
9:                                       ▷ of the procedure output to the uniform over set $\text{Cand}_{r,\varphi,\varepsilon}$
10:     return $C_{\min}, C_{\max}$
Specification: $C_{\min}, C_{\max}$ – real numbers
Online:
11:     $R \leftarrow \sqrt{\sigma_1(r)}, H \leftarrow 2R\varepsilon\sqrt{4 - 4\varepsilon^2}, N_{\max} = \lceil H/\varepsilon^2 R \rfloor$     ▷ See Fig.15
12:     $z_c \leftarrow R(1 - 3\varepsilon^2/4)e^{-i\varphi/2}, \Delta z \leftarrow ie^{-i\varphi/2}\varepsilon^2 R/2$     ▷ See Fig.15
13:     $\Delta Z \leftarrow (\operatorname{Re}\Delta z, \operatorname{Im}\Delta z, 0, \ldots, 0) \in \mathbb{R}^{2d}, Z_c \leftarrow (\operatorname{Re} z_c, \operatorname{Im} z_c, 0, \ldots, 0) \in \mathbb{R}^{2d}$
14:     Sample-found $\leftarrow$ FALSE, $z \leftarrow 0$
15:     while not Sample-found do
16:         $N \leftarrow$ random integer from the interval $[-N_{\max}, N_{\max}]$
17:         $t \leftarrow Z_c + N\Delta Z$
18:         $m \leftarrow \lceil B^{-1}t \rfloor$     ▷ Find $m$ such that $Bm \in t + \mathcal{C}(B)$
19:         Pick $z'$ uniformly at random from set SHIFTS
20:         $z \leftarrow z' + m_1 z_1 + \ldots + m_{2d} z_{2d}$
21:         Sample-found $\leftarrow \boldsymbol{\sigma}(z) \in S_{r,\varphi,\varepsilon} \cap \left\{ x \in \mathbb{R}^{2d} : \langle x - t, \Delta Z \rangle \in (-1/2, 1/2] \right\}$
22:     end while
23:     return $z$
24: end procedure
Output: $z$, the element of $\mathbb{Z}_K$ such that
        $|\sigma_{k,+}(z)| \leq R_k$ for $k = 2, \ldots, d$ and $\operatorname{Re}\left((\sigma_{1,+}(z) - z_0)e^{-i\varphi/2}\right) \geq 0, |\sigma_{1,+}(z)| \leq R$
        where $z_0 = R(1 - \varepsilon^2)e^{-i\varphi/2}$ (see Fig. 14 for the visualization of the condition on
$\sigma_{1,+}(z)$)

---

FIG. 2   Description of example RANDOM-INTEGER-POINT procedure used in APPROXIMATE procedure in Fig. 1

Fixed input: $\mathfrak{p}_1, \ldots, \mathfrak{p}_M, R^{\min}$ $\quad \mathfrak{p}_1, \ldots, \mathfrak{p}_M$ are prime ideals of $\mathbb{Z}_F$ $\quad R^{\min}$ is a vector from $(0, \infty)^d$

Input: $L_1, \ldots, L_M, \varepsilon$ $\quad L_1, \ldots, L_M$ non-negative integers defining ideal $\mathfrak{p}_1^{L_1} \cdot \ldots \cdot \mathfrak{p}_M^{L_M}$ $\quad \varepsilon$ is a real number 1: procedure SUITABLE-Q-NORM

Offline:

2: $\quad \delta_0, \ldots, \delta_d \leftarrow$ UNIT-ADJUST$(F)$

3: $\quad$ TOTALLY-POS-GENERATOR$(\mathfrak{p}_1, \ldots, \mathfrak{p}_M)$

4: $\quad C_{\min}, C_{\max}, R^{\max} \leftarrow$ TARGET-SIZE$(\mathfrak{p}_1, \ldots, \mathfrak{p}_M, R^{\min}, \delta_0, \ldots, \delta_d)$ ▷ See Fig. 8

5: $\quad$ return $C_{\min}, C_{\max}, R^{\max}$

Specification: $C_{\min}, C_{\max}$ are real numbers, $R^{\max}$ is the vector in $(0, \infty)^d$

Online:

6: $\quad$ HAS-TP-GEN,$r \leftarrow$ TOTALLY-POS-GENERATOR$(L_1, \ldots, L_M)$

7: $\quad$ if not HAS-TP-GEN then

8: $\quad\quad$ return FALSE, 0 $\quad$ ▷ Narrow class group of $\mathfrak{p}_1^{L_1} \cdot \ldots \cdot \mathfrak{p}_M^{L_M}$ is non-trivial 9: $\quad$ end if

10: $\quad t_1, \ldots, t_d \leftarrow$ TARGET-SIZE$(r, L_1, \ldots, L_M, \varepsilon)$ ▷ See Fig. 8

11: $\quad u \leftarrow$ UNIT-ADJUST$(t_1, \ldots, t_d)$ ▷ See Fig. 9

12: $\quad$ return TRUE, $ru^2$

13: end procedure

Output: FALSE,0 if ideal $\mathfrak{p}_1^{L_1} \cdot \ldots \cdot \mathfrak{p}_M^{L_M}$ does not have a totally positive generator, or $\quad\quad$ TRUE,$r$ otherwise. Totally positive algebraic integer $r$ from $\mathbb{Z}_F$ is such that $\quad\quad\quad$ (a) $r\mathbb{Z}_F = \mathfrak{p}_1^{L_1} \cdot \ldots \cdot \mathfrak{p}_M^{L_M}$, $\quad\quad\quad$ (b) $\varepsilon^2 \sqrt{\sigma_1(r)}/4 \in [R_1^{\min}, R_1^{\max}]$ and $\sqrt{\sigma_k(r)} \in [R_k^{\min}, R_k^{\max}]$ for $k = 2, \ldots, d$.

FIG. 3 Example SUITABLE-Q-NORM procedure.

Fixed input: $F$, $\mathbb{Z}_F$, $P$ $\mathbb{Z}_F$ is the ring of integers of the totally real field $F$ and $P$ is a user defined parameter to select the set of exceptional primes $\mathcal{P}$.

Input: $e$

Check if the given element $e \in \mathbb{Z}_F$ is benign with respect to a set $\mathcal{P}$ of user defined primes.

1: procedure IS-EASILY-SOLVABLE

Offline:

2:    $\mathcal{P}_0 \leftarrow$ AllBoundedPrimes($\mathbb{Z}_F, P$)    ▷ Enumerate all prime ideals $\mathfrak{p}$ with $N(\mathfrak{p}) \leq P$.

3:    $\mathcal{P}_1 \leftarrow$ AllPrimeDivisors($\Delta_F$)

4:    $\mathcal{P} \leftarrow \mathcal{P}_0 \cup \mathcal{P}_1$    ▷ Yields finite set $\mathcal{P} = \{\mathfrak{p}_1, \ldots, \mathfrak{p}_k\}$ of exceptional primes.

5:    FAST-SOLVE-NORM-EQ($K, F, \mathbb{Z}_F, \mathbb{Z}_K, \mathcal{P}$)    ▷ $K = F(\sqrt{b})$, see Section 3

Online:

6:    $u \leftarrow N_{F/\mathbb{Q}}(e)$

7:    while exists $\mathfrak{p} \in \mathcal{P}$ such that $N_{F/\mathbb{Q}}(\mathfrak{p}) | u$ do

8:        $u \leftarrow u/N_{F/\mathbb{Q}}(\mathfrak{p})$

9:    end while

10: end procedure

Output: IsPrime($u$)

Offline precomputation of exceptional primes $\mathcal{P}$ and online test whether $e$ is benign via trial divisions by elements of $\mathcal{P}$ and a final primality test in $\mathbb{Z}$.

---

FIG. 4 Check if the right hand side is a benign integer in the sense of Definition 5.2.

Fixed input: $K, F, \mathbb{Z}_F, \mathbb{Z}_K, \mathcal{P}$ $\mathbb{Z}_F$ are the integers of the totally real subfield $F$ of a CM field $K$, $\mathbb{Z}_K$ are the integers of $K$ and $\mathcal{P} = \{\mathfrak{p}_1, \ldots, \mathfrak{p}_k\}$ is a finite set of exceptional primes.

Input: $e$

Find integer solution $z \in \mathbb{Z}_K$ to $N_{K/F}(z) = e$, where $e \in \mathbb{Z}_F$, provided it exists.

1: procedure FAST-SOLVE-NORM-EQ

Offline:

2:     for $i = 1, \ldots, k$ do

3:         $\mathfrak{P}_i \leftarrow$ PrimesLyingOver($\mathfrak{p}_i$)

4:     end for

5:     $\theta \leftarrow$ PrimitiveElement($K/F$)

6:     $f(X) \leftarrow$ MinimalPolynomial($\theta$)

Specification: Precomputed primes lying over the primes in $\mathcal{P}$, the minimal polynomial of a primitive element $\theta$.

Online:

7:     assert IS-EASY-SOLVABLE($e$)

8:                                                 ▷ Compute prime ideal $\mathfrak{q}$ if test is passed successfully.

9:     assert PASS-SOLVABILITY-TEST($e$)

10:                  ▷ Check existence of a global rational solution via the Hasse principle.

11:     $g(X) \leftarrow$ Lift(ModularFactorization($f(X), \mathbb{Z}_F/\mathfrak{q}$)      ▷ Obtain a lifted factor $g(X) \in \mathbb{Z}_F[X]$.

12:     $I \rightarrow$ HNF($\mathfrak{q}\mathbb{Z}_K, g(\theta)$)

13:     $\eta \leftarrow$ FirstBasisVector(LLL($I$))

14:     $\gamma \leftarrow e(N_{K/F}(\eta))^{-1}$

15:     $w \leftarrow$ SolveConstantNormEquation($\gamma$)

16:           ▷ Use any method for solving relative norm equations $N_{K/F}(w) = \gamma$ for the remaining bounded size element $\gamma \in \mathbb{Z}_F$. If this fails, repeat the steps following line 12 with $I \leftarrow I \cdot \mathfrak{P}_i$ for $i = 1, \ldots, k$ until success in line 15, otherwise report "failure."

17: end procedure

Output: Result $z = w\eta$ or "failure" if no solution $w$ exists.

Reduced the computation of a solution to the norm equation to a finite problem that is independent of the input size.

FIG. 5   Compute an integer solution $x \in \mathbb{Z}_K$ to the norm equation $N_{K/F}(z) = e$, provided it exists.

Fixed input: $K, F, \mathbb{Z}_F$ $\mathbb{Z}_F$ is the ring of integers of the totally real subfield $F$ of a CM field $K$.

Input: $e$ $e \in \mathbb{Z}_F$ is an element for which we check if the norm equation $N_{K/F}(z) = e$ has a solution $z \in K$. This is a quick check to rule out existence of solutions for some $e$.

1: procedure PASS-HASSE-SOLVABLILTY-TEST

Offline:

2:   $\mathfrak{F} \leftarrow \text{Conductor}(K/F)$

3:   $\mathcal{S}_0 \leftarrow \text{Factorization}(\mathfrak{F})$

4:   $\mathcal{S}_\infty \leftarrow \text{InfinitePlaces}(K)$

Online:

5:   $\mathcal{S}_1 \leftarrow \text{PrimeFactorization}(e\mathbb{Z}_F)$

6:   $\mathcal{S} = \mathcal{S}_0 \cup \mathcal{S}_1 \cup \mathcal{S}_\infty$

7:   isSolvable $\leftarrow$ TRUE

8:   for $\mathfrak{p} \in \mathcal{S}$ do

9:    if not IsLocallySolvable($K_\mathfrak{P}, F_\mathfrak{p}, e$) then    $\triangleright$ $\mathfrak{P}$ is a prime in $\mathbb{Z}_K$ lying over $\mathfrak{p}$.

10:     isSolvable $\leftarrow$ FALSE

11:    end if

12:   end for

13: end procedure

Output: isSolvable

Based on the Hasse local-global principle, solvability of the norm equation over $K$ is checked via local solvability at all finite places dividing the conductor, divisors of $e$ and all infinite places.

---

FIG. 6 Check if the right hand passes a solvability test whether a *rational* solution $z$ to the norm equation exists.

Fixed input: Prime ideals $\mathfrak{p}_1, \ldots, \mathfrak{p}_M$ of $\mathbb{Z}_F$

Input: Non-negative integers $L_1, \ldots, L_M$ defining ideal $\mathfrak{p}_1^{L_1} \cdot \ldots \cdot \mathfrak{p}_M^{L_M}$ 1: procedure TOTALLY-POS-GENERATOR

Offline:

2:    Find minimal $N_k$ such that ideal $\mathfrak{p}_k^{N_k}$ has totally positive generator $r_k$ 3:    for all $n_1, \ldots, n_k \in \{0, \ldots, N_1 - 1\} \times \cdots \times \{0, \ldots, N_M - 1\}$ do

4:        if ideal $\mathfrak{p}_1^{n_1} \cdot \ldots \cdot \mathfrak{p}_M^{n_M}$ has totally positive generator $r'$ then

5:            $r[n_1, \ldots, n_M] \leftarrow r'$

6:        else

7:            $r[n_1, \ldots, n_M] \leftarrow 0$

8:        end if

9:    end for

Specification:

Online:

10:    $l_k \leftarrow L_k \mod N_k, s_k \leftarrow (L_k - l_k)/N_k$

11:    if $r[l_1, \ldots, l_k] = 0$ then

12:        return FALSE, 0

13:    else

14:        return TRUE, $r_1^{s_1} \cdot \ldots \cdot r_M^{s_M} r[l_1, \ldots, l_k]$ 15:    end if

16: end procedure

Output: FALSE, 0 if ideal $\mathfrak{p}_1^{L_1} \cdot \ldots \cdot \mathfrak{p}_M^{L_M}$ does not have totally positive generator, otherwise TRUE, $r$ where $r\mathbb{Z}_F = \mathfrak{p}_1^{L_1} \cdot \ldots \cdot \mathfrak{p}_M^{L_M}$ and $r$ is totally positive FIG. 7 Example TOTALLY-POS-GENERATOR procedure.

Fixed input: $\mathfrak{p}_1, \ldots, \mathfrak{p}_M, R_1, \ldots, R_d, \delta_0, \ldots, \delta_d$ $\mathfrak{p}_1, \ldots, \mathfrak{p}_M$ are prime ideals of $\mathbb{Z}_F$ $R_1, \ldots, R_d, \delta_0, \ldots, \delta_d$ are real numbers

Input: $L_1, \ldots, L_M, \varepsilon, r$ $L_1, \ldots, L_M$ are integers $\varepsilon$ is a real number, $r$ is a totally positive element of $F$.

1: procedure TARGET-SIZE

Offline:

2:  $\quad C_{\min} \leftarrow 2\left(\sum_{k=1}^{d} \log R_k + \sum_{k=1}^{d} \log \delta_k + 2 \log 2\right), C_{\max} \leftarrow C_{\min} + 2 \log \delta_0$ 3:  $\quad R_k^{\max} \leftarrow \exp\left(\log R_k^{\min} + 2 \log \delta_k + \log \delta_0/d\right)$ 4:  $\quad$ return $C_{\min}, C_{\max}, R^{\max}$

Specification: $C_{\min}, C_{\max}$ – real numbers, $R^{\max}$ vector from $(0, \infty)^d$

Online:

5:  $\quad$ assert $L_1 \log N(\mathfrak{p}_1) + \ldots + L_M \log N(\mathfrak{p}_M) - 4 \log(1/\varepsilon) \in [C_{\min}, C_{\max}]$ 6:  $\quad t_1 \leftarrow \log R_1^{\min} + \log \delta_1 - \log\left(\sqrt{\sigma_1(r)}\varepsilon^2/4\right)$ 7:  $\quad t_k \leftarrow \log R_k^{\min} + \log \delta_k - \log \sqrt{\sigma_k(r)}$, for $t = 2, \ldots, d$ 8:  $\quad$ return $t_1, \ldots, t_d$ 9: end procedure

Output: $t_1, \ldots, t_d$ are real number such that $|t_1 + \ldots + t_d| \le \log \delta_0$, $\quad t_1 + \log\left(\sqrt{\sigma_k(r)}\varepsilon^2/4\right) \in \left[\log R_1^{\min} + \log \delta_1, \log R_1^{\max} - \log \delta_1\right]$, $\quad t_k + \log \sqrt{\sigma_k(r)} \in \left[\log R_k^{\min} + \log \delta_k, \log R_k^{\max} - \log \delta_k\right], k = 2, \ldots, d$ FIG. 8 Example TARGET-SIZE procedure

Fixed input: $F, u_1, \ldots, u_{d-1}$ $F$ is a totally real number field of degree $d$ $u_1, \ldots, u_{d-1}$ form a system of fundamental units of $F$

Input: $t_1, \ldots, t_d$ $t_1, \ldots, t_d$ – real numbers of the same precision $n$ 1: procedure UNIT-ADJUST

Offline:

2:     $u_1, \ldots, u_{d-1} \leftarrow$ FUNDAMENTAL-UNITS($F$)

3:     $\delta_0 \leftarrow \sqrt{\max_{k,j}\{|\sigma_k(u_j)|, |\sigma_k(u_j^{-1})|\}}$                    $\triangleright \; \delta_0 > 1$ 4:     $B \leftarrow \begin{pmatrix} \log|\sigma_1(u_1)| & \cdots & \log|\sigma_1(u_{d-1})| & 2\log\delta_0 \\ \vdots & & \vdots & \vdots \\ \log|\sigma_d(u_1)| & \cdots & \log|\sigma_d(u_{d-1})| & 2\log\delta_0 \end{pmatrix}$ 5:     $\delta_k \leftarrow \delta_0 \sqrt{\prod_{i=1}^{d-1} \max\{|\sigma_k(u_i)|, |\sigma_k(u_i^{-1})|\}}$

Specification: $\delta_1, \ldots, \delta_d$ – real numbers such that $\delta_k > 1$ and $\mathcal{C}(B) \subset [-\log\delta_1, \log\delta_1] \times \cdots \times [-\log\delta_d, \log\delta_d]$

Online:

6:     assert $|t_1 + \ldots + t_d| < \log\delta_0$      $\triangleright$ Make sure the point is in the span of the lattice 7:     $m \leftarrow \lceil B^{-1} t \rfloor$ 8:     $u \leftarrow \prod_{i=1}^{d-1} u_i^{m_i}$ 9: end procedure

Output: unit $u \in \mathbb{Z}_F^\times$ such that for all $k = 1, \ldots, d \; : \; |\log|\sigma_k(u)| - t_k| \leq \log\delta_k$ FIG. 9    Example UNIT-ADJUST procedure

Fixed input: $B = b_1, \ldots, b_n$ – basis of a lattice of rank $n \leq d$ in $\mathbb{R}^d$
Input: $t$ – vector in $\mathbb{R}^d$ 1: procedure NEAREST-PLANE
Offline:
2:     $b_1^*, \ldots, b_n^* \leftarrow$ GRAM-SHCMIDT($B$)      ▷ Computes GSO of B, see Section 3.5
Specification: $b_1^*, \ldots, b_n^*$ – GSO of B
Online:
3:     $v = (v_1, \ldots, v_n)$ is a vector of integers of length $n$
4:     $r \leftarrow t$
5:     for $k \in 1, \ldots, n$ do
6:        $v_{n+1-k} \leftarrow \lceil \langle r, b_{n+1-k}^* \rangle / \|b_{n+1-k}^*\|^2 \rfloor$      ▷ ensures $\langle r, b_{n+1-k}^* \rangle / \|b_{n+1-k}^*\|^2 \leq 1/2$
7:        $r \leftarrow r - v_{n+1-k} b_{n+1-k}$
8:     end for
9:     return $v$
10: end procedure
Output: $v$ such that $Bv \in t + \mathcal{C}(B^*)$ FIG. 10    Example NEAREST-PLANE procedure

Fixed input: $F, u_1, \ldots, u_{d-1}$ $F$ is a totally real number field of degree $d$ $u_1, \ldots, u_{d-1}$ form a system of fundamental units of $F$

Input: $t_1, \ldots, t_d$ $t_1, \ldots, t_d$ – real numbers of the same precision $n$ 1: procedure UNIT-ADJUST

Offline:

2:    $u_1, \ldots, u_{d-1} \leftarrow$ INDEPENDENT-UNITS$(\mathbb{Z}_F)$

3:                                           $\triangleright$ $\langle u_1, \ldots, u_{d-1}\rangle$ is a finite index subgroup of $\mathbb{Z}_F^\times$ 4:    $B \leftarrow \begin{pmatrix} \log|\sigma_1(u_1)| & \cdots & \log|\sigma_1(u_{d-1})| \\ \vdots & & \vdots \\ \log|\sigma_d(u_1)| & \cdots & \log|\sigma_d(u_{d-1})| \end{pmatrix}$ 5:    $b_1^*, \ldots, b_{d-1}^* \leftarrow$ NEAREST-PLANE$(B)$    $\triangleright$ Computes GSO of B, see Section 3.5

6:    $\log \delta_k \leftarrow \frac{1}{2}\sum_{j=1}^{d-1}|\langle b_j^*, e_k\rangle|$    $\triangleright$ $e_1, \ldots, e_d$ is the standard basis of $\mathbb{R}^d$

Specification: $\log \delta_1, \ldots, \log \delta_d$ – real numbers such that $\log \delta_k > 0$ and $\mathcal{C}(B^*) \subset [-\log \delta_1, \log \delta_1] \times \cdots \times [-\log \delta_d, \log \delta_d]$    $\triangleright$ see Section 3.5

Online:

7:    assert $|t_1 + \ldots + t_d| < \log \delta_0$    $\triangleright$ Make sure the point is in the span of the lattice 8:    $m \leftarrow$ NEAREST-PLANE(t)    $\triangleright$ Find $m$ such that $Bm \in t + \mathcal{C}(B^*)$ 9:    $u \leftarrow \prod_{i=1}^{d-1} u_i^{m_i}$ 10: end procedure

Output: unit $u \in \mathbb{Z}_F^\times$ such that for all $k = 1, \ldots, d : |\log|\sigma_k(u)| - t_k| \leq \log \delta_k$ FIG. 11 UNIT-ADJUST procedure used in an example implementation. One can compute with $\log \delta_k$. In the pseudo-code $\log \delta_k$ should be perceived as a variable name. One can also try to minimize $\sum \log \delta_k$ by applying different basis reduction techniques to $B$ and picking the reduced basis that gives the smallest $\sum \log \delta_k$. Variable $\log \delta_0$ is chosen based precision used for arithmetic operations in the algorithm.

Fixed input: $\mathbb{Z}_K$ – ring of integers of a CM field of degree $2d$
Input: $\varphi, \varepsilon$ – real numbers, $r$ – totally positive element of $\mathbb{Z}_F$
1: procedure RANDOM-INTEGER-POINT
Offline:
2:      $z_1, \ldots, z_{2d}$ is a fixed integral basis of $\mathbb{Z}_F$
3:      $B = [\boldsymbol{\sigma}(z_1), \ldots, \boldsymbol{\sigma}(z_{2d})]$ is a basis of the lattice associated to $\mathbb{Z}_K$,
4:      $b_1^*, \ldots, b_{2d}^* \leftarrow$ NEAREST-PLANE($B$)      ▷ Computes GSO of B, see Section 3.5
5:      $R_k^{\min} = \frac{1}{2}\sqrt{\max_j |\langle b_j^*, e_{2k-1}\rangle|^2 + \max_j |\langle b_j^*, e_{2k}\rangle|^2}$ for $k = 1, \ldots, d$
                                                                             ▷ $e_1, \ldots, e_{2d}$ is the standard basis of $\mathbb{R}^{2d}$
6:      $C_{\min}, C_{\max}, R^{\max} \leftarrow$ SUITABLE-Q-NORM($\mathfrak{p}_1, \ldots, \mathfrak{p}_M, R^{\min}$)      ▷ See Fig. 3
7:      return $C_{\min}, C_{\max}$
Specification: $C_{\min}, C_{\max}$ – real numbers
Online:
8:      $R \leftarrow \sqrt{\sigma_1(r)}, H' \leftarrow R\varepsilon\sqrt{4-\varepsilon^2}, N_{\max} = \lfloor H'/\varepsilon^2 R \rfloor$      ▷ See Fig.15
9:      $z_c \leftarrow R(1 - 3\varepsilon^2/4)e^{-i\varphi/2}, \Delta z \leftarrow ie^{-i\varphi/2}\varepsilon^2 R/2$      ▷ See Fig.15
10:     $\Delta Z \leftarrow (\operatorname{Re}\Delta z, \operatorname{Im}\Delta z, 0, \ldots, 0) \in \mathbb{R}^{2d}, Z_c \leftarrow (\operatorname{Re} z_c, \operatorname{Im} z_c, 0, \ldots, 0) \in \mathbb{R}^{2d}$
11:     $N \leftarrow$ random integer from the interval $[-N_{\max} + 1, N_{\max} - 1]$
12:     $t \leftarrow Z_c + N\Delta Z$
13:     $m \leftarrow$ NEAREST-PLANE($t$)      ▷ Find $m$ such that $Bm \in t + \mathcal{C}(B^*)$
14:     $z \leftarrow m_1 z_1 + \ldots + m_{2d} z_{2d}$
15:     return $z$      ▷ $\boldsymbol{\sigma}(z) \in S_{r,\varphi,\varepsilon}$
16: end procedure
Output: $z$, the element of $\mathbb{Z}_K$ such that
$|\sigma_{k,+}(z)| \leq R_k$ for $k = 2, \ldots, d$ and $\operatorname{Re}\big((\sigma_{1,+}(z) - z_0)e^{-i\varphi/2}\big) \geq 0, |\sigma_{1,+}(z)| \leq R$
where $z_0 = R(1 - \varepsilon^2)e^{-i\varphi/2}$ (see Fig. 14 for the visualization of the condition on $\sigma_{1,+}(z)$)

FIG. 12    RANDOM-INTEGER-POINT procedure used in an example implementation. In such an implementation, one can try to minimize $\sum \log R_k$ by applying different basis reduction techniques to $B$ and picking the reduced basis that gives the smallest $\sum \log R_k$.

| | Algorithm | Gate set $\mathcal{G}$ | Cost function $c: \mathcal{G} \to \mathbb{R}^+$ | Cost bound function $cost_{max}$ | Set of target unitaries $U_{targ}$ | runtime as function of $\log(1/\varepsilon)$ |
|---|---|---|---|---|---|---|
| 1. | Solovay-Kitaev (e.g., Christopher M. Dawson and Michael A. Nielsen, "The Solovay-Kitaev algorithm," Quantum Information and Computation, 6(1):81-95 (2005); Alexei Kitaev, Alexander Shen, and Mikhail Vyalyi, "Classical and quantum computation," volume 47 of Graduate studies in mathematics. American Mathematical Society (2002)) | any universal | $c(g) = 1$ | $O\left(\log^{3.97}(1/\varepsilon)\right)$ | SU(2) | polynomial |
| 2. | Brute-force search (e.g., Austin G. Fowler, "Constructing arbitrary Steane code single logical qubit fault-tolerant gates," Quantum Information and Computation, 11:867-873 (2011)). | unitaries with algebraic entries | $c(g) = 1$ | $O(\log(1/\varepsilon))$ | SU(2) | exponential |
| 3. | Vadym Kliuchnikov, Dmitri Maslov, and Michele Mosca, "Practical approximation of single-qubit unitaries by single-qubit quantum Clifford and T circuits," (December 2012); Neil J. Ross and Peter Selinger, "Optimal ancilla-free Clifford+T approximation of z-rotations," 2014; Peter Selinger, "Efficient Clifford+T approximation of single-qubit operators," (December 2012). | Clifford+T | $c(T) = 1$, $c(Clifford) = 0$ | $O(\log(1/\varepsilon))$ | $e^{iZ\varphi}$ | polynomial |

FIG. 17A

| | Algorithm | Gate set $\mathcal{G}$ | Cost function $c: \mathcal{G} \to \mathbb{R}^+$ | Cost bound function $\text{cost}_{\max}$ | Set of target unitaries $U_{targ}$ | runtime as function of $\log(1/\varepsilon)$ |
|---|---|---|---|---|---|---|
| 4. | Andreas Blass, Alex Bocharov, and Yuri Gurevich, "Optimal ancilla-free Pauli $+V$ circuits for axial rotations," ArXiv.org preprint arXiv:1412.1033 (December 2014); Alex Bocharov, Yuri Gurevich, and Krysta M. Svore, "Efficient decomposition of single-qubit gates into V basis circuits," *Physical Review A*, 88(1):1-13 (July 2013). | V-basis | $c(g) = 1$ | $O(\log(1/\varepsilon))$ | $e^{iZ\varphi}$ | polynomial |
| 5. | Vadym Kliuchnikov, Alex Bocharov, and Krysta M. Svore, "Asymptotically optimal topological quantum compiling," *Physical Review Letters*, 112(14) (April 2014). | Fibonacci | $c(g) = 1$ | $O(\log(1/\varepsilon))$ | $e^{iZ\varphi}, e^{iX\varphi}$ | polynomial |
| 6. | Alex Bocharov, Martin Roetteler, and Krysta M. Svore, "Efficient synthesis of probabilistic quantum circuits with fallback," *Physical Review A*, 91:052317 (2015), see also arXiv preprint arXiv:1409.3552. | $Clifford + e^{\frac{i\pi Z}{12}}$ | $c\left(e^{\frac{i\pi Z}{12}}\right) = 1$, $c(\text{Clifford}) = 0$ | $O(\log(1/\varepsilon))$ | $e^{iZ\varphi}$ | polynomial |
| 7. | This disclosure | totally definite quaternion algebras | $c(g) = 1$, $c_{canonical}$ | $O(\log(1/\varepsilon))$ | $e^{iZ\varphi}$ | polynomial |

FIG. 17B

METHOD AND SYSTEM FOR APPROXIMATE QUANTUM CIRCUIT SYNTHESIS USING QUATERNION ALGEBRA

CROSS REFERENCE TO RELATED APPLICATIONS

This application is the U.S. National Stage of International Application No. PCT/US2016/053808 entitled "METHOD AND SYSTEM FOR APPROXIMATE QUANTUM CIRCUIT SYNTHESIS USING QUATERNION ALGEBRA," filed on Sep. 26, 2016, which was published in English under PCT Article 21(2), which in turn claims the benefit of U.S. Provisional Application No. 62/233,293 entitled "METHOD AND SYSTEM FOR APPROXIMATE QUANTUM CIRCUIT SYNTHESIS USING QUATERNION ALGEBRA," filed on Sep. 25, 2015. The provisional application is incorporated herein by reference in its entirety.

This application is the U.S. National Stage of International Application No. PCT/US2016/053808 entitled "METHOD AND SYSTEM FOR APPROXIMATE QUANTUM CIRCUIT SYNTHESIS USING QUATERNION ALGEBRA," filed on Sep. 26, 2016, which was published in English under PCT Article 21(2), which is also a continuation-in-part of PCT International Application No. PCT/US2016/025958 filed on Apr. 5, 2016, and entitled "METHOD AND SYSTEM FOR QUANTUM CIRCUIT SYNTHESIS USING QUATERNION ALGEBRA", which claims the benefit of U.S. Provisional Patent Application No. 62/146,182 filed on Apr. 10, 2015, and entitled "METHOD AND SYSTEM FOR QUANTUM CIRCUIT SYNTHESIS USING QUATERNION ALGEBRA", both of which are hereby incorporated herein by reference in their entirety.

FIELD

The application pertains to quantum circuit synthesis.

SUMMARY

Disclosed herein are example embodiments of methods, apparatus, and systems for performing quantum circuit synthesis and/or for implementing the synthesis results in a quantum computer system. For instance, the disclosure presents innovations in quantum computing design and synthesis tools for generating circuit descriptions operable on such designs. The innovations can be implemented as part of a method, as part of a computing device, compilation system, or synthesis system configured or programmed to perform any embodiment of the disclosed techniques, or as part of a tangible computer-readable media storing computer-executable instructions for causing a computing device to perform any embodiment of the disclosed synthesis techniques. The innovations can also be performed as part of a method or system for implementing and performing quantum operations in a physical implementation of a quantum computer. The various innovations can be used in combination or separately.

Embodiments of the disclosed technology can be used as part of an overall synthesis process for generating gate sets for a quantum computer having a target architecture from higher-level descriptions. In particular embodiments, the techniques disclosed herein can be used to generate a quaternion approximation for a synthesis process that uses quaternion algebra. Example embodiments of suitable quaternion-based synthesis procedures with which the disclosed technology can be used are described in U.S. Provisional Patent Application No. 62/146,182 filed on Apr. 10, 2015, and entitled "METHOD AND SYSTEM FOR QUANTUM CIRCUIT SYNTHESIS USING QUATERNION ALGEBRA"; PCT International Application No. PCT/US2016/025958 filed on Apr. 5, 2016, and entitled "METHOD AND SYSTEM FOR QUANTUM CIRCUIT SYNTHESIS USING QUATERNION ALGEBRA"; Vadym Kliuchnikov and Jon Yard, "A Framework for Exact Synthesis," arXiv:1504.04350 (2015); and in Simon Forest, David Gosset, Vadym Kliuchnikov, David McKinnon, "Exact synthesis of single-qubit unitaries over Clifford-cyclotomic gate sets," Journal of Mathematical Physics 56, 082201, (2015) (also available at arXiv:1501.04944v2). For instance, any of the embodiments disclosed in these references (or aspect or feature (including combinations thereof) disclosed therein) can be used together with any aspect or feature (including combinations thereof) of the innovations presented in this disclosure.

In certain example embodiments, methods for efficiently approximating qubit unitaries over gate sets derived from totally definite quaternion algebras are presented. Example implementations of the technology can achieve ε-approximations using circuits of length $O(\log(1/\varepsilon))$, which is asymptotically optimal. Example implementations also achieve the same quality of approximation as previously-known algorithms for Clifford+T, V-basis, and Clifford+π/12, running on average in time polynomial in $O(\log(1/\varepsilon))$ (conditional on a number-theoretic conjecture).

In certain example embodiments of the quantum circuit synthesis procedure disclosed herein, a universal gate set, a target unitary described by a target angle, and target precision is received (input); a corresponding quaternion approximation of the target unitary is determined; and a quantum circuit corresponding to the quaternion approximation is synthesized, the quantum circuit being over a single qubit gate set, the single qubit gate set being realizable by the given universal gate set for the target quantum computer architecture. The single qubit gate set can be a Clifford+T basis gate set, a Clifford+$e^{i\pi Z/12}$ basis gate set, a Clifford+$e^{i\pi Z/16}$ basis gate set, a V-basis gate set, or any other single qubit base set expressible in terms of totally definite quaternion algebra. The corresponding quaternion approximation can describe the target unitary in quaternion algebra. In some implementations, the system further comprises a quantum circuit controller coupled to the target quantum circuit architecture and configured to implement the quantum circuit in the target quantum circuit architecture. In particular implementations, the synthesis procedure further comprises determining a cost vector for the target unitary, and the act of determining the corresponding quaternion approximation comprises finding one or more corresponding quaternion approximations that satisfy the cost vector. The cost vector can, for example, describe a limit on a size of the single qubit gate set resulting from the synthesis procedure. In some implementations, the act of determining the corresponding quaternion approximation of the target unitary comprises selecting a first algebraic integer for use as a first quaternion element in the quaternion approximation, the first algebraic integer being selected so that a distance threshold to a $R_x$, $R_y$, or $R_z$ rotation is satisfied. The act of determining the corresponding quaternion approximation of the target unitary can further comprise selecting a second algebraic integer for use as a second quaternion element in the quaternion approximation, the second algebraic integer being selected so that, in combination with the first integer, the quaternion approximation produces a quaternion that satisfies a cost limit and the corresponding unitary satisfies the distance threshold. The first algebraic integer and the second algebraic integer can be selected from a ring of integers of the CM-field K. In particular implementations, the determining a corresponding quaternion approximation of the target unitary comprises finding a quaternion from an order of a totally definite quaternion algebra defined over totally real number field F (e.g., the generalized Lipschitz order) that has the following two properties: (1) $(U_q, R_z(\varphi)) \leq \varepsilon$; and (2) $\mathrm{nrd}(q)\mathbb{Z}_F = \mathfrak{p}_1^{L_1} \ldots \mathfrak{p}_M^{L_M}$, where d is a distance function (e.g., $d = \sqrt{1 - |\mathrm{Tr}(U_q^d R_z(\varphi))|/2}$), $\mathfrak{p}_1, \ldots, \mathfrak{p}_M$ are the appropriate prime ideals of $\mathbb{Z}_F$, and $L_1, \ldots, L_M \in \mathbb{Z}$ are their respective multiplicities in the decomposition of $\mathrm{nrd}(q)\mathbb{Z}_F$.

In some example embodiments of a quantum circuit synthesis procedure disclosed herein, a program describing a desired computation to be performed in a target quantum computer architecture is input; and a gate set adapted for implementation on the target quantum computer architecture is generated based on the program, the gate set including a single qubit circuit for one or more respective unitaries used to perform the desired computation. In certain implementations, the single qubit circuit is generated by identifying a target unitary, and determining a corresponding quaternion approximation of the target unitary using a process in which one or more of the elements in the corresponding quaternion approximation are randomly selected. For example, in some implementations, the act of determining the corresponding quaternion approximation of the target unitary can comprise randomly selecting one or more values for use in the corresponding quaternion approximation from a constrained body of values that guarantees that a norm equation is solvable; and solving the norm equation to determine at least another one of the elements in the corresponding quaternion approximation. For instance, the at least another one of the elements in the corresponding quaternion approximation can be z, where z is an algebraic integer from K, and wherein the norm equation for z is $z(z^*) = e$, where e is an element of the totally real subfield F. In some implementations, the act of determining the corresponding quaternion approximation of the target unitary comprises: randomly sampling points from subsets of a ring of integers; and using the randomly selected sampling points as quaternion elements in the quaternion approximation. The ring of integers can be, for instance, a ring of integers of the CM-field K. In certain implementations, the act of determining the corresponding quaternion approximation of the target comprises: partitioning a convex body of complex numbers into convex subsets, the partitioning being performed such that each subset has a lattice point corresponding to $\mathbb{Z}_K$; randomly selecting one of the subsets; selecting a lattice point corresponding to $\mathbb{Z}_K$ from the randomly selected subset; and using the selected lattice point as an element in the quaternion approximation. In some implementations, the circuit is implemented in the target quantum computer architecture.

In certain example embodiments of a quantum circuit synthesis procedure disclosed herein, a target unitary described by a target angle and target precision is received (input); a corresponding quaternion approximation of the target unitary is determined; and the corresponding quaternion approximation is synthesized using a Closest Vector Problem (CVP) technique to select values for the corresponding quaternion approximation and to produce a single qubit circuit for the target unitary, the single qubit circuit being realizable by a quantum computer architecture. In certain implementations, the determining the corresponding quaternion approximation of the target unitary comprises selecting values from a Hermite-Korkine-Zolotarev, Block-Korkine-Zolotarev, Lenstra-Lenstra-Lovasz, or other size-reduced basis as an element in the corresponding quaternion approximation. Further, in some implementations, the determining the corresponding quaternion approximation of the target unitary comprises using a Lenstra-Lenstra-Lovasz reduction technique or other lattice basis reduction technique.

Any of these example synthesis procedures can be performed by a quantum circuit synthesizer system comprising a processor and memory and/or by a quantum computer synthesis tool adapted for use in a quantum computer design and implementation process and implemented by one or more computing devices. Further, any of these example synthesis procedures can be implemented as computer-executable instructions stored on a computer-readable media, which when executed by a computer cause the computer to perform the synthesis procedure.

BRIEF DESCRIPTION OF THE DRAWINGS

FIG. 1 illustrates a description of an example embodiment of the approximate quaternion approach disclosed herein.

FIG. 2 illustrates a description of an example RANDOM-INTEGER-POINT procedure.

FIG. 3 illustrates a description of an example SUITABLE-Q-NORM procedure.

FIG. 4 illustrates a description of an example IS-EASILY-SOLVABLE procedure.

FIG. 5 illustrates a description of an example FAST-SOLVE-NORM-EQ procedure.

FIG. 6 illustrates a description of an example PASS-HASSE-SOLVABILITY-TEST procedure.

FIG. 7 illustrates a description of an example TOTALLY-POS-GENERATOR procedure.

FIG. 8 illustrates a description of an example TARGET-SIZE procedure.

FIG. 9 illustrates a description of an example UNIT-ADJUST procedure.

FIG. 10 illustrates a description of an example NEAREST-PLANE procedure.

FIG. 11 illustrates a description of an example UNIT-ADJUST procedure.

FIG. 12 illustrates a description of an example RANDOM-INTEGER-POINT procedure.

FIGS. 17A-17B together show a table of various quantum circuit creation approaches.

DETAILED DESCRIPTION

1. General Considerations

Figure 13:
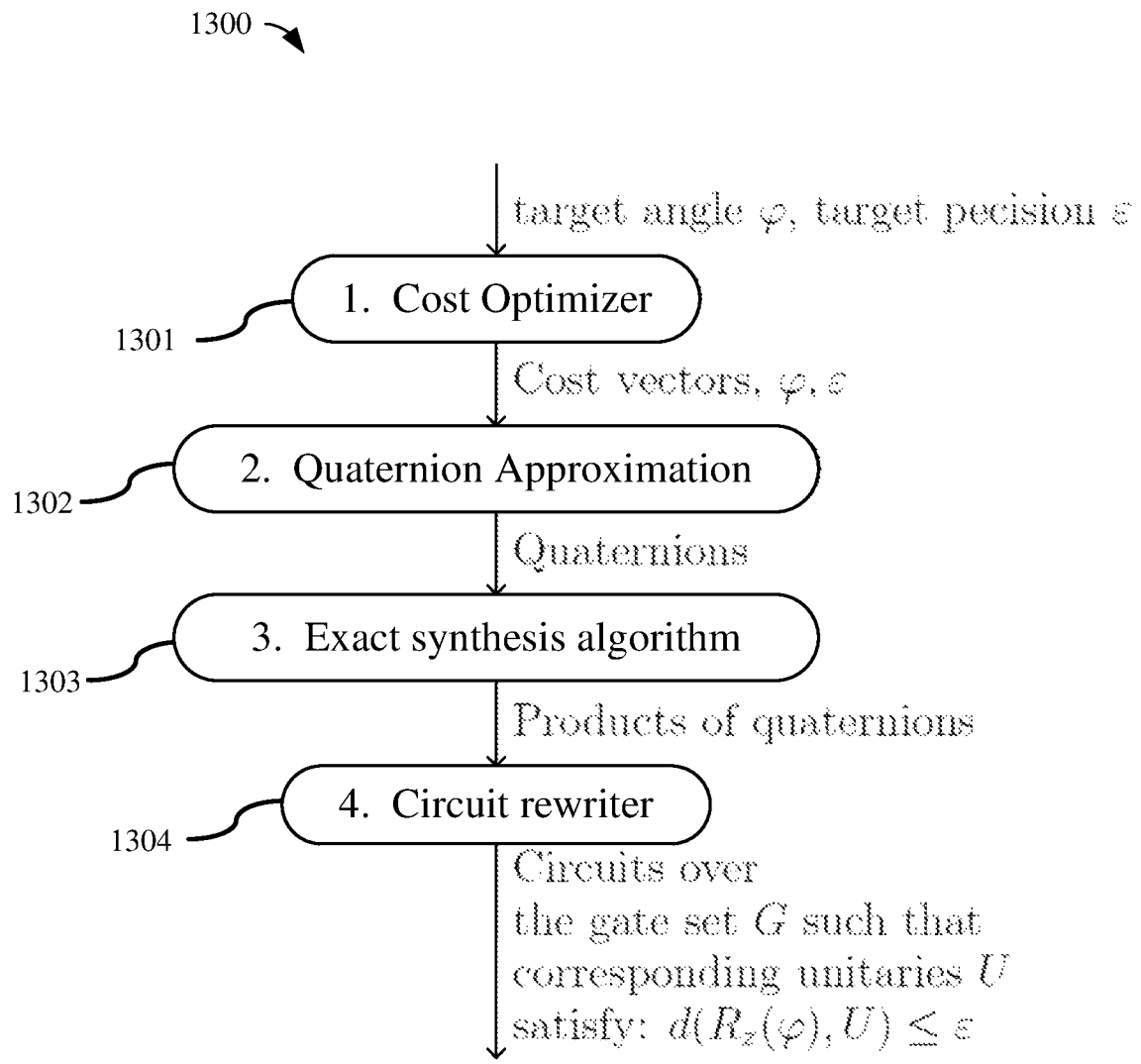
FIG. 13 is a flow chart showing how the example approximation procedure of FIG. 1 can be implemented as part of a overall synthesis process.

As used in this application, the singular forms "a," "an," and "the" include the plural forms unless the context clearly dictates otherwise. Additionally, the term "includes" means "comprises." Further, the term "coupled" does not exclude the presence of intermediate elements between the coupled items. Further, as used herein, the term "and/or" means any one item or combination of any items in the phrase. Still further, as used herein, the term "optimiz*" (including variations such as optimization and optimizing) refers to a choice among options under a given scope of decision, and does not imply that an optimized choice is the "best" or "optimum" choice for an expanded scope of decisions.

The systems, apparatus, and methods described herein should not be construed as limiting in any way. Instead, the present disclosure is directed toward all novel and nonobvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

2. Introduction to the Disclosed Technology

Each time a new computing device is built, one typically asks the question: what problems can it solve? The same question applies to the quantum computers that are now being developed. When addressing such questions, one usually starts with a crude analysis, asking how resources like time, memory, cost, and the size of the computer scale with the problem size. In particular, how do these resources depend on the particular gate set supported by a quantum computer? The algorithm of Solovay and Kitaev shows that any two universal gate sets are equally good from the perspective of polynomially-scaling resources. See, e.g., Alexei Kitaev, Alexander Shen, and Mikhail Vyalyi, "Classical and quantum computation," volume 47 of Graduate studies in mathematics, American Mathematical Society (2002); Christopher M. Dawson and Michael A. Nielsen, "The Solovay-Kitaev algorithm," Quantum Information and Computation, 6(1):81-95 (2005). However, once a small quantum computer is built, more refined questions are asked: How large of a problem can one solve on it? How can one compile our algorithms in the most resource-efficient way possible?

Typically, a circuit implementing a quantum algorithm uses a large number of gates, or local unitaries. Each local unitary must be compiled into the gate set supported by a target fault-tolerant quantum computer. Whereas the unitary groups are uncountable, most promising quantum computer architectures known today (topological or based on error correcting codes) natively support only a finite set of unitary gates. The problem of optimal compilation into circuits over such a gate set can be naturally formulated as that of approximation in such groups.

This disclosure concerns the problem of compiling circuits for single-qubit unitaries, and, more specifically, of approximation by finitely-generated subgroups of SU(2). A systematic description of the problem can be given as follows. Let $\mathcal{G} \subset SU(2)$ be a finite set of 2×2 unitary matrices, or gates. Given an arbitrary unitary $U \in SU(2)$, one wants to express it in terms of unitaries from $\mathcal{G}$. In most cases U can not be expressed exactly using elements of $\mathcal{G}$ and must be therefore approximated. For a selected absolute precision $\varepsilon$, the task is to find a sequence of gates $g_1, \ldots, g_N \in \mathcal{G}$ (usually called a circuit over $\mathcal{G}$) such that $\|U - g_N \ldots g_1\| \leq \varepsilon$. If one can approximate any unitary over the gate set $\mathcal{G}$ (or in other words, if $\mathcal{G}$ generates a dense subgroup $\langle \mathcal{G} \rangle$ of SU(2)), one calls $\mathcal{G}$ universal.

Given that each unitary can be so approximated, one can then ask for the shortest, or least costly, such circuit. A volume argument shows that there exist unitaries U requiring circuits of length at least $C \log(1/\varepsilon)$, where C is a constant that depends on the gate set $\mathcal{G}$. A natural question to ask is whether there is a matching upper bound (e.g., whether one can approximate any unitary using a circuit of length $O(\log(1/\varepsilon))$). To answer this question, one can employ non-trivial mathematical ideas. For example, it was recently shown that such approximations exist if the unitaries in $\mathcal{G}$ have entries that are algebraic numbers. See, e.g., Jean Bourgain and Alexander Gamburd, "On the spectral gap for finitely-generated subgroups of SU(2)," Inventiones mathematicae, 171(1):83-121 (2008) (hereinafter "Bourgain and Gamurd 2008"). Known gate sets associated with fault-tolerant quantum computing architectures have this property.

Unfortunately, the result is non constructive. Furthermore, there is no obvious way to make it constructive that would realistically work for even a moderately small precision target $\varepsilon$. The result of Bourgain and Gamurd 2008 implies that a brute-force search can yield approximations saturating the lower bound. In practice, however, the precision of approximation achievable with brute force search is limited to $10^{-4}$ or $10^{-5}$. Ideally, one would like to have an algorithm that finds an $\varepsilon$-approximation of a given unitary with a circuit of length $O(\log(1/\varepsilon))$ and, furthermore, one would like the algorithm to run in $O(\text{poly}(\log(1/\varepsilon)))$ time.

Recently such algorithms were found for several gate sets such as Clifford+T, the V-basis, Clifford+$R_z(\pi/6)$ and the braiding of Fibonacci anyons. See, e.g., Neil J. Ross and Peter Selinger, "Optimal ancilla-free Clifford+T approximation of z-rotations," arXiv:1409.4355 (2014); Peter Selinger, "Efficient Clifford+T approximation of single-qubit operators," arXiv:1212.6253 (December 2012); Alex Bocharov, Yuri Gurevich, and Krysta M. Svore, "Efficient decomposition of single-qubit gates into V basis circuits," Physical Review A, 88(1):1-13 (July 2013); Alex Bocharov, Martin Roetteler, and Krysta M. Svore, "Efficient synthesis of probabilistic quantum circuits with fallback," Physical Review A, 91:052317 (2015) (see also arXiv preprint arXiv: 1409.3552); Vadym Kliuchnikov, Alex Bocharov, and Krysta M. Svore, "Asymptotically optimal topological quantum compiling," Physical Review Letters, 112(14) (April 2014). The question of why it is possible to construct such an algorithm for these gate sets and what general properties such gate sets should have has been an outstanding challenge in the field.

In this disclosure, and in certain example embodiments, a general framework is presented that enables efficient approximation algorithms for entire families of gate sets, instead of for specific examples. Example algorithms are developed in the general setting of gate sets derived from totally definite quaternion algebras. Results of applying an example implementation of the algorithm are also presented for a wide range of gate sets, including Clifford+$\sqrt{T}$.

The proof that example implementations of the disclosed techniques terminate and run on average in polynomial time relies on a number-theoretic conjecture that generalizes and refines similar conjectures. The mathematics behind conjectures of this type were recently studied for Clifford+T, V-basis and some other gate sets. See, e.g., Peter Sarnak, "Letter to Aaronson and Pollington on the Solvay-Kitaev Theorem and Golden Gates," available at http://publications.ias.edu/sarnak/paper/2637 (February 2015) (hereinafter "Sarnak 2015"). Results of experiments with example implementations of the disclosed technology provide indirect evidence that some of results in Sarnak 2015 can be true for a wider range of gate sets. This is related to the "Golden Gates" introduced in Sarnak 2015. This is discussed in more detail in the "Conjecture" Section below. Next, the problem of unitary approximation is presented more formally and a high level overview of example embodiments of the approximation framework is presented.

In summary, disclosed herein are embodiments of a framework for approximate synthesis of single qubit unitary transformations over a universal gate set. The example framework is applicable whenever the gate set is related to totally definite quaternion algebras. Embodiments of the disclosed synthesis procedure run in time that is polynomial in $\log(1/\varepsilon)$, where $\varepsilon$ is the approximation parameter and the output factorizations produced have length $O(\log(1/\varepsilon))$. An example implementation of the algorithm was implemented in the computer algebra system Magma and was applied to a wide range of gate sets.

2.1. Ancillae Free Approximation.

Formally, the problem of ancillae free approximation for single qubit gate sets can be stated as follows:

Problem 2.1

(unitary approximation problem in two dimensions, UAP). Given (1) finite universal unitary gate set $\mathcal{G} \subset SU(2)$ (2) cost function c: $\mathcal{G} \to \mathbb{Z}^+$ (c: $\mathcal{G} \to \{1\}$ corresponds to circuit length)

(3) distance function ρ on the set of unitaries (4) cost bound function $cost_{max}$: $\mathbb{Z}^+ \to \mathbb{Z}^+$ (5) target unitary U from $U_{targ} \subset SU(2)$ (6) target precision ε

Find $g_1, \ldots, g_N$ from G such that $\rho(g_1 \cdot \ldots \cdot g_N, U) \leq \varepsilon$ and $\Sigma_{k=1}^N c(g_k) \leq cost_{max}(\varepsilon)$.

It can be said that an algorithm solves UAP in polynomial time, if it solves Problem 2.1 for arbitrary unitaries U from $U_{targ}$ and its runtime is polynomial in $\log(1/\varepsilon)$. Here, one also is allowed to spend arbitrary time on precomputation based on (1)-(4) and store an arbitrary amount of results of the precomputation. The set $U_{targ}$ can be equal to SU(2) or some its subset. For example, it can be the set of all unitaries $e^{i\varphi z}$ for Z being Pauli Z matrix and φ being arbitrary real number.

The hardness of solving UAP and the existence of the solution to it depends on the choice of cost bound function $cost_{max}$. A summary of known algorithms for solving UAP is presented in the table shown in FIGS. 17A and 17B. In particular, the table shows known algorithms for solving the unitary approximation problem (UAP, Problem 2.1). The distance function used is $\|U-V\|$, where $\|U\|=\frac{1}{2}\sqrt{Tr(UU^\dagger)}$. Cost function $c_{canonical}$ is defined below in the "Exact synthesis results for totally definite quaternion algebras" Subsection (Subsection 3.3) and also discussed in more detail in the "End to end examples of using the framework" Section (Section 6).

In practice, for target precisions $10^{-10}$ to $10^{-30}$, the overhead from using the Solovay Kitaev algorithm can be between one to three orders of magnitude. On the other hand, the methods based on brute force search find the best possible solution, but are frequently limited to precisions $10^{-5}$ or even less because their runtime and required memory scale exponentially with $\log(1/\varepsilon)$. The methods described in Alex Bocharov, Yuri Gurevich, and Krysta M. Svore, "Efficient decomposition of single-qubit gates into V basis circuits," Physical Review A, 88(1):1-13 (July 2013); Neil J. Ross and Peter Selinger, "Optimal ancilla-free Clifford+T approximation of z-rotations," arXiv:1409.4355 (2014); and Peter Selinger, "Efficient Clifford+T approximation of single-qubit operators," arXiv:1212.6253 (December 2012), together with the methods that are described herein (see the Table of FIGS. 17A-17B at entries lines 3-8) are based on an exact synthesis algorithm and produce results that have a cost bound similar to brute force search but have polynomial runtime subject to some number theoretic conjectures (similar to Conjecture 4.8). In the next subsection, this is discussed in more detail.

2.2. Approximation Methods Based on Exact Synthesis.

FIG. 13 is a flow diagram 1300 showing an example approach that solves the UAP (Problem 2.1) and that is based on the exact synthesis algorithm (see the Table of FIGS. 17A and 17B at lines 3-8). The flow diagram is presented at a high level and should not be construed as limiting, as any one or more of the items/acts shown in the diagram 1300 of FIG. 13 can be omitted, replaced, and/or supplemented with additional items/acts.

One of the focuses of this disclosure is to present example algorithms that work for gate sets described by an arbitrary totally definite quaternion algebra. In this subsection, a discussion is provided regarding what it means for the gate set to be described by totally definite quaternion algebra. The flow diagram 1300 of FIG. 13 is also described in more detail.

The "Basic results and definitions" Section (Section 3) below provides definitions and a more detailed discussion of the mathematical objects discussed herein. The aim of this part is to explain connections between them and to the algorithm presented in this disclosure at a high level. It can be said that the gate set $\mathbb{Z}$ is described by quaternion algebra if the following list of objects can be specified and related to the gate set.

Definition 2.2.

A quaternion gate set specification is a tuple ⟨F, σ, a, b, $\mathcal{M}$, S⟩ where:

F is a totally real number field and σ is an embedding of F into $\mathbb{R}$ a, b are elements of F that define the quaternion algebra $$\left(\frac{a,b}{F}\right)$$

over F $\mathcal{M}$ is a maximal order of $$\left(\frac{a,b}{F}\right)$$

S={$\mathfrak{p}_1, \ldots, \mathfrak{p}_M$} is a set of prime ideals of F

Using the embedding σ any quaternion q from the quaternion algebra can be mapped to a special unitary $U_q \in SU(2)$. The precise construction of this map is discussed in the "Using quaternions to represent unitaries" subsection (Subsection 3.1) below. This map has the following relevant properties:

$$U_{q_1 q_2} = U_{q_1} U_{q_2}, U_q^\dagger = U_{q^*}$$

where q* is the conjugate of q. Also defined is the following closed under multiplication set $$\mathcal{M}_S = \{q \in \mathcal{M} : nrd(q)\mathbb{Z}_F = \mathfrak{p}_1^{L_1} \cdot \ldots \cdot \mathfrak{p}_M^{L_M}, L_k \in \mathbb{Z}, L_k \geq 0\},$$

and call $(L_1, \ldots, L_M)$ the cost vector of q. The meaning of a cost vector is discussed in more detail further in this section and also in the "Exact synthesis results for totally definite quaternion algebras" subsection below. Above nrd (q) is the reduced norm of quaternion and $\mathbb{Z}_F$ is a ring of integers of number field F. The set $\mathcal{M}_S$ is closed under multiplication because $\mathcal{M}$ is closed under multiplication and $nrd(q_1 q_2) = nrd(q_1) \cdot nrd(q_2)$.

A simplified set of conditions that desirably holds for the gate set to be described by the quaternion gate set specification is:

(1) There must exist subset $\mathcal{G}_Q$ of $\mathcal{M}_S$ such that $\mathcal{G} = \{U_q : q \in \mathcal{G}_Q\}$.

(2) The group generated by $\mathcal{G}$ must be equal to group $\{U_q : q \in \mathcal{M}_S\}$.

Condition (1) implies that the group generated by elements from G is a subgroup of $\{U_q : q \in \mathcal{M}_S\}$. Condition (2) can be checked for a given set $\mathcal{G}_Q$ using the framework described in Vadym Kliuchnikov and Jon Yard, "A framework for exact synthesis," arXiv:1504.04350 (2015); U.S. Provisional Patent Application No. 62/146,182 filed on Apr. 10, 2015, and entitled "METHOD AND SYSTEM FOR QUANTUM CIRCUIT SYNTHESIS USING QUATERNION ALGEBRA"; and PCT International Application No. PCT/US2016/025958 filed on Apr. 5, 2016, and entitled "METHOD AND SYSTEM FOR QUANTUM CIRCUIT SYNTHESIS USING QUATERNION ALGEBRA". A brief overview of results from those works is in the "Exact synthesis results for totally definite quaternion algebras" subsection (Subsection 3.3) below.

One way of checking the condition (2) is to first compute a finite set of quaternions $\mathcal{G}_{\mathcal{M},S}$ such that every element of $\mathcal{M}_S$ can be written as a product of elements of $\mathcal{G}_{\mathcal{M},S}$ and a scalar (using, for example, algorithms from Vadym Kliuchnikov and Jon Yard, "A framework for exact synthesis," arXiv:1504.04350 (2015); U.S. Provisional Patent Application No. 62/146,182 filed on Apr. 10, 2015, and entitled "METHOD AND SYSTEM FOR QUANTUM CIRCUIT SYNTHESIS USING QUATERNION ALGEBRA"; and PCT International Application No. PCT/US2016/025958 filed on Apr. 5, 2016, and entitled "METHOD AND SYSTEM FOR QUANTUM CIRCUIT SYNTHESIS USING QUATERNION ALGEBRA").

Here, $\mathcal{G}_{\mathcal{M},S}$ is a set of canonical generators of $\mathcal{M}_S$. Second, for each q from $\mathcal{G}_Q^*$, find a representation of $U_q$ as a product of elements of $\mathcal{G}$. For all q from $\mathcal{G}_{\mathcal{M},S}$ one then can define:

$$\text{Circuit}(q) = (U_1, \ldots, U_n), \text{ where } U_q = U_1 \ldots U_n, U_k \in \mathcal{G}. \quad (1)$$

One natural way of defining the cost of elements of $\mathcal{G}_{\mathcal{M},S}$ is $$c(q) = \sum_{k=1}^{n} c(U_k).$$

For the other cost function definitions related to the cost vector of the quaternion, see the "Exact synthesis results for totally definite quaternion algebras" subsection below.

To summarize, the following definition is given:

Definition 2.3.

a gate set $\mathcal{G}$ is described by quaternion algebra if the following data is defined:

(1) A quaternion gate set specification ⟨F, σ, a, b, $\mathcal{M}$, S⟩, (2) A set set of canonical generators $\mathcal{G}_{\mathcal{M},S}$ of $\mathcal{M}_S$, (3) A map Circuit as described by equation (1).

In the "End to end examples of using the framework" Section (Section 6) below, examples of the gate sets described by quaternion algebras (including Clifford+T and V basis) are given and items (1)-(3) are explicitly specified for each example. With this background, an example flow of an embodiment of the disclosed technology can be given in more detail.

Consider items 1302 and 1303 in FIG. 13. For simplicity, this discussion focuses on the case when set S consists of only one prime ideal. The input to item 1302 is $L_1, \varphi, \varepsilon$. The output of item 1302 is a quaternion q from $\mathcal{M}_S$ such that its cost is equal $L_1$ and $U_q$ is within distance ε from $R_z(\varphi)$. The fact that the target gate set $\mathcal{G}$ is described by quaternion algebra (Definition 2.3) immediately implies that $U_q$ can be expressed as a circuit over $\mathcal{G}$. Items 1303 and 1304 construct such a circuit. At item 1303, q is expressed as a product $q_1 \ldots q_n$ of elements of $\mathcal{G}_{\mathcal{M},S}^*$ and a scalar from F using an embodiment of the exact synthesis algorithm described in Vadym Kliuchnikov and Jon Yard, "A framework for exact synthesis," arXiv:1504.04350 (2015); U.S. Provisional Patent Application No. 62/146,182 filed on Apr.

10, 2015, and entitled "METHOD AND SYSTEM FOR QUANTUM CIRCUIT SYNTHESIS USING QUATERNION ALGEBRA"; and PCT International Application No. PCT/US2016/025958 filed on Apr. 5, 2016, and entitled "METHOD AND SYSTEM FOR QUANTUM CIRCUIT SYNTHESIS USING QUATERNION ALGEBRA". At item 1304, a circuit for $U_q$ over gate set $\mathcal{G}$ is found as a concatenation of circuits for each $q_k$.

The following paragraphs discuss item 1301 in more detail. To give some intuition, one can start with the Clifford+T gate set example (analyzed in more details in the "End to end examples of using the framework" Section (Section 6) below. In this case, set S contains precisely one prime ideal $\mathfrak{p}_1$ and $L_1$ is greater or equal to the T-count of the resulting circuit. To ensure that the approximation step succeeds, the input to the algorithm desirably satisfies inequality:

$L_1 \log(N(\mathfrak{p}_1)) \geq 4 \log(1/\varepsilon) + C_{min}$, where $N(\mathfrak{p}_1)$ is the norm of $\mathfrak{p}_1$.

This reproduces the result from Peter Selinger, "Efficient Clifford+T approximation of single-qubit operators," arXiv: 1212.6253 (December 2012) that the T-count scales as 4 $\log_2(1/\varepsilon) + C_{min}$ because $N(\mathfrak{p}_1)=2$ holds for the Clifford+T case. The bound also saturates the lower bound proved in that paper up to an additive constant. In this simple case, at item 1301 of FIG. 13, one just assigns $L_1 = \lceil (4 \log(1/\varepsilon) + C_{min})/\log(N(\mathfrak{p}_1)) \rceil$. In certain example implementations of the disclosed technology, constant $C_{min}$ is precomputed based on a quaternion gate set specification.

More generally, the cost vector $(L_1, \ldots, L_M)$ that is input to item 1302 desirably satisfies the following inequality:

$L_1 \log(N(\mathfrak{p}_1)) + \ldots + L_M \log(N(\mathfrak{p}_M)) \geq 4 \log(1/\varepsilon) + C_{min}$.

The length of the circuit output by the example embodiment is proportional to $L_1 + \ldots + L_M$ and therefore proportional to $\log(1/\varepsilon)$ which is up to multiplicative factor is the best possible. Cost optimality up to an additive constant is more subtle and is dependent on the choice of cost function and the gate set.

In some cases, one might not have very fine control of the cost of the output circuit using cost vector. In the worst case, the cost vector will allow one to control the cost of the output circuit up to multiplicative factor. In this situation, one can use the following strategy to improve the cost of output
- In Step 1 (item 1301 in FIG. 13) make a request for several cost vectors
- In Step 2 (item 1302 in FIG. 13), for each cost vector, request several quaternions that achieve required quality of approximation
- In Step 4 (item 1304 in FIG. 13) try to optimize final circuits using rewriting rules for gate set $\mathcal{G}$ and pick the ones with minimal cost. Rewriting rules for the gate set $\mathcal{G}$ can be obtained using an embodiment of the exact synthesis framework (see Vadym Kliuchnikov and Jon Yard, "A framework for exact synthesis," arXiv:1504.04350 (2015)); U.S. Provisional Patent Application No. 62/146,182 filed on Apr. 10, 2015, and entitled "METHOD AND SYSTEM FOR QUANTUM CIRCUIT SYNTHESIS USING QUATERNION ALGEBRA"; and PCT International Application No. PCT/US2016/025958 filed on Apr. 5, 2016, and entitled "METHOD AND SYSTEM FOR QUANTUM CIRCUIT SYNTHESIS USING QUATERNION ALGEBRA".

More formally, the problem being solved in item 1302 of FIG. 13 is the following:

Problem 2.4.

(Quaternion approximation problem, QAP). Given
1. A quaternion gate set specification $\langle F, \sigma, a, b, \mathcal{M}, S=\{\mathfrak{p}_1, \ldots, \mathfrak{p}_M\}\rangle$,
2. target angle $\varphi$
3. target precision $\varepsilon$
4. target cost vector $(L_1, \ldots, L_M)$ satisfying $L_1 \log N(\mathfrak{p}_1) + \ldots + L_M \log N(\mathfrak{p}_M) - 4 \log(1/\varepsilon) \in [C_{min}, C_{max}]$, where constants $C_{min}, C_{max}$ depend only on the quaternion gate set specification.
Find q from the generalized Lipschitz order (see the "generalized Lipschitz order" section) in quaternion algebra $\left(\frac{a, b}{F}\right)$ such that $nrd(q)\mathbb{Z}_F = \mathfrak{p}_1^{L_1} \ldots \mathfrak{p}_M^{L_M}$ and $\|R_z(\varphi) - U_q\| \leq \varepsilon$, where $\|U\| = \frac{1}{2}\sqrt{Tr(UU^\dagger)}$.

The polynomial time algorithm (in $\log(1/\varepsilon)$) for QAP provides a polynomial time algorithm for solving the unitary approximation problem for gate sets that can be described by totally quaternion algebra. The circuit for $U_q$ can be found in time polynomial in $L_1, \ldots, L_M$ using an embodiment of the exact synthesis algorithm from Vadym Kliuchnikov and Jon Yard, "A framework for exact synthesis," arXiv:1504.04350 (2015); U.S. Provisional Patent Application No. 62/146,182 filed on Apr. 10, 2015, and entitled "METHOD AND SYSTEM FOR QUANTUM CIRCUIT SYNTHESIS USING QUATERNION ALGEBRA"; or PCT International Application No. PCT/US2016/025958 filed on Apr. 5, 2016, and entitled "METHOD AND SYSTEM FOR QUANTUM CIRCUIT SYNTHESIS USING QUATERNION ALGEBRA". The cost of the resulting circuit is a linear function in $L_1, \ldots, L_M$ and therefore one can solve UAP with cost bound function that is in $8(\log(1/\varepsilon))$. Next, the basic definitions used to describe the details of the example embodiments are provided.

3. Basic Results and Definitions 3.1. Using Quaternions to Represent Unitaries.
Let F be a totally real number field of degree d. Let $\sigma_1, \ldots, \sigma_d$ be embeddings of F into $\mathbb{R}$. Let $\mathbb{Z}_F$ be a ring of integers of F. Let a, b be two totally negative elements of $\mathbb{Z}_F$. In other words for all $k=1, \ldots, d$ one has $\sigma_k(a) < 0$, $\sigma_k(b) < 0$. Now consider a quaternion algebra $Q = \left(\frac{a, b}{F}\right)$ given by $Q = \{a_0 + a_1 i + a_2 j + a_3 k : a_0, a_1, a_2, a_3 \in F\}$, where $i^2 = a$, $j^2 = b$ and $k = ij = -ji$. The fact that a, b are totally negative implies that Q is totally definite quaternion algebra. The conjugate of a quaternion $q = a_0 + a_1 i + a_2 j + a_3 k$ is defined as $q^* = a_0 - a_1 i - a_2 j - a_3 k$. The reduced norm nrd and reduced trace trd are defined as $nrd(q) = qq^*, trd(q) = q + q^*$ Let $\sigma=\sigma_1$ be a fixed embedding that one can use to construct unitaries out of quaternions. A homomorphism from quaternion algebra into the algebra of complex 2×2 matrices can be defined as follows:

$$h(q) = h(a_0 + a_1 i + a_2 j + a_3 k) \qquad (2)$$
$$\sigma(a_0)I + \sigma(a_1)\sqrt{\sigma(a)}\,Z + \sigma(a_2)\sqrt{\sigma(b)}\,Y + \sigma(a_3)\sqrt{-\sigma(b)\sigma(a)}\,X$$

Here I, X, Y, Z are the four Pauli matrices. Note that h has additional nice properties:

$$\det(h(q))=\sigma(nrd(q)), Tr(h(q))=\sigma(trd(q)).$$

To construct special unitaries out of quaternions, one can use the following mapping:

$$U(q) = \frac{h(q)}{\sqrt{\det(h(q))}} = \frac{h(q)}{\sqrt{\sigma(nrd(q))}} \qquad (3)$$

Note that for any non-zero a from F one has the following $$U(\alpha q) = \frac{\sigma(\alpha)}{|\sigma(\alpha)|} U(q) = \pm U(q).$$

Now consider the structure of image of U(q) in more detail. This structure can be expressed using a number field that can be embedded into Q. Let $K=F(\sqrt{a})$ be a totally imaginary extension of F of degree 2. Such number fields K are called CM fields. See, e.g., Lawrence C. Washington, "Introduction to Cyclotomic Fields," (Springer, 1982). This is ensured by the condition that $\sigma_k(a)<0$, $k=1, \ldots, d$. Let $\beta$ be an element of K such that $\beta^2-a=0$. The degree of the field K is 2d and there are 2d embeddings of K into $\mathbb{C}$. Each element of K can be represented as $a_0+a_1\beta$ where $a_0$ and $a_1$ are from F. One can define 2d embeddings of K into $\mathbb{C}$ as following:

$$\sigma_{k,+}(a_0+a_1\beta)=\sigma_k(a_0)+i\sigma_k(a_1)\sqrt{|\sigma_k(a)|}$$

$$\sigma_{k,-}(a_0+a_1\beta)=\sigma_k(a_0)-i\sigma_k(a_1)\sqrt{|\sigma_k(a)|}$$

Further, the notation $\sigma$ for $\sigma_{1,+}$ is used, which is in agreement with $\sigma=\sigma_1$ for elements of F because for $a_0$ from F one has $\sigma_{k,\pm}(a_0)=\sigma_k(a_0)$.

Each element of the quaternion algebra $$q=a_0+a_1i+a_2j+a_3k=(a_0+a_1i)+(a_2+a_3i)j$$

can be mapped to two elements of K in the following way:

$$e_1(q)=a_0+\beta a_1, e_2(q)=a_2+a_3. \qquad (4)$$

Conversely, the map $e_1^{-1}$ describes an embedding of K into quaternion algebra Q. Note that now homomorphism h(q) can be written as:

$$h(q) = \begin{pmatrix} \sigma(e_1(q)) & \sigma(e_2(q))\sqrt{|\sigma(b)|} \\ -\sigma(e_2(q))^*\sqrt{|\sigma(b)|} & \sigma(e_1(q))^* \end{pmatrix} \qquad (5)$$

Using this notation one also has:

$$\sigma(nrd(q))=|\sigma(e_1(q))|^2+|\sigma(b)||\sigma(e_2(q))|^2.$$

Or in other words, in terms of relative norm $N_{K/F}$ one has:

$$nrd(q)=N_{K/F}(e_1(q))-bN_{K/F}(e_2(q)).$$

For any CM field, one can define an automorphism $*:K \to K$ which is called complex conjugation and which has the following properties:

$$\sigma_{k,\pm}((a_0+a_1\beta)^*)=\sigma_{k,\pm}(a_0+a_1\beta)^*,$$

$$(a_0+a_1\beta)^*=a_0-a_1\beta.$$

Using it one can express the relative norm $N_{K/F}(x)=xx^*$ and see that $\sigma_k(N_{K/F}(x))=|\sigma_{k,\pm}(a_0+a_1\beta)|^2$. In addition one has that $$e_1(q)^*=e_1(q^*), e_1^{-1}(q)^*=e_1^{-1}(q^*).$$

3.2. Distance to $R_z$ Rotations.

Example distance functions that are used for unitaries in example embodiments include $$\rho(U,V) = \sqrt{1 - \frac{|Tr(UV^\dagger)|}{2}}, \quad d_2(U,V) = \frac{1}{2}\sqrt{Tr((U-V)(U-V)^\dagger)}. \qquad (6)$$

The notation for $R_z$ is the following:

$$R_z(\varphi) = e^{-\frac{i\varphi}{2}Z} = \begin{pmatrix} e^{-i\varphi/2} & 0 \\ 0 & e^{i\varphi/2} \end{pmatrix}. \qquad (7)$$

Now consider the distance between $R_z(\varphi)$ and unitary $U_q$ for a given quaternion q:

$$\rho(R_z(\varphi), U_q) = \rho\left(R_z(\varphi), \frac{h(q)}{R}\right).$$

where $R=\sqrt{\sigma(nrd(q))}$ and h(q) is defined by Equation 2. One can further rewrite this as:

$$\rho\left(R_z(\varphi), \frac{1}{R}\begin{pmatrix} z & -w^* \\ w & z^* \end{pmatrix}\right),$$

where $z=\sigma(e_1(q))$, $w=-\sigma(e_1(q))*\sqrt{|\sigma(b)|}$ and $|x|^2+|y|^2=R^2$. Now, one can solve the inequalities:

$$\rho\left(R_z(\varphi), \frac{1}{R}\begin{pmatrix} z & -w^* \\ w & z^* \end{pmatrix}\right) \le \varepsilon \qquad (8)$$

$$d_2\left(R_z(\varphi), \frac{1}{R}\begin{pmatrix} z & -w^* \\ w & z^* \end{pmatrix}\right) \le \varepsilon \qquad (9)$$

Inequalities above do not constrain w. Introducing $z_0=R(1-\varepsilon^2)e^{-i\varphi/2}$ inequality (8) simplifies to the following two inequalities:

$$Re((z-z_0)e^{i\varphi/2}) \ge 0 \text{ or } Re((z+z_0)e^{i\varphi/2}) \le 0,$$

and inequality (9) simplifies to $$Re((z-z_0)e^{i\varphi/2}) \ge 0.$$

In addition, the fact that $U_q$ is a unitary matrix implies that $|z| \le R$.

Figure 14:
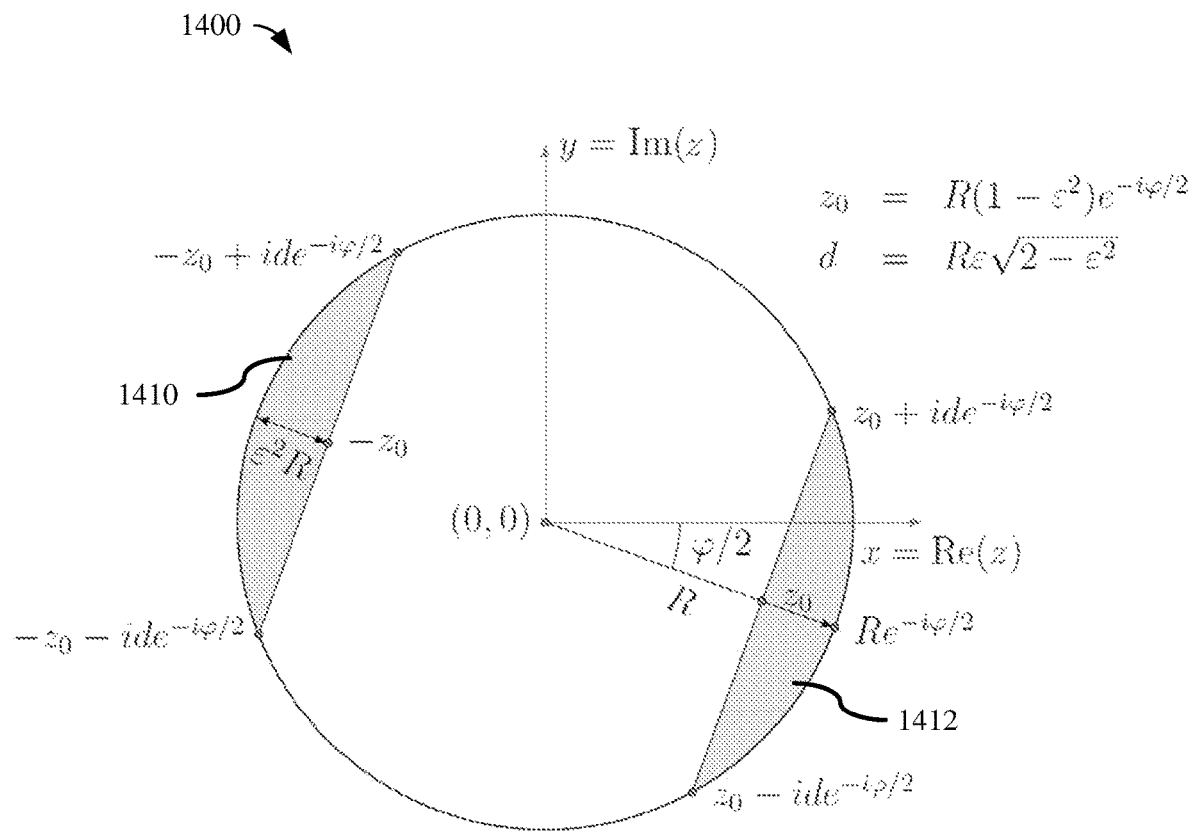
FIG. 14 is a visualization of the projection of the set used in examples of the RANDOM-INTEGER-POINT procedure discussed herein.

FIG. 14 is a visualization 1400 of the solution regions. The result can be summarized in the following proposition:
Proposition 3.1.
Let $q=e_1^{-1}(z_1)+e_2^{-1}(z_2)$ and let $\sigma_{1,+}(z_1)$ belong to the following set $$\{z\in\mathbb{C}:\text{Re}((z-z_0)e^{i\varphi/2})\geq 0, |z|\leq R\}$$

(region 1412 on FIG. 14) where $z_0=R(1-\varepsilon^2)e^{-i\varphi/2}$ and $R=\sqrt{\sigma_1(\text{nrd}(q))}$. Then $d_2(U_q, R_z(\varphi))\leq\varepsilon$ and $\rho(U_q, R_z(\varphi))\leq\varepsilon$.

More specifically, in FIG. 14, the colored regions 1410 (red region) and 1412 (blue region) correspond to complex numbers z that satisfy inequality (8) and $|z|\leq R$ given parameters $\varphi,\varepsilon,R$. The blue region 1412 corresponds to complex numbers z that satisfy inequality (9) and $|z|\leq R$. The vertical axis is Im(z) and the horizontal axis is Re(z).

3.3. Exact Synthesis Results for Totally Definite Quaternion Algebras.

Recall several definitions about rings, ideals, orders, and quaternions that are useful in studying a special case presented in Vadym Kliuchnikov and Jon Yard, "A framework for exact synthesis," arXiv:1504.04350 (2015), U.S. Provisional Patent Application No. 62/146,182 filed on Apr. 10, 2015, and entitled "METHOD AND SYSTEM FOR QUANTUM CIRCUIT SYNTHESIS USING QUATERNION ALGEBRA"; or PCT International Application No. PCT/US2016/025958 filed on Apr. 5, 2016, and entitled "METHOD AND SYSTEM FOR QUANTUM CIRCUIT SYNTHESIS USING QUATERNION ALGEBRA", namely the case of totally definite quaternion algebras. Here, Section 2 of Vadym Kliuchnikov and Jon Yard, "A framework for exact synthesis," arXiv:1504.04350 (2015) is followed. For further references to the literature and other facts used in the following, refer to the reference section of Vadym Kliuchnikov and Jon Yard, "A framework for exact synthesis," arXiv:1504.04350 (2015).

Let Q be a quaternion algebra over number field F (defined in Section 3.1). A $\mathbb{Z}_F$-lattice I is finitely generated $\mathbb{Z}_F$-submodule of Q such that F I=Q. In other words I has a full rank in Q. An order 0 is a $\mathbb{Z}_F$-lattice that is a subring of Q. An order is a maximal order if it is not properly contained in any other order. There is a right and left order associated with any $\mathbb{Z}_F$ lattice I defined as $$\mathcal{O}_R(I)=\{q\in Q: Iq\subset I\}, \mathcal{O}_L(I)=\{q\in Q: qI\subset I\}.$$

When one wants to emphasize that I has particular right and left order, one can call I right-$\mathcal{O}_R(I)$ fractional ideal or left-$\mathcal{O}_L(I)$ fractional ideal. A fractional right-$\mathcal{O}$ ideal is a normal ideal if the order $\mathcal{O}$ is a maximal order. Note that, order $\mathcal{O}_R(I)$ is maximal if and only if $\mathcal{O}_L(I)$ is maximal. All normal ideals are invertible. A normal ideal I is principal if $I=q\mathcal{O}_R I$ for some q from Q.

A normal ideal I is two sided $\mathcal{O}$-ideal if $\mathcal{O}_R(I)=\mathcal{O}_L(I)=\mathcal{O}$. The principal two sided $\mathcal{O}$-ideals form a subgroup of the group of all two sided $\mathcal{O}$-ideals (under multiplication). The quotient of the group of all two sided $\mathcal{O}$ ideals modulo principal two sided O-ideals is the two-sided ideal class group of $\mathcal{O}$. It is known that the two sided ideal class group of $\mathcal{O}$ is always finite. The two sided class number of Q is the size of the two-sided ideal class group of any maximal order of Q. It known that the size of two-sided ideal class group is independent on the choice of maximal order $\mathcal{O}$. Here, the special case of results from Vadym Kliuchnikov and Jon Yard, "A framework for exact synthesis," arXiv:1504.04350 (2015) are considered for totally definite quaternion algebras with two sided class number 1. The examples considered in this disclosure have this property.

Let $\text{disc}(q_1, \ldots, q_4)=\det(\text{trd}(q_i q_j)_{i,j=1,\ldots,4})$. The discriminant of an order $\mathcal{O}$ is $\mathbb{Z}_F$ ideal generated by the set
$$\{\text{disc}(q_1,\ldots,q_4): q_1,\ldots,q_4\in\mathcal{O}\}.$$

It turns out that the discriminant always is a square. Its square root is the reduced discriminant denoted by $\text{disc}(\mathcal{O})$. All maximal orders in quaternion algebra q has the same discriminant. The reduced norm of $\mathbb{Z}_F$ lattice I is ZF ideal nrd(I) generated by $\{\text{nrd}(q): q\in I\}$.

The unit group $\mathcal{O}^\times$ of $\mathcal{O}$ is $\{q\in\mathcal{O}: \text{nrd } q\in\mathbb{Z}_F^\times\}$ where $\mathbb{Z}_F^\times$ is a unit group of $\mathbb{Z}_F$. For orders in totally definite quaternion algebras, the quotient group $\mathcal{O}^\times/\mathbb{Z}_F^\times$ is always finite. The normalizer of order $\mathcal{O}$ is the set
$$\text{Normalizer}(\mathcal{O})=\{q\in\mathcal{O}: q\mathcal{O} q^{-1}=\mathcal{O}\}.$$

which is a monoid under multiplication. For totally definite quaternion algebras, the quotient Normalizer$(\mathcal{M})/\mathbb{Z}_F$ (considered as a quotient of two monoids) is finite similarly to $\mathcal{O}^\times/\mathbb{Z}_F$.

One can say that nrd(q) is supported on the set S of primes ideals of $\mathbb{Z}_F$ if:

$$\text{nrd}(q)\mathbb{Z}_F = \prod_{\mathfrak{p}\in S} \mathfrak{p}^{\nu(q,\mathfrak{p})} \qquad (10)$$

Also recall that map $T_2: F\to\mathbb{R}^+$ is defined as: $\mathbb{R}$ $$T_2(x) = \sum_{k=1}^{d} \sigma_k^2(x). \qquad (11)$$

Now all definitions are in place to state the special case of one of the main results of Vadym Kliuchnikov and Jon Yard, "A framework for exact synthesis," arXiv:1504.04350 (2015) (Theorem 3.18) for totally definite quaternion algebras with two sided class number 1.

Theorem 3.2.

Let Q be a totally definite quaternion algebra over totally real number field F with two sided class number one, let $\mathcal{M}$ be a maximal order in Q, let $S=(\mathfrak{p}_1,\ldots,\mathfrak{p}_M)$ be a finite set of prime ideals of $\mathbb{Z}_F$. There exists set $\text{gen}_S(\mathcal{M})$ such that every quaternion q from the set
$$\mathcal{M}_S=\{q\in\mathcal{M}:\text{nrd}(q)\text{ is supported on }S\}$$

can be written as the product $q_1\ldots q_n q_{rem}$ where $q_1,\ldots,q_n$ are from $\text{gen}_S(\mathcal{M})$ and $q_{rem}$ is from Normalizer$(\mathcal{M})$. If all ideals from S do not divide $\text{disc}(\mathcal{M})$ then $q_{rem}$ is from $\mathcal{M}^\times$.

There exist algorithms for deciding if the set $\text{gen}_S(\mathcal{M})$ is finite and computing it if this is the case. There is also an algorithm for finding factorization $q_1\ldots q_n q_r$ in time polynomial in log $T_2(\text{nrd}(q))$.

To find the factorization, one can do trial division of q by elements of $\text{gen}_S(\mathcal{M})$ and greedily reduce values $\nu(\mathfrak{p},q)$ in equation (10) on each step. A trial-division step can be performed until one is left with an element of Normalizer$(\mathcal{M})$. The map $U_q$ discussed in the "Using quaternions to represent unitaries" Section (Section 3.1) depends only on $q_r/F^x$ up to a sign, therefore there is only finitely many possible unitaries $U_{q_r}$. The canonical gate set corresponding to $\mathcal{M}_S$ is $$\mathbb{Z}\mathcal{M}_S^* = gen_S(\mathcal{M}) \cup Normalizer(\mathbb{Z})/\mathcal{M}_F \cup \{-1\}.$$

The main difficulty of the exact synthesis of quaternions and unitaries is computing $gen_S(\mathcal{M})$ such that described simple trial division algorithm works. Specific examples illustrating the above definitions are presented below in the "End to end examples of using the framework" Section below.

The canonical cost function for $U_q$ can be defined using $v(q, \mathfrak{p})$ (see Equation 10) as:

$$c_{canonical}(U_q) = \min_{q' \in \mathcal{M}_S : U_q = U_{q'}} cost(q'), \text{ where}$$

$$cost(q) = \sum_{\mathfrak{p} \in S, \mathfrak{p} \nmid disc(\mathcal{M})} v(q, \mathfrak{p})$$

As will be discussed in more detail in the "End to end examples of using the framework" Section (Section 6), the canonical cost function corresponds to the T-count for Clifford+T case and to the V-count for V-basis case. The cost vector $(L_1, \ldots, L_M)$ of quaternion q is equal to $(v(q, \mathfrak{p}_1), \ldots, v(q, \mathfrak{p}_M))$. Given the cost vector it is always possible to upper bound $C_{canonical}(U_q)$ as:

$$c_{canonical}(U_q) \leq cost(q) = \sum_{k=1,\ldots,M : \mathfrak{p}_k \nmid disc(\mathcal{M})} L_k.$$

For the decomposition $q = q_1 \ldots q_n q_r$ described in the Theorem 3.2 one has $cost(q) = \Sigma_{k=1}^n cost(q_k)$. This also implies that the length of the circuit corresponding to $U_q$ can be upper bounded by the function linear in cost vector $(L_1, \ldots, L_M)$.

3.4. Generalized Lipschitz Order.

The Lipschitz order L in the quaternion algebra $$\left(\frac{-1,-1}{\mathbb{Q}}\right)$$

can be expressed in the following way:

$$L = e_1^{-1}(\mathcal{M}[i]) + e_2^{-1}(\mathcal{M}[i]) = \mathcal{M} + \mathcal{M}i + \mathcal{M}j + \mathcal{M}k,$$

where $\mathcal{M}[i]$ is a maximal order of $\mathbb{Q}(\sqrt{-1})$. For the definition of $e_1, e_2$ see eq. (4) in the "Using quaternions to represent unitaries" Section (Section 3.1). This construction can be generalized to arbitrary totally definite quaternion algebra. Let $\mathcal{M}_K$ be a ring of integers of K. It is a two dimensional $\mathcal{M}_F$ module, therefore it has a $\mathcal{M}_F$ pseudo basis and can be written (in modified Hermite Normal Form), see Corollary 2.2.9 in Henri Cohen, "Advanced Topics in Computational Number Theory," Graduate Texts in Mathematics (Springer New York, 2000) as:

$$\mathcal{M}_K = \mathcal{M}_F + \gamma I$$

where I is integral $\mathcal{M}_F$ ideal and $\gamma$ an element of K such that 1, $\gamma$ is a F-basis of K.

The generalized Lipschitz order can be defined as:

$$L = e_1^{-1}(\mathcal{M}_K) + e_2^{-1}(\mathcal{M}_K)$$

$$L = \mathcal{M}_F + e_1^{-1}(\gamma)I + \mathcal{M}_Fj + e_1^{-1}(\gamma)jI \quad (12)$$

3.5. Lattices.

In the disclosure, lattices are used that are related a) to the ring of integers $\mathbb{Z}_K$ of CM field K, b) to ideals in $\mathbb{Z}_K$, and c) to the unit group of a the totally real subfield of F of K. Definitions related to integer lattices are briefly reviewed here. More detailed discussion of the definitions and related results can be found in Daniele Micciancio and Sha Goldwasser, "Complexity of lattice problems: a cryptographic perspective," volume 671 of Springer International Series in Engineering and Computer Science (Springer, 2002).

Let $B = \{b_1, \ldots, b_n\}$ be a set of linearly-independent vectors in $\mathbb{R}^m$, where $m \geq n$. The discrete group $\mathcal{L}(B) = B(\mathbb{Z}^n) = \mathbb{Z}b_1 + \ldots + \mathbb{Z}b_n$ is called the integer lattice of rank n with basis B. Let span $(\mathcal{L}) = \mathbb{R}\mathcal{L}$ be the real span of an n-dimensional lattice $\mathcal{L}$ and write span$(\mathcal{L}(B))$=span(B). A subset $\mathcal{F} \in \text{span}(\mathcal{L})$ is called a fundamental domain of the lattice $\mathcal{L}$ if for every vector $t \in \text{span}(\mathcal{L})$ there exists a unique lattice vector $v(t) \in \mathcal{L}$ such that $t - v(t) \in \mathcal{F}$. There are at least two different centrally-symmetric fundamental domains associated with each lattice basis. The centered fundamental parallelepiped C(B) associated to a lattice basis B is given by the inequalities $$C(B) = B[-\frac{1}{2}, \frac{1}{2})^n = \{Bx : -\frac{1}{2} \leq x_k < \frac{1}{2}, k = 1, \ldots, n\}.$$

The second fundamental domain is defined in terms of Gram-Schmidt orthogonalization (GSO) $B^* = [b_1^*, \ldots, b_n^*]$ of a lattice basis B:

$$b_1^* = b_1 \qquad (13)$$

$$b_i^* = b_i - \sum_{j<i} \mu_{i,j} b_j^*,$$

where the orthogonalization coefficients $\mu_{i,j}$ are defined as $$\mu_{i,j} = \langle b_i, b_j^* \rangle / \langle b_j^*, b_j^* \rangle.$$

Note that GSO of a lattice basis is not necessary a basis of $\mathcal{L}(B)$. It is related to the original basis via $$B = B^* \begin{pmatrix} 1 & & \mu_{ji} \\ & \ddots & \\ 0 & & 1 \end{pmatrix}.$$

The centered orthogonalized fundamental parallelepiped $C(B^*)$ associated to a lattice basis B is given by the inequalities $$C(B^*) = B^*[-\frac{1}{2}, \frac{1}{2})^n = \{B^*x : -\frac{1}{2} \leq x_k < \frac{1}{2}, k = 1, \ldots, n\}$$

where $B^*$ is the Gram-Schmidt orthogonalization of B.

For every integer lattice of rank $n > 1$, there are infinitely many choices of bases. Indeed, for any transformation $G \in GL_n(\mathbb{Z})$, the basis BG spans the same set of vectors over $\mathbb{Z}$ as the basis B. Here, $\langle x, y \rangle$ are used for the standard Euclidean inner product of vectors $x, y \in \mathbb{R}^m$, and $\|x\|$ for the corresponding norm. Reduced lattice bases obtained using the Lenstra-Lenstra-Lovasz (LLL) or Hermite-Korkine-Zolotaroff (HKZ) reduction algorithms allow one to ensure that the sizes of the above fundamental domains are essentially independent of an initial choice of basis, depending on only on the lattice determinant. See, e.g., Arjen K. Lenstra, Hendrik W. Lenstra, and Laszlo Lovasz, "Factoring polynomials with rational coefficients," Math. Ann., 261:515-534 (1982); Phong Q. Nguyen and Damien Stehle, "Floating-point LLL revisited," in 24th Annual International Conference on the Theory and Applications of Cryptographic Techniques (EUROCRYPT'05), pages 215-233 (2005).

Elements of $\mathbb{Z}_K$ correspond to 2d dimensional real vectors via map $$\sigma: \mathbb{Z}_K \to \mathbb{R}^{2d}$$

$$z \mapsto (\text{Re}(\sigma_{1,+}(z)), \text{Im}(\sigma_{1,+}(z)), \ldots, \text{Re}(\sigma_{1,+}(z)), \text{Im}(\sigma_{1,+}(z))).$$

The image $\mathcal{L}$ of $\mathbb{Z}_K$ under $\sigma$ is a 2d dimensional integer lattice with associated bilinear form given by $\text{Tr}_{K/\mathbb{Q}}(xy^*)$. Each integral basis of $\mathbb{Z}_K$ corresponds to the basis of $\mathcal{L}$. Similarly each $\mathbb{Z}_K$ ideal has $\mathbb{Z}$ basis. The images of $\mathbb{Z}_K$ ideals under map $\sigma$ correspond to a sublattices of $\mathcal{L}$. Determinant of $\mathcal{L}$ is equal to the discriminant of $\mathbb{Z}_F$.

4. Approximation Algorithm 4.1. High Level Description of the Algorithm.

In this section, a formal description of an exemplary embodiment for solving Problem 2.4 is given and for implementing item 1302 in FIG. 13. A description of the principles underlying the exemplary embodiment are also given. This section is organized as following: each procedure presented in the section is accompanied with the Theorem or Proposition that proves its correctness and bounds on the runtime. In the proofs of the theorems, reference is made to variables defined in the pseudo-code of the corresponding procedures. One of the goals of the remainder of this disclosure is to prove the following theorem:

Theorem 4.1.

There exist constants $C_{min}, C_{max}$ and an algorithm (the online part of the procedure APPROXIMATE, FIG. 1) that given
 quaternion gate set specification (see Definition 2.2),
 real numbers $\varphi$ and $\varepsilon \in (0, \frac{1}{2})$,
 cost vector $(L_1, \ldots, L_M)$,
such that
 narrow class of $\mathfrak{p}_1^{L_1} \cdot \ldots \cdot \mathfrak{p}_M^{L_M}$ is trivial and
 $L_1 \log(N(\mathfrak{p}_1)) + \ldots + L_M \log(N(\mathfrak{p}_M)) - 4 \log(1/\varepsilon) \in [C_{min}, C_{max}]$
finds quaternion q from the generalized Lipschitz order such that $\text{nrd}(q) \mathbb{Z}_F = \mathfrak{p}_1^{L_1} \cdot \ldots \cdot \mathfrak{p}_M^{L_M}$ and $d_2(U_q, R_z(\varphi)) \leq \varepsilon$. Constants $C_{min}, C_{max}$ depend only on the quaternion gate set specification and can be computed in advance (by the offline part of procedure APPROXIMATE, FIG. 1). The runtime of the algorithm is on average polynomial in $\log(1/\varepsilon)$ under the Conjecture 4.8.

Before looking at details of the algorithm on FIG. 1, the convention used for all pseudo-code shown in the paper is discussed. The example procedures have an offline and an online part. The offline part of the procedures can be executed once (e.g., only once) for a given quaternion gate set specification. Its input is denoted by words Fixed input. For example, for procedure APPROXIMATE the fixed input consists of the most part of quaternion gate set specification (see Definition 2.2) and technical parameter P related to the method for solving relative norm equation. The output of the offline part of the procedure is denoted by term Specification. For example, in the case of procedure APPROXIMATE, the output of the offline part is the additive constant defining the quality of approximation.

The online part of all procedures is executed for each instance of the approximation problem being solved. The instance of the problem is defined by angle $\varphi$, target precision $\varepsilon$ and target cost vector $(L_1, \ldots, L_M)$. These are the inputs for the online part of procedure APPROXIMATE. The input to the online part of each procedure is denoted by word Input. An online part of each procedure uses results of computations done in the offline part. Naturally, any offline part can not depend on the results of online computation. The output of online part of each procedure is denoted by word Output. In the complexity analysis discussed here, the primary concern is the online part and it will be shown that the online part of procedure APPROXIMATE has a polynomial runtime on average under a certain number theoretic conjecture. In the "End to end examples of using the framework" Section, the runtime of both online and offline parts is provided for some examples, demonstrating that the offline part is not prohibitively expensive for instances of the problem interesting for applications. Next, the online part of procedure APPROXIMATE is described in more detail.

The method (algorithm) shown on FIG. 1 finds a quaternion q from the generalized Lipschitz order that has two following properties:

(1) $d_2(U_q, R_z(\varphi)) \leq \varepsilon$, (2) $\text{nrd}(q) \mathbb{Z}_F = \mathfrak{p}_1^{L_1} \cdot \ldots \cdot \mathfrak{p}_M^{L_M}$.

As discussed in the "Generalized Lipschitz order" subsection, each quaternion q from the generalized Lipschitz order can be represented using two elements $z_1, z_2$ of the ring of integers $\mathbb{Z}_K$ of the CM-field K in the following way:

$$q = e_1^{-1}(z_1) + e_2^{-1}(z_2).$$

As discussed in the "Distance to $R_z$ rotations" Section, the distance $d_2(U_q, R_z(\varphi))$ depends only on $z_1$. For this reason, in the algorithm, $z_1$ (procedure RANDOM-INTEGER-POINT, line 9 in FIG. 1) is first picked such that condition (1) above is satisfied and then $z_2$ (procedure FAST-SOLVE-NORM-EQ, line 12 in FIG. 1) is found such that condition (2) is also satisfied.

Procedure FAST-SOLVE-NORM-EQ solves the relative norm equation $N_{K/F}(z_2) = z_2 \bar{z}_2 = e$ in the relative extension K/F for a special class of right hand sides e. There are two challenges related to this procedure. First, the solution does not always exist for arbitrary right hand side e. Second, solving the arbitrary instance of the norm equation (for fixed extension K/F) can be as hard as factoring. Both these challenges can be addressed. First, the necessary conditions on the right hand side e of the equation to be solvable are identified. Second, the set of right hand sides e for which the equation can be solved in probabilistic polynomial time (using procedure IS-EASILY-SOLVABLE, line 11, in FIG. 1) is identified and attempt(s) are made to solve the equation only for such right hand sides. The claim that example embodiments of the disclosed technology work in polynomial time is conditional on the conjecture that the procedure IS-EASILY-SOLVABLE returns true with probability $O(1/\log(1/\varepsilon))$. This conjecture is discussed in more detail in the "On the conjecture related to the approximation algorithm performance" Section (Section 4.5). For more details, see also the "Relative norm equations" Section (Section 5).

The necessary condition for the norm equation to be solvable is that for all embeddings $\sigma_k$ of F into $\mathbb{R}$ it must be the case that $\sigma_k(e) > 0$ (for $k = 1, \ldots, d$). Procedure RANDOM-INTEGER-POINT (line 9 in FIG. 1) returns $z_1$ such that these conditions are satisfied together with condition $d_2(U_q, R_z(\varphi)) \leq \varepsilon$. Recall, that one can associate an integer lattice $\mathbb{R}$ with $\mathbb{R}_K$ (see the "Lattices" Section (Section 3.5)). Essentially, procedure RANDOM-INTEGER-POINT samples lattice points from the following convex subset of $\mathcal{L}^{2d}$:

$$S_{r,\varphi,\varepsilon} = \{x \in \mathbb{R}^{2d} : \operatorname{Re}((x_1 + ix_2 - z_0^{r,\varphi,\varepsilon}) e^{-i\varphi/2}) \geq 0, |x_{2k} + ix_{2k+1}|^2 \leq \sigma_k(r)\} \quad (14)$$

where $z_0^{r,\varphi,\varepsilon} = \sqrt{\sigma_1(r)}(1-\varepsilon^2) e^{-i\varphi/2}$. See FIG. 14 for the visualization of the projection of the set above. The geometry of the set $S_{r,\varphi,\varepsilon}$ is determined by the reduced norm r of the quaternion output by procedure APPROXIMATE. One has freedom in choosing r up to a unit of $\mathbb{Z}_F$. It can then be used to find r such that one can sample lattice points from $S_{r,\varphi,\varepsilon}$ in time that is logarithmic in the volume of $S_{r,\varphi,\varepsilon}$. Such r is found by procedure SUITABLE-Q-NORM (line 6 in FIG. 1).

Before proceeding to the proof of Theorem 4.1, results that are proven later and used in the proof are presented.
Theorem 4.2.
There exist real numbers $p_0$, M and vectors $R^{min}, R^{max}$ from $(0, \infty)^d$ (computed in the offline part of RANDOM-INTEGER-POINT procedure, FIG. 2) such that for any real number $\varphi$, real number $\varepsilon \in (0, \frac{1}{2})$ and totally positive r from $\mathbb{Z}_F$ such that:

$$\sqrt{\sigma_1(r)} \varepsilon^2/4 \in [R_1^{min}, R_1^{max}], \sqrt{\sigma_k(r)} \in [R_k^{min}, R_k^{max}] \text{ for } k=2, \ldots, d$$

there is an element z from $\mathbb{Z}_F$ such that $\sigma(z)$ is in $S_{r,\varphi,\varepsilon}$ (see Equation (14)). Procedure RANDOM-INTEGER-POINT runs in time polynomial in $\log(1/\varepsilon)$ and returns each element of the set $$\operatorname{Cand}_{r,\varphi,\varepsilon} = \{z \in \mathbb{Z}_K : \sigma(z) \in S_{r,\varphi,\varepsilon}\} \quad (15)$$

with probability at least $p_0/|\operatorname{Cand}_{r,\varphi,\varepsilon}|$. The size of the set $\operatorname{Cand}_{r,\varphi,\varepsilon}$ belongs to the interval $$[2\sqrt{4-\varepsilon^2}/\varepsilon, (4\sqrt{4-4\varepsilon^2}/\varepsilon + 2)M]$$

The proof of Theorem 4.2 can be found in the "Solution region sampling" Section (Section 4.3).
Theorem 4.3.
Given vector $R^{min}$ from $(0, \infty)^d$, there exists constants $C_{min}, C_{max}$ and vector $R^{max}$ (computed by the offline part of SUITABLE-Q-NORM procedure, FIG. 3) such that for all non-negative integers $L_1, \ldots, L_M$ and a positive real number $\varepsilon \in (0, 1)$ satisfying:

$$L_1 \log N(\mathfrak{p}_1) + \ldots + L_M \log N(\mathfrak{p}_M) - 4 \log(1/\varepsilon) \in [C_{min}, C_{max}]$$

there is an algorithm that decides if narrow class number of ideal $\mathfrak{p}_1^{L_1} \cdot \ldots \cdot \mathfrak{p}_M^{L_M}$ is trivial. If this is the case, the algorithm outputs totally positive element r of $\mathbb{Z}_F$ such that $r\mathbb{Z}_F = \mathfrak{p}_1^{L_1} \cdot \ldots \cdot \mathfrak{p}_M^{L_M}$ and $$\sqrt{\sigma_1(r)} \varepsilon^2/4 \in [R_1^{min}, R_1^{max}], \sqrt{\sigma_k(r)} \in [R_k^{min}, R_k^{max}] \text{ for } k=2, \ldots, d$$

The algorithm runs in polynomial time in $\log(1/\varepsilon)$ (see online part of SUITABLE-Q-NORM procedure in FIG. 3).

The informal discussion and the proof of the Theorem 4.3 can be found in the "Picking a suitable quaternion norm" Section (Section 4.2).
Theorem 4.4.
Given totally positive element e of F, there exists an algorithm for testing if the instance of integral relative norm equation in K/F $$zz^* = e, z \in \mathbb{Z}_K$$

can be solved in polynomial time in $\log T_2(e)$ (procedure IS-EASILY-SOLVABLE, where $T_2(e) = \sum_{k=1}^d \sigma_k^2(e)$). If the test is passed, there exist another algorithm for deciding if the solution exists and finding it that runs in time polynomial in $\log T_2(e)$ (procedure FAST-SOLVE-NORM-EQ). Procedure IS-EASILY-SOLVABLE returns true for at least those cases when the ideal $e\mathbb{Z}_F$ is prime.
Proof of Theorem 4.1.
First, a proof is given that the output is correct. The norm of the quaternion q computed on line 15 (FIG. 1) is equal to totally positive element r of $\mathbb{Z}_F$ computed on line 6 (FIG. 1). This is because on line 12 (FIG. 1) one finds $z_2$ such that $r = \operatorname{nrd}(q) = |z_1|^2 - b|z_2|^2$. By Theorem 4.3 the output r of the procedure SUITABLE-Q-NORM (line 6, FIG. 1) satisfies $r\mathbb{Z}_F = \operatorname{nrd}(q)\mathbb{Z}_F = \mathfrak{p}_1^{L_1} \cdot \ldots \cdot \mathfrak{p}_M^{L_M}$. According to Theorem 4.2 procedure RANDOM-INTEGER-POINT (line 9, FIG. 1) returns an element $z_1$ of $\mathbb{Z}_K$ such that $$\operatorname{Re}((\sigma_{1,+}(z) - z_0) e^{-i\varphi/2}) \geq 0, |\sigma_{1,+}(z)| \leq \sqrt{\sigma_1(r)}$$

where $z_0 = \sqrt{\sigma_1(r)}(1-\varepsilon^2) e^{-i\varphi/2}$. According to Proposition 3.1 this implies that $d_2(R_z(\varphi), U_q) \leq \varepsilon$. Numbers $z_1, z_2$ are in $\mathbb{Z}_F$ which immediately implies that q is in generalized Lipschitz order.

Next, it is shown that the restrictions on inputs of all the procedures called within online part of procedure APPROXIMATE are satisfied. Procedure SUITABLE-Q-NORM (line 6, FIG. 1) always succeeds if the narrow class group of $\mathfrak{p}_1^{L_1} \cdot \ldots \cdot \mathfrak{p}_M^{L_M}$ is trivial and $$L_1 \log N(\mathfrak{p}_1) + \ldots + L_M \log N(\mathfrak{p}_M) - 4 \log(1/\varepsilon) \in [C_{min}, C_{max}],$$

which is required in the statement of the theorem. From Theorem 4.3 it is known that procedure SUITABLE-Q-NORM (line 6, FIG. 1) finds r such that:

$$\sqrt{\sigma_1(r)} \varepsilon^2/4 \in [R_1^{min}, R_1^{max}], \sqrt{\sigma_k(r)} \in [R_k^{min}, R_k^{max}] \text{ for } k=2, \ldots, d$$

therefore procedure RANDOM-INTEGER-POINT always succeeds. Now it is shown that $e = (r - z_1 z_1^*)/(-b)$ is totally positive, where b is the parameter from the definition of the quaternion algebra Q. Note that e being totally positive is required by procedures IS-EASILY-SOLVABLE (line 11, FIG. 1) and FAST-SOLVE-NORM-EQUATION (line 12, FIG. 1). For all $k=1, \ldots, d$ it the case that $$\sigma_k(e) = (\sigma_k(r) - |\sigma_{k,+}(z_1)|^2)/-\sigma_k(b).$$

By definition, b is totally negative and $\sigma_k(e) > 0$ if and only if $\sigma_k(r) - |\sigma_{k,+}(z_1)|^2 > 0$. By Theorem 4.2, the output of procedure RANDOM-INTEGER-POINT (line 9, FIG. 1) satisfies $|\sigma_{k,+}(z_1)| \leq R_k^{min}$ for $k=2, \ldots, d$. By Theorem 4.3 totally positive element r of $\mathbb{Z}_F$ satisfies $R_k^{min} \leq \sqrt{\sigma_k(r)}$ for $k=2, \ldots, d$ and therefore $\sigma_k(e) > 0$ for $k=2, \ldots, d$. It was already shown above that $|\sigma_{k,+}(z_1)| \leq \sqrt{\sigma_1(r)}$ which implies $\sigma_1(e) > 0$.

It remains to show that the example algorithm terminates and runs on average in time polynomial in $\log(1/\varepsilon)$. Procedure SUITABLE-Q-NORM (line 6, FIG. 1) runs in time polynomial in $\log(1/\varepsilon)$ by Theorem 4.3. Now it is shown that all procedures inside the loop run in polynomial time. Procedure RANDOM-INTEGER-POINT runs in polynomial time in $\log(1/\varepsilon)$ according to Theorem 4.2.

Next, it is shown that the logarithm of $$T_2(e) = \sum_{k=1}^d \sigma_k^2(e)$$

is bounded by polynomial in $\log(1/\varepsilon)$. This implies that procedures IS-EASILY-SOLVABLE and FAST-SOLVE-NORM-EQ run on average in polynomial time according to Theorem 4.4. Indeed, one has $\sigma_k(e) \leq \sigma_k(r)/\sigma_k(-b)$, $\sqrt{\sigma_1(r)}$ is bounded by $4R_1^{max}/\varepsilon^2$ and $\sqrt{\sigma_k(r)}$ are bounded by $R_k^{max}$ for $k=2, \ldots, d$. Finally, arithmetic in the number field (line 10, FIG. 1) can be done in time polynomial in $\log T_2(z_1)$ and $\log T_2(r) \cdot \log T_2(z_1)$ is also bound using inequalities $|\sigma_{k+1}(z_1)|^2 \leq \sigma_k(r)$. Also performed is the test $e \in \mathbb{Z}_F$ (line 11, FIG. 1). It can be performed in polynomial time in $\log T_2(r)$, because it can be reduced to multiplying a vector over $\mathbb{Q}$ with the norm bounded by $C \log T_2(r)$ by fixed matrix over $\mathbb{Q}$.

It can be concluded that procedure APPROXIMATE runs on average in time polynomial in $\log(1/\varepsilon)$ under the conjecture that the fraction of points in set $\{z \in \mathbb{Z}_K : \sigma(z) \in S_{r,\varphi,\varepsilon}\}$ for which one can reach line 12 (FIG. 1) and successfully find $z_2$ scales as $\Omega(\log(1/\varepsilon))$. This is because according to Theorem 4.2 all points from $\{z \in \mathbb{Z}_K : \sigma(z) \in S_{r,\varphi,\varepsilon}\}$ are sampled sufficiently uniformly.

4.2. Picking a Suitable Quaternion Norm.

In this subsection, the following theorem is proven:

Theorem 4.3.

Given vector $R^{min}$ from $(0, \infty)^d$, there exists constants $C_{min}, C_{max}$ and vector $R^{max}$ (computed by the offline part of SUITABLE-Q-NORM procedure, FIG. 3) such that for all non-negative integers $L_1, \ldots, L_M$ and a positive real number $\varepsilon \in (0, 1)$ satisfying:

$$L_1 \log N(\mathfrak{p}_1) + \ldots + L_M \log N(\mathfrak{p}_M) - 4 \log(1/\varepsilon) \in [C_{min}, C_{max}]$$

there is an algorithm that decides if narrow class number of ideal $\mathfrak{p}_1^{L_1} \cdot \ldots \cdot \mathfrak{p}_M^{L_M}$ is trivial. If this is the case, the algorithm outputs totally positive element r of $\mathbb{Z}_F$ such that $r\mathbb{Z}_F = \mathfrak{p}_1^{L_1} \cdot \ldots \cdot \mathfrak{p}_M^{L_M}$ and $$\sqrt{\sigma_1(r)}\varepsilon^2/4 \in [R_1^{min}, R_1^{max}], \sqrt{\sigma_k(r)} \in [R_k^{min}, R_k^{max}] \text{ for } k=2, \ldots, d$$

The algorithm runs in polynomial time in $\log(1/\varepsilon)$ (see online part of SUITABLE-Q-NORM procedure in FIG. 3).

The proof relies on the following proposition proven in this and the next sections.

Proposition 4.5.

Given non-negative integers $L_1, \ldots, L_M$ there is an algorithm (procedure TOTALLY-POS-GEN, FIG. 7) that decides if ideal $\mathfrak{p}_1^{L_1} \cdot \ldots \cdot \mathfrak{p}_M^{L_M}$ has a totally positive generator. The algorithm also finds a totally positive generator r of the ideal if it exists. The algorithm runs in time polynomial in $L_1, \ldots, L_M$ and $\log T_2(r)$ is bounded by the function that is linear in $L_1, \ldots, L_M$.

Proposition 4.6.

There exists real numbers $\delta_0$ and $\delta_1, \ldots, \delta_d$ (computed by the offline part of the procedure UNIT-ADJUST, FIG. 9) such that there exists an algorithm (online part of the procedure UNIT-ADJUST, FIG. 9) that for any real numbers $t_1, \ldots, t_d$ finds a unit u of $\mathbb{Z}_F$ such that the following inequalities hold $$|\log|\sigma_k(u)| - t_k| \leq \log \delta_k \text{ for } k=1, \ldots, d,$$

under the assumption that $|t_1 + \ldots + t_d| < \log \delta_0$. The runtime of the algorithm is bounded by a polynomial in $\|t\|$.

Proposition 4.7.

Given real numbers $\delta_0, \ldots, \delta_d > 1$, vector $R^{min}$ from $(0, \infty)^d$, and prime ideals $\mathfrak{p}_1, \ldots, \mathfrak{p}_M$ there exist real numbers $C_{min}, C_{max}$ and vector $R^{max}$ from $(0, \infty)^d$ (computed by the offline part of the procedure TARGET-SIZE, FIG. 8) such that there exist an algorithm (online part of the procedure TARGET-SIZE, FIG. 8) that given non-negative integers $L_1, \ldots, L_M$, real number $\varepsilon$ and totally positive element r of F finds real numbers $t_1, \ldots, t_d$ such that $$t_1 + \log(\sqrt{\sigma_1(r)}\varepsilon^2/4) \in [\log R_1^{min} + \log \delta_1, \log R_1^{max} - \log \delta_1]$$

$$t_k + \log \sqrt{\sigma_k(r)} \in [\log R_k^{min} + \log \delta_k, \log R_k^{max} - \log \delta_k],$$
$$k=2, \ldots, d$$

and $|t_1 + \ldots + t_d| < \log \delta_0$. The algorithm succeeds under the assumption that $L_1 \log N(\mathfrak{p}_1) + \ldots + L_M \log N(\mathfrak{p}_M) - 4 \log(1/\varepsilon) \in [C_{min}, C_{max}]$.

The runtime of the algorithm is bounded by a polynomial in $\log(1/\varepsilon)$ and $\log T_2(r)$. The norm $\|t\|$ is bounded by the function that is linear in the same variables.

Proof of Theorem 4.3.

First, it is proven that the procedure terminates in polynomial time in $L_1, \ldots, L_M$ when it returns FALSE. Indeed, when ideal $\mathfrak{p}_1^{L_1} \cdot \ldots \cdot \mathfrak{p}_M^{L_M}$ does not have a totally positive generator procedure TOTALLY-POS-GENERATOR returns FALSE and procedure SUITABLE-Q-NORM terminates (line 8, FIG. 3). According to Proposition 4.5 procedure TOTALLY-POS-GENERATOR runs in polynomial time in $L_1, \ldots, L_M$.

Next, the case when the output of SUITABLE-Q-NORM procedure is TRUE is considered. First, it is proven that the output of SUITABLE-Q-NORM procedure (FIG. 3) is correct in this case. By Proposition 4.5, algebraic integer r (line 6, FIG. 3) is totally positive and $r\mathbb{Z}_F = \mathfrak{p}_1^{L_1} \cdot \ldots \cdot \mathfrak{p}_M^{L_M}$. By Proposition 4.6, algebraic integer u (line 11, FIG. 3) is a unit. Therefore $ru^2$ is also totally positive and also generates ideal $\mathfrak{p}_1^{L_1} \cdot \ldots \cdot \mathfrak{p}_M^{L_M}$.

It remains to show that $\sigma_k(ru^2)$ satisfy required inequalities. By Proposition 4.6 unit u (line 11, FIG. 3) computed by procedure UNIT-ADJUST satisfies the following inequalities:

$$|\log|\sigma_k(u)| - t_k| \leq \log \delta_k, k=1, \ldots, d,$$

because by Proposition 4.7 procedure TARGET-SIZE ensures that $|t_1 + \ldots + t_d| < \log \delta_0$. Now, it can be seen that $$\log \sqrt{\sigma_k(ru^2)} - \log \sqrt{\sigma_k(r)} = \log|\sigma_k(u)| \in [t_k - \log \delta_k, t_k + \log \delta_k]$$

$$\log(\sqrt{\sigma_1(ru^2)}\varepsilon^2/4) - \log(\sqrt{\sigma_1(r)}\varepsilon^2/4) = \log|\sigma_1(u)| \in [t_1 - \log \delta_1, t_1 + \log \delta_1]$$

This immediately implies that $$\log \sqrt{\sigma_k(ru^2)} \in [\log R_k^{min}, \log R_k^{max}], \text{ for } k=2, \ldots, d$$

$$\log(\sqrt{\sigma_1(ru^2)}\varepsilon^2/4) \in [\log R_1^{min}, \log R_1^{max}]$$

It is now shown that the runtime of the algorithm is bounded by a polynomial in $\log(1/\varepsilon)$. All $L_k$ are bounded by function linear in $\log(1/\varepsilon)$. Procedure TOTALLY-POS-GENERATOR runs in polynomial time and produces r such that $\log T_2(r)$ is bounded by a function linear in $L_1, \ldots, L_M$. This ensures that procedure TARGET-SIZE outputs $t_1, \ldots, t_d$ such that their bit size is bounded by polynomial in $\log(1/\varepsilon)$. It also ensures that $\|t\|$ is bounded by a function linear in $\log(1/\varepsilon)$. This ensures that procedure UNIT-ADJUST runs in polynomial time. Note that for unit u (computed in line 11, FIG. 3) one has $$\log \sqrt{T_2(u)} = \log \sqrt{\sum_{k=1}^{d} \sigma_k^2(u)} \le \sqrt{d} \max_k \log|\sigma_k| \le$$

$$\sqrt{d} \max_k (t_k + \log \delta_k) \le \sqrt{d} (\|t\| + \max_k \log \delta_k.)$$

Therefore log $T_2(u)$ is bounded by a function linear in log(1/ε). Hence, the time spent on computing $ru^2$ is bounded by polynomial in log(1/ε). It has therefore been shown that procedure SUITABLE-Q-NORM runs in polynomial time.

Now, the procedure TOTALLY-POS-GENERATOR (FIG. 7) is discussed in more detail. Finding totally positive generator of the ideal is strictly more difficult than finding a generator of the ideal. The latter problem is known to be hard and there is no polynomial time algorithm known for it. Here, because the ideal of interest has special form $\mathfrak{p}_1^{L_1} \ldots \mathfrak{p}_m^{L_M}$ one can find a totally positive generator for it by precomputing certain information about $\mathfrak{p}_1, \ldots, \mathfrak{p}_m$ (in the offline part of TOTALLY-POS-GENERATOR procedure, FIG. 7). Now, the following proposition is proven: Proposition 4.5.

Given non-negative integers $L_1, \ldots, L_M$ there is an algorithm (procedure TOTALLY-POS-GEN, FIG. 7) that decides if ideal $\mathfrak{p}_1^{L_1} \cdot \ldots \cdot \mathfrak{p}_M^{L_M}$ has a totally positive generator. The algorithm also finds a totally positive generator r of the ideal if it exists. The algorithm runs in time polynomial in $L_1, \ldots, L_M$ and log $T_2(r)$ is bounded by the function that is linear in $L_1, \ldots, L_M$.

Proof.

First, the correctness of the online part of the algorithm is proven. It is not difficult to see that $$\mathfrak{p}_1^{L_1} \cdot \ldots \cdot \mathfrak{p}_M^{L_M} = (\mathfrak{p}_1^{N_1})^{s_1} \cdot \ldots$$
$$(\mathfrak{p}_M^{N_M})^{s_M} \mathfrak{p}_1^{l_1} \cdot \ldots \cdot \mathfrak{p}_M^{l_M}$$

One knows what each of ideals $\mathfrak{p}_k^{N_k}$ has totally positive generator. Therefore $\mathfrak{p}_1^{L_1} \cdot \ldots \cdot \mathfrak{p}_M^{L_M}$ has totally positive generator if and only if ideal $\mathfrak{p}_1^{l_1} \cdot \ldots \cdot \mathfrak{p}_M^{l_M}$ does. This is what is checked on line 11 in FIG. 7. It has been shown that the procedure always returns FALSE, when $\mathfrak{p}_1^{L_1} \cdot \ldots \cdot \mathfrak{p}_M^{L_M}$ does not have totally positive generator, and TRUE when it does. In the case when the procedure returns TRUE, $r[l_1, \ldots, l_k] \mathbb{Z}_F = \mathfrak{p}_1^{l_1} \cdot \ldots \cdot \mathfrak{p}_M^{l_M}$ and therefore $$\mathfrak{p}_1^{L_1} \cdot \ldots \cdot \mathfrak{p}_M^{L_M} = r_1^{s_1} \mathbb{Z}_F \cdot \ldots \cdot r_M^{s_M} \mathbb{Z}_F \cdot$$
$$r[l_1, \ldots, l_k] \mathbb{Z}_F$$

It can be seen that $r_1^{s_1} \ldots r_M^{s_M} r[l_1, \ldots, l_k]$ is a totally positive element of $\mathbb{Z}_F$ that generates ideal $\mathfrak{p}_1^{L_1} \cdot \ldots \cdot \mathfrak{p}_M^{L_M}$.

Now, it is shown that the algorithm runs in polynomial time. The number of multiplications to perform is bounded by $L_1 + \ldots + L_M$. Note that $$T_2(x_1 \cdot \ldots \cdot x_n) \le d \prod_{k=1}^{n} T_2(x_k), \text{ for } x_k \in F.$$

Therefore, each time a multiplication is performed, the value log $T_2$ of the arguments is bounded by a function linear in $L_1, \ldots, L_M$. It can be concluded that $r_1^{s_1} \ldots r_M^{s_M} r[l_1, \ldots, l_k]$ is computed in time polynomial in $L_1, \ldots, L_M$. The inequality above also implies that log $T_2$ of the algorithm is bounded by a function linear in $L_1, \ldots, L_M$.

It remains to show the correctness of the offline part of procedure. First, note that $N_k$ always exist. The fact that the class group of the number field is always finite implies that for each ideal $\mathfrak{p}_k$ there exists a number $N_k'$ (dividing the order of class group) such that ideal $\mathfrak{p}_k^{N_k'}$ is principal and has generator $\xi_k$. Note that $\xi_k^2$ is totally positive generator of $\mathfrak{p}_k^{2N_k'}$. It has been shown that $N_k \le 2N_k'$. Computing the order of the class group and testing if the ideal is principal are two standard problems solved in computational number theory. Checking that given ideal has a totally positive generator can also be done using standard methods. If totally positive generator r exists then the ratio of the ideal generator $\xi$ and r must be a unit. Therefore, once $\xi$ is known it remains to find unit u such that $\xi u$ is totally positive. This can be done if and only if $\xi \mathbb{Z}_F$ has a totally positive generator. It is not difficult to check this algorithmically, once the system of fundamental units of $\mathbb{Z}_F$ has been computed.

Note, that in case of Clifford+T and Clifford+$R_z(\pi/16)$ gate set the narrow class group of F is trivial and therefore any ideal has a totally positive generator. This significantly simplifies procedure TOTALLY-POS-GENERATOR.

On a high level, procedure TARGET-SIZE (FIG. 8) is about finding a solution to the system of linear inequalities for $t_1, \ldots, t_d$ mentioned in the statement of the Proposition 4.7. In the offline part, constant C that guarantees that the system has a solution is computed. In addition, it will be shown that the solution to such a system can be represented by numbers of moderate bit-size, can be found in polynomial time and that the norm of the solution vector is bounded. Now, the formal proof is presented.

Proposition 4.7.

Given real numbers $\delta_0, \ldots, \delta_d > 1$, vector $R^{min}$ from $(0, \infty)^d$, and prime ideals $\mathfrak{p}_1, \ldots, \mathfrak{p}_M$ there exist real numbers $C_{min}, C_{max}$ and vector $R^{max}$ from $(0, \infty)^d$ (computed by the offline part of the procedure TARGET-SIZE, FIG. 8) such that there exist an algorithm (online part of the procedure TARGET-SIZE, FIG. 8) that given non-negative integers $L_1, \ldots, L_M$, real number ε and totally positive element r of F finds real numbers $t_1, \ldots, t_d$ such that $$t_1 + \log(\sqrt{\sigma_k(r)}\varepsilon^2/4) \in [\log R_1^{min} + \log \delta_1, \log R_1^{max} - \log \delta_1]$$

$$t_k + \log \sqrt{\sigma_k(r)} \in [\log R_k^{min} + \log \delta_k, \log R_k^{max} - \log \delta_k],$$
$$k=2, \ldots, d$$

and $|t_1 + \ldots + t_d| < \log \delta_0$. The algorithm succeeds under the assumption that $L_1 \log N(\mathfrak{p}_1) + \ldots + L_M \log N(\mathfrak{p}_M) - 4 \log(1/\varepsilon) \in [C_{min}, C_{max}]$.

The runtime of the algorithm is bounded by a polynomial in log(1/ε) and log $T_2(r)$. The norm $\|t\|$ is bounded by the function that is linear in the same variables.

Proof.

First, the correctness of the procedure TARGET-SIZE (FIG. 8) is proven. On lines 6, 7 in FIG. 8, the smallest values for which the constraints on $t_k$ are satisfied are assigned to $t_k$. Next, it is shown that the choice of $C_{min}$, $C_{max}$ and $R^{max}$ ensures that all other constraints are also satisfied. Indeed, $R_k^{max} \ge R_k^{min} + 2 \log \delta_k$ therefore intervals for $t_k$ are non-empty. It remains to show that $|t_1 + \ldots + t_d| \le \delta_0$. This follows from the following equalities:

$$t_1 + \ldots + t_d = \sum_{k=1}^{d} \log R_k^{min} + \sum_{k=1}^{d} \log \delta_k - \log(\sqrt{N_{F/Q}(r)} \varepsilon^2/4)$$

$$= C_{min}/2 - \frac{1}{2}\sum_{k=1}^{M} L_k \log N(p_k) + 2\log(1/\varepsilon)$$

Therefore value $t_1 + \ldots + t_d$ belongs to the interval $[(C_{min} - C_{max})/2, 0]$. The definition of $C_{max}$ precisely implies that $[(C_{min} - C_{max})/2, 0] = [-\log \delta_0, 0]$ which gives required bound on the sum of $t_k$. Note that the analysis above performed for $t_k$ will hold for any $t_k'$ in the interval $[t_k, t_k + \log \delta_0/d]$.

Parameter $\log \delta_0$ is needed to account for the finite precision arithmetic used. It is not difficult to see that as soon as precision of arithmetic used is smaller then $\log \delta_0/C_1 d$ for sufficiently big fixed constant $C_1$ numbers $t_k$ computed within mentioned precision will satisfy all required constraints. It is sufficient to perform the calculation up to fixed precision independent on the online part of the algorithm input. This implies that all calculations in the online part can be performed in polynomial time. Also note that $t_k$ are bounded by functions linear in $\log T_2(r)$ and $\log(1/\varepsilon)$ and therefore the same is true for $\|t\|$. As it has been established that $t_k$ can be computed up to fixed precision, bound on $\|t\|$ implies a bound on the number of bits needed to specify each $t_k$. This concludes the proof.

4.3. Solution Region Sampling.

In this subsection, the Theorems 4.2 used in the proof of Theorem 4.1 in Section 4.1 are proven:

Theorem 4.2.

There exist real numbers $p_0$, M and vectors $R^{min}, R^{max}$ from $(0, \infty)^d$ (computed in the offline part of RANDOM-INTEGER-POINT procedure, FIG. 2) such that for any real number $\varphi$, real number $\varepsilon \in (0, \frac{1}{2})$ and totally positive r from $\mathbb{Z}_F$ such that:

$$\sqrt{\sigma_1(r)}\varepsilon^2/4 \in [R_1^{min}, R_1^{max}], \sqrt{\sigma_k(r)} \in [R_k^{min}, R_k^{max}] \text{ for } k=2,\ldots,d$$

there is an element z from $\mathbb{Z}_F$ such that $\sigma(z)$ is in $S_{r,\varphi,\varepsilon}$ (see Equation (14)). Procedure RANDOM-INTEGER-POINT runs in time polynomial in $\log(1/\varepsilon)$ and returns each element of the set $$\text{Cand}_{r,\varphi,\varepsilon} = \{z \in \mathbb{Z}_K : \sigma(z) \in S_{r,\varphi,\varepsilon}\} \quad (15)$$

with probability at least $p_0/|\text{Cand}_{r,\varphi,\varepsilon}|$. The size of the set $\text{Cand}_{r,\varphi,\varepsilon}$ belongs to the interval $$[2\sqrt{4-\varepsilon^2}/\varepsilon, (4\sqrt{4-4\varepsilon^2}/\varepsilon + 2)M]$$

Proof.

The procedure returns points from the set $\text{Cand}_{r,\varphi,\varepsilon}$ because on line 21 in FIG. 2, z is selected such that $\sigma(z) \in S_{r,\varphi,\varepsilon}$ (see Equation (15)). It is now shown that the procedure terminates, on average, after a fixed number of loop iterations. The probability $p_{Cand}$ of variable Sample-found being TRUE ca be estimated (see line 21 in FIG. 2). The number of the main loop iterations of RANDOM-INTEGER-POINT procedure has a geometric distribution with parameter $p_{Cand}$. Now consider lower bound $p_{Cand}$. Let $H' = R\varepsilon\sqrt{4-\varepsilon^2}$ (see FIG. C). When the absolute value of N (on line 16 in FIG. 2) is less then $\lceil H'/(\varepsilon^2 R) \rceil - 1$ (see FIG. 15) the shifted fundamental region t+C(B) is a subset of $S_{r,\varphi,\varepsilon}$ (note that t is computed on line 17 in FIG. 2 based on N). In the case if z'=0 (line 19 in FIG. 2) inclusion $t+C(B) \subset S_{r,\varphi,\varepsilon}$ implies that $\sigma(z)$ is in $S_{r,\varphi,\varepsilon}$. The probability of z'=0 is equal to 1/|SHIFTS| (see line 6 in FIG. 2). For this reason one can lower bound $p_{Cand}$ as:

$$p_{Cand} \geq \frac{2\lceil H'/(\varepsilon^2 R) \rceil - 1}{2\lceil H'/(\varepsilon^2 R) \rceil + 1} \cdot \frac{1}{|\text{SHIFTS}|} \geq \frac{H'/H - 2(\varepsilon^2 R/2H)}{1 + 2(\varepsilon^2 R/2H)} \cdot \frac{1}{|\text{SHIFTS}|}$$

It is noted that $H'/H = \sqrt{4-\varepsilon^2}/(2\sqrt{4-4\varepsilon^2}) \in (\frac{1}{2}, 1/\sqrt{3})$ and $(\varepsilon^2 R/2H') = /(4\sqrt{4-4\varepsilon^2})$ $(0, 1/(8\sqrt{3}))$. The constraint $\varepsilon \in (0, \frac{1}{2})$ implies that $P_{Cand}$ is lower bounded by constant independent on the input to the online part of RANDOM-INTEGER-POINT procedure.

Figure 15:
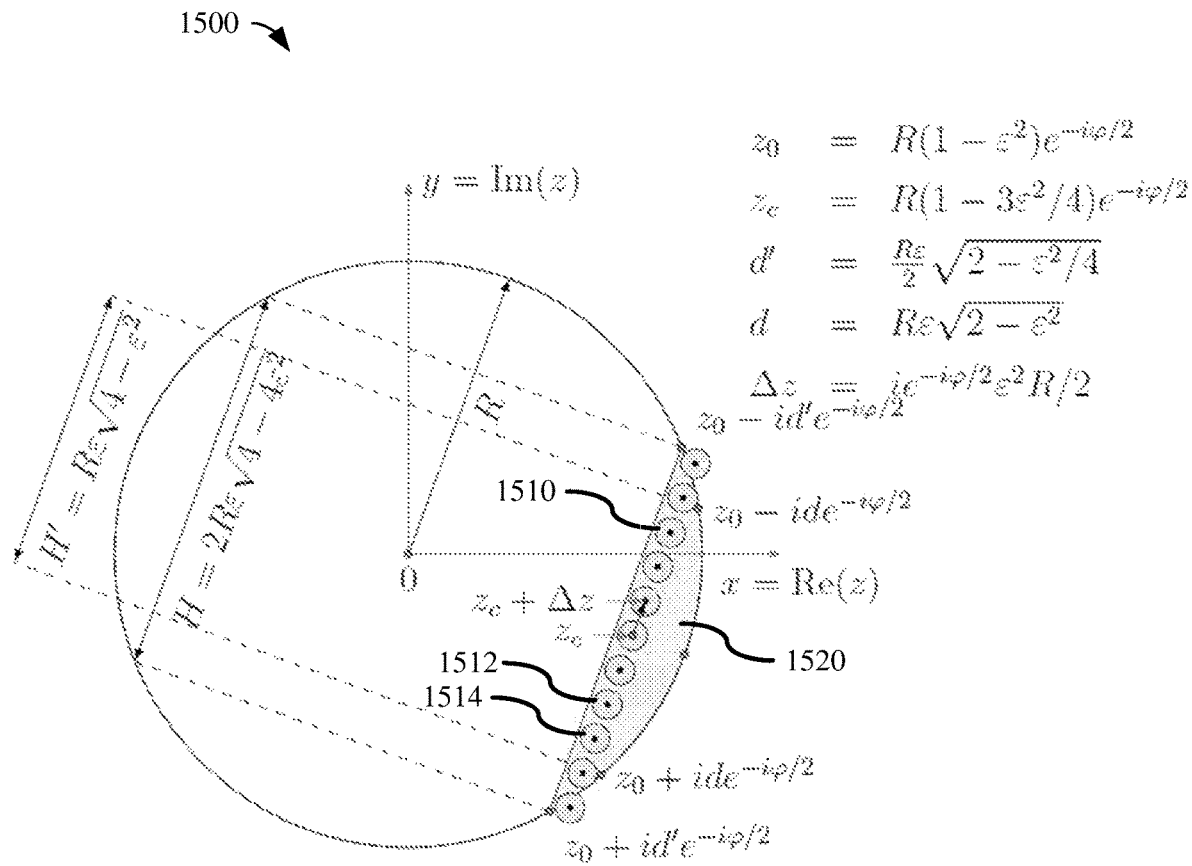
FIG. 15 is a visualization of the sampling scheme used in examples of the RANDOM-INTEGER-POINT procedure discussed herein.

FIG. 15 is an illustration 1500 of the sampling scheme. The vertical axis is Im(z) and the horizontal axis is Re(z). Small blue circles (e.g., circles 1510, 1512, 1514) have radius $R_1^{min}$. During the example sampling procedure, the center of a possible blue circle is picked at random. Then the sampling procedure finds point $\Sigma_k m_k z_k$ (see FIG. 2) from $\mathbb{Z}_K$ such that $\sigma_{1,+}(\Sigma_k m_k z_k)$ is in blue circle. Next sampling procedure computes z by adding randomly picked shift z' to $\Sigma_k m_k z_k$ and checks if $\sigma(z)$ is in $S_{r,\varphi,\varepsilon}$. The set $P_1 S_{r,\varphi,\varepsilon}$ is a blue circle segment 1520 as illustrated in FIG. 15.

It has been shown that the online part of the example procedure comprises a fixed number of arithmetic operations on average. To show that the procedure runs in polynomial time, it is sufficient to show that the absolute value of the logarithm of absolute precision required for the computation is bounded by a polynomial in $\log(1/\varepsilon)$. Consider line 18 in FIG. 2 in more detail. Let $(B^{-1})'$ be an approximation to $B^{-1}$ to within precision $\delta_c$ and let t' be an approximation to t within precision $\delta_c$ and let $m' = (B^{-1})'t'$. Now it will be shown that the norm of the projection of Bm'–t' can also be bounded in terms of $R_k^{min}$. For convenience, let $P_k$ be a projector on the subspace spanned by $e_{2k-1}, e_{2k}$.

$$\|P_k(Bm'-t)\| \leq \|t-t'\| + \|P_k B[(B^{-1})'t'] - (B^{-1})'t')\| + \|t'\| \\ B(B^{-1})' - I\|$$

Now it can be seen that $\|t-t'\|$ is bounded by $\delta_c$, the second term in the sum above is bounded by $R_k^{min}$ and the third term is bounded by some fixed constant times $\delta_c\|t'\|$. This implies that one can find m' such that $\|P_k(Bm'-t)\| \leq R_k^{min} + \delta_c'$. The absolute value of the logarithm of absolute precision required for the computation is bounded by polynomial in $\log(1/\varepsilon)$ and $\log(1/\delta_c')$ because $\log\|t'\|$ is bounded by polynomial in $\log(1/\varepsilon)$. This is sufficient for purposes of this discussion because it is sufficient to choose $\log(1/\delta_c')$ to be of order $\log\|t'\|$.

It remains to show that the procedure can get every point from $\text{Cand}_{r,\varphi,\varepsilon}$ with probability at least $p_0/|\text{Cand}_{r,\varphi,\varepsilon}|$. First, some notation is introduced for the proof. Let $\xi_N$ be a random variable corresponding to N (line 16 in FIG. 2), $\xi_{z'}$ be a random variable corresponding z' (line 19 in FIG. 2) and $\xi_z$ be a random variable corresponding to value z computed on line 20 in FIG. 2. Random variable $\xi_z$ is a function of $\xi_N$ and $\xi_{z'}$. Random variable $\xi_N$ takes integer values in the range $[-N_{max}, N_{max}]$ with equal probability and $\xi_{z'}$ takes values in the finite set SHIFTS also with equal probability. Variables $\xi_{z'}$ and $\xi_N$ are independent. Let $z_0$ be a fixed element of $\text{Cand}_{r,\varphi,\varepsilon}$. It is sufficient to lower bound $P(\xi_z=z_0)$ because the probability of the output of RANDOM-REGION-CENTER being $z_0$ is $P(\xi_z=z_0)/P(\xi \in \text{Cand}_{r,\varphi,\varepsilon})$. Given $z_0$ there are unique values of N (line 16), m (line 18) and t (line 17), denoted as $N_0$, $m^0$ and $t_0$, such that $\sigma(z_0)$ is in $$S_{r,\varphi,\varepsilon} \cap \{x \in \mathbb{R}^{2d}: \langle x - t_0, \Delta Z \rangle \in (-\frac{1}{2}, \frac{1}{2}]\}.$$

The equality $$P(\xi_z = z_0) = P(\xi_z = z_0/\xi_N = N_0)P(\xi_N = N_0) = \frac{P(\xi_z = z_0/\xi_N = N_0)}{2N_{max}+1}$$

implies that it is sufficient to lower bound $P(\xi z=z_0/\xi_N=N_0)$ and relate $2N_{max}+1$ to the size of $\text{Cand}_{r,\varphi,\varepsilon}$. Note that $P(\xi_z=z_0/\xi_N=N_0)=P(z_0=\xi_z'+\Sigma_k\ m_k^0 z_k)$. This implies that $P(\xi_z=z_0/\xi_N=N_0)$ is $1/|\text{SHIFTS}|$ if $z_0-\Sigma_k m_k^0 z_k$ belongs to set SHIFTS. It is now shown that $z_0-\rho_k m_k z_k$ is always in SHIFTS. It is sufficient to show that $$\left\|P_k\left(\sigma(z_0) - \sigma\left(\sum_k m_k^0 z_k\right)\right)\right\| = \|P_k(\sigma(z_0) - Bm^0)\| \le R_k^{max} + R_k^{min} \text{ for}$$

$k = 2, \ldots, d$ $$\|P_1(\sigma(z_0) - Bm^0)\| \le 2\sqrt{5}\, R_1^{max}$$

It is useful to note that $\|P_k(\sigma(z_0)-Bm^0)\| \le \|P_k(\sigma(z_0)-t_0)\| + \|P_k(t_0-Bm^0)\| \le \|P_k(\sigma(z_0)-t_0)\| + R_k^{min}$ The fact that $\sigma(z_0)$ is in $S_{r,\varphi,\varepsilon} \cap \{x \in \mathbb{R}^{2d}:\langle \Delta Z\rangle \in (-\frac{1}{2},\frac{1}{2}]\}$ implies that $\|P_k(\sigma(z_0)-t_0)\| \le \sqrt{\sigma_k(r)} \le R_k^{max}$ for $k=2,\ldots,d$.

To establish bound on $\|P_1(\sigma(z_0)-Bm^0)\|$, observe that $P_1\sigma(z_0)$ and $P_1 Bm^0$ both belong to a set with the diameter $\sqrt{5}\varepsilon^2 R/2$. It has also been shown that:

$\text{Cand}_{r,\varphi,\varepsilon} \subset \text{SHIFTS}+\{\sigma^{-1}(B[B^{-1}(Z_c+N\Delta Z)]):N\in[-N_{max},N_{max}]\}$ Finally, note that:

$\{z \in \mathbb{Z}_K : \sigma(z) \in Z_c+N\Delta Z+C(B), |N| \le \lfloor H'/(\varepsilon^2 R)\rfloor -1, N \in \mathbb{Z}\} \subset \text{Cand}_{r,\varphi,\varepsilon}.$ This implies that if $\text{Cand}_{r,\varphi,\varepsilon}$ is non-empty, one has:

$$\frac{|\text{Cand}_{r,\varphi,\varepsilon}|}{2N_{max}+1} \ge \frac{|\text{Cand}_{r,\varphi,\varepsilon}|}{2H/(\varepsilon^2 R)+2} \ge$$

$$\frac{|\text{Cand}_{r,\varphi,\varepsilon}|}{\frac{H}{H'}(2\lceil H'/(\varepsilon^2 R)\rceil+1)+2} \ge \frac{|\text{Cand}_{r,\varphi,\varepsilon}|}{6+2|\text{Cand}_{r,\varphi,\varepsilon}|} \ge \frac{1}{8}$$

It can be concluded that $$P(\xi_z = z_0) \ge \frac{1}{|\text{Cand}_{r,\varphi,\varepsilon}|} \cdot p_0,$$

where $P_0$ is $$\frac{1}{8|\text{SHIFTS}|}.$$

Above derivation also gives the required bounds on the size of $\text{Cand}_{r,\varphi,\varepsilon}$.

4.3.1. Implementation Aspects.

In practice, example implementations of the disclosed technology are looking for the best possible value (or other favorable values) of the additive constants $C_{min}, C_{max}$ in Theorem 4.1 while maintaining the polynomial runtime of the online part of the algorithm. Section 8 explains in detail the version of the procedure used in the example implementations used herein to obtain the numerical results reported below (Section 6). In practice, the Nearest Plane Algorithm can be used. See Laszlo Babai, "On Lovasz lattice reduction and the nearest lattice point problem," Combinatiorica, 6(1):1-13 (1986). It is also possible to show that $R_k^{min}$ can be chosen to be based on $C(B^*)$, not based on $C(B)$. One can ensure that the basis used is Hermite-Korkine-Zolotarev reduced which makes it possible to guarantee that $R_k^{min}$ are bounded by some functions of discriminant of $\mathbb{Z}_K$ and these bounds are independent of the choice of the basis of $\mathbb{Z}_K$. See Guillaume Hanrot and Damien Stehle, "Improved analysis of kannan's shortest lattice vector algorithm" in Alfred Menezes, editor, Advances in Cryptology—CRYPTO 2007, volume 4622 of Lecture Notes in Computer Science, pages 170-186 (Springer Berlin Heidelberg, 2007); Ravi Kannan, "Improved algorithms for integer programming and related lattice problems", In Proceedings of the Fifteenth Annual ACM Symposium on Theory of Computing, STOC '83, pages 193-206 (New York, N.Y., USA, 1983, ACM); and Phong Q Nguyen and Damien Stehle, "Low-dimensional lattice basis reduction revisited," 3076:338-357 (2004). A simpler version of the sampling procedure is also used in particular example implementations. The simpler version does not ensure that the distribution of procedure outcomes is close to uniform, but works well in practice.

4.4. Multiplicative Approximation Using Unit Group.

In this section, the following proposition is proven:

Proposition 4.6.

There exists real numbers $\delta_0$ and $\delta_1, \ldots, \delta_d$ (computed by the offline part of the procedure UNIT-ADJUST, FIG. 9) such that there exists an algorithm (online part of the procedure UNIT-ADJUST, FIG. 9) that for any real numbers $t_1, \ldots, t_d$ finds a unit u of $\mathbb{Z}_F$ such that the following inequalities hold $|\log|\sigma_k(u)|-t_k| \le \log\delta_k$ for $k=1,\ldots,d$, under the assumption that $|t_1+\ldots+t_d|<\log\delta_0$. The runtime of the algorithm is bounded by a polynomial in $\|t\|$.

The offline part of procedure UNIT-ADJUST computes a system of fundamental units $u_1, \ldots, u_{d-1} \in \mathbb{Z}_F^\times$ and outputs $$\delta_k = \delta_0 \sqrt{\prod_{j=1}^{d-1} \max\{|\sigma_k(u_j)|, |\sigma_k(u_j^{-1})|\}}$$

for $k=1, \ldots, d$, where $\delta_0 > 1$ is some fixed constant.

When called with a target vector $t \in \mathbb{R}^d$ satisfying $|(t, 1_d)|<\log\delta_0$, the online part of UNIT-ADJUST simply rounds off t in the basis $$B = \begin{pmatrix} \log|\sigma_1(u_1)| & \ldots & \log|\sigma_1(u_{d-1})| & 2\log\delta_0 \\ \vdots & & \vdots & \vdots \\ \log|\sigma_d(u_1)| & \ldots & \log|\sigma_d(u_{d-1})| & 2\log\delta_0 \end{pmatrix}$$

to the lattice vector Bm, where $m=\lceil B^{-1}t\rfloor \in \mathbb{Z}^d$. Then it returns the unit $u=u_1^{m_1} \ldots u_{d-1}^{m_{d-1}}$.

Proof that UNIT-ADJUST is Correct.

Because Bm is the unique lattice vector contained in the shifted parallelepiped $t+C(B)$, the following inequalities hold for $k=1, \ldots, d$:

$$|(Bm)_k - t_k| \le \max\{x_k : x \in C(B)\} = \frac{1}{2}\max_{y \in \{\pm 1\}^d}(By)_k$$

-continued $$= \log \delta_0 + \frac{1}{2}\sum_{j=1}^{d-1} |\log(|\sigma_k(u_j)|)|$$

$$= \log \delta_k,$$

It is also worth noting the above shows that $$C(B) \subset [-\log \delta_1, \log \delta_1] \times \ldots \times [-\log \delta_d, \log \delta_d]$$

and $\|Bm-t\|_B \le 1$, where $\|x\|_B := \inf\{y>0 : x \in C(B)y\}$.

Now it is shown that the running time is a polynomial in $\|t\|$ and in the number of bits used to specify $t_k$ Proof that UNIT-ADJUST Runs in Polynomial Time.

Suppose that the $t_k$ are given with n bits of precision. Then they can be specified using $O(n+\log|t_k|)$ bits as $t_k = \pm 2^{l-n}s$, where $l = \lceil \log_2|t_k| \rceil$ and $s \in \{0, \ldots, 2^{n-1}\}$ is an n-bit integer. First, observe that because the number field is fixed and $\delta_0 > 1$ is an arbitrary fixed constant, the inverse $B^{-1}$ can be pre-computed to sufficiently high precision and stored during the offline part. The vector m can therefore be computed in polynomial time. Also note that its norm is bounded by a polynomial in $\|t\|$. Indeed, $$\|m\| \le \|m - B^{-1}t\| + \|B^{-1}t\| \le \frac{\sqrt{d}}{2} + \lambda_{min}(B)^{-1}\|t\| \le O(\|t\|).$$

This further implies that each $|m_i| \le O(\|t\|)$, so that the output unit $u = u_1^{m_1} \ldots u_{d-1}^{m_{d-1}}$ can be computed by polynomially-many multiplications of the fundamental units $u_i$. Therefore, $$\log\|u\| = O(|m_1|\log\|u_1\| + \ldots + |m_d|\log\|u_d\|) = O(\text{poly}(\|t\|, \|u_1\|, \ldots, \|u_d\|)),$$

implying that the output unit can indeed be computed in polynomial time.

4.4.1. Implementation Aspects.

For proving that the algorithm runs in polynomial time, it is sufficient to show that $\delta_k$ are fixed numbers for a given quaternionic gate set specification. It does not in principal matter how big they are. However, one can see that the additive constant $C_{min}$ in Theorem 4.1 depends on values of $\delta_k$. When implementing examples of the algorithm in practice, the aim can be to achieve the smallest possible (or favorably small) constant $C_{min}$ while maintaining good performance. For this reason, the Nearest Plane Algorithm is used instead of the simple round off procedure shown in FIG. 9. The Nearest Plane Algorithm has runtime that is polynomial in dimension of the lattice and bit sizes of the entries of vectors involved in the computation. In Section 8, the pseudo-code for an example variant of the UNIT-ADJUST procedure that has been used in practice is shown. The precision and complexity analysis above can be extended to this more practical approach. For a further analysis of the Nearest Plane Algorithm, see Phong Q. Nguyen and Damien Stehle, "An LLL algorithm with quadratic complexity," SIAM Journal on Computing, 39(3): 874-903 (2009).

The results of applying the Nearest Plane Algorithm depends on the quality of the basis used with it. In practice, and in accordance with certain example implementations, a Hermite-Korkine-Zolotarev or LLL reduction is applied to the unit lattice basis during the offline step of the algorithm. See Guillaume Hanrot and Damien Stehle, "Improved analysis of kannan's shortest lattice vector algorithm" in Alfred Menezes, editor, Advances in Cryptology—CRYPTO 2007, volume 4622 of Lecture Notes in Computer Science, pages 170-186 (Springer Berlin Heidelberg, 2007); Ravi Kannan, "Improved algorithms for integer programming and related lattice problems", In Proceedings of the Fifteenth Annual ACM Symposium on Theory of Computing, STOC '83, pages 193-206 (New York, N.Y., USA, 1983, ACM); and Phong Q Nguyen and Damien Stehle, "Low-dimensional lattice basis reduction revisited," 3076: 338-357 (2004); Phong Q. Nguyen and Damien Stehle, "An LLL algorithm with quadratic complexity," SIAM Journal on Computing, 39(3):874-903 (2009). This allows the procedure to further lower the contribution from $\log 51, \ldots, \log \delta_k$ to the additive constant $C_{min}$. Value of log 60 can be chosen to be very small, and its contribution to $C_{min}$ can be made negligible without high computational overhead. Values of $\delta_k$ computed based on a reduced basis can also be related to the value of the regulator of number field F and known techniques for bounding the regulator can be applied to bound them.

Computing the system of fundamental units of the number field is known to be a hard problem and can be too costly even for the offline part of the algorithm. In practice, this issue can be circumvented to some extent. For example, it is sufficient to know the generators of the finite index subgroup of the unit group, but not the unit group itself. Frequently generators of such a subgroup can be computed much faster than the system of fundamental units (see, e.g., Michael E. Pohst and Hans Zassenhaus, "Algorithmic Algebraic Number Theory," volume 30 of Encyclopedia of Mathematics and its Applications (Cambridge University Press, 1989)) or are even known in analytic form (see, e.g., Lawrence C. Washington, Introduction to Cyclotomic Fields (Springer, 1982)).

4.5. On the Conjecture Related to the Approximation Algorithm Performance.

On a high level, the performance of the example approximation algorithm depends on the properties of the set of all possible solutions to QAP (Problem 2.4). Recall the statement of QAP:

Problem 2.4.

(Quaternion approximation problem, QAP). Given (1) A quaternion gate set specification $\langle F, \sigma, a, b, \mathcal{M}, S = \{\mathfrak{p}_1, \ldots, \langle_M\}\rangle$, (2) target angle $\varphi$ (3) target precision $\varepsilon$ (4) target cost vector $(L_1, \ldots, L_M)$ satisfying $$L_1 \log N(\langle_1) + \ldots + L_M \log N(\langle_M) - 4 \log(1/\varepsilon) \in [C_{min}, C_{max}],$$

where constants $C_{min}, C_{max}$ depend only on the quaternion gate set specification.

Find q from the generalized Lipschitz order (see the "generalized Lipschitz order" section) in quaternion algebra $$\left(\frac{a, b}{F}\right)$$

such that $\text{nrd}(q)\mathbb{Z}_F = \langle_1^{L_1} \ldots \langle_M^{L_M}$ and $\|R_z(\varphi) - U_q\| \le \varepsilon$, where $\|U\| = \frac{1}{2}\sqrt{\text{Tr}(UU^\dagger)}$.

Recall also, that map $U_q$ is constructed in the "Using quaternions to represent unitaries" Section (Section 3.1) using the embedding $\sigma: F \to \mathbb{R}$ that is a part of quaternion gate set specification.

Next, a formal description to the set of all solution to QAP is constructed. Let L be a generalized Lipschitz order in $$\left(\frac{a,b}{F}\right)$$

(see Section 3.4). Here, the following set is used as a part of the description of all possible solutions to QAP:

$$Sln_{r,\varphi,\varepsilon} = \{q \in L : \|U_q - R_z(\varphi)\| \leq \varepsilon, nrd(q) = r\}$$

The set of all possible norms of quaternions with given cost vector $L_1, \ldots, L_M$ is given by $$nrd_{L_1,\ldots,L_M} = \{r \in \mathbb{Z}_F : r\mathbb{Z}_F = \langle_1^{L_1} \ldots \langle_M^{L_M}, r \text{ is totally positive}\}$$

Using the notation above, the set of all solutions to given instance of QAP is given by:

$$Sln_{QAP} = \bigcup_{r \in nrd_{L_1,\ldots,L_M}} Sln_{r,\varphi,\varepsilon}.$$

Note that for any unit u for $\mathbb{Z}_F^x$ it is the case that $U_q = U_{qu}$. For this reason, the set of all solutions can be obtained as:

$$Sln_{QAP} = \bigcup_{r \in nrd_{L_1,\ldots,L_M}/(\mathbb{Z}_F^x)^2} Sln_{r,\varphi,\varepsilon},$$

where the set $nrd_{L_1,\ldots,L_M}/(\mathbb{Z}_F^x)^2$ is finite. Its size is equal to the size of the set:

$$\{u \in \mathbb{Z}_F^x : u \text{ is totally positive}\}/(\mathbb{Z}_F^x)^2.$$

Next, a discussion of the structure of the set $Sln_{r,\varphi,\varepsilon}$ is provided. Consider q from $Sln_{r,\varphi,\varepsilon}$. Quaternion q can be described by two elements $z_1, z_2$ of $\mathbb{Z}_K$ as $$q = e_1^{-1}(z_1) + e_2^{-1}(z_2)$$

Note that equality $r = z_1 z_1^* - b z_2 z_2$ and condition $\|U_q - R_z(\varphi)\| \leq \varepsilon$ imply that $$Re((\sigma_{1,+}(z_1) - z_0)e^{i\varphi/2}) \geq 0, \sigma_{k,+}(z_1) \leq \sigma_k(r)$$

where $z_0 = \sqrt{\sigma_1(r)}(1-\varepsilon^2)e^{-i\varphi/2}$. In other words $z_1$ belongs to the set $Cand_{r,\varphi,\varepsilon}$ defined as:

$$Cand_{r,\varphi,\varepsilon} = \{z \in \mathbb{Z}_K : Re((\sigma_{1,+}(z_1) - z_0)e^{i\varphi/2}) \geq 0, \sigma_{k,+}(z_1) \leq \sigma_k(r)\} = \{z : \sigma(z) \in S_{r,\varphi,\varepsilon}\}$$

The observations above allows one to rewrite the set $Sln_{r,\varphi,\varepsilon}$ as following:

$$Sln_{r,\varphi,\varepsilon} \bigcup_{z_1 \in C \text{ and } r,\varphi,\varepsilon} \{e_1^{-1}(z_1) + e_2^{-1}(z_2) : z_2 \in \mathbb{Z}_K, |z_2|^2 = (r-|z_1|^2)/(-b)\}$$

Note that some sets in the above union can be empty, because the relative norm equation $|z_2|^2 = (r-|z_1|^2)/(-b)$ does not always have a solution. Motivated by this fact, one can define the set $$Term_{r,\varphi,\varepsilon} = \{z_1 \in Cand_{r,\varphi,\varepsilon} : \text{there exists } z_2 \in \mathbb{Z}_K \text{ such that } |z_2|^2 = (r-|z_1|^2)/(-b)\}$$

Now assume the existence of an oracle for solving the relative norm equations and drawing points from $Term_{r,\varphi,\varepsilon}$. Under this assumptions, one could have the following algorithm for solving QAP:

(1) Pick random r from $nrd_{L_1,\ldots,L_M}$
(2) Pick $z_1$ from $Term_{r,\varphi,\varepsilon}$
(3) Find $z_2$ by solving relative norm equation $|z_2|^2 = (r-|z_1|^2)/(-b)$
(4) Return $q = e_1^{-1}(z_1) + e_2^{-1}(z_2)$ Suppose now, that such an oracle does not exist for drawing points from $Term_{r,\varphi,\varepsilon}$. The algorithm can then be modified as follows:

(1) Pick random r from $nrd_{L_1,\ldots,L_M}$
(2) Pick random element $z_1$ from $Cand_{r,\varphi,\varepsilon}$
(3) Check if $z_1$ is in $Term_{r,\varphi,\varepsilon}$. If this is not the case return to Step 2.
(4) Find $z_2$ by solving relative norm equation $|z_2|^2 = (r-\|z_1\|^2)/(-b)$
(5) Return $q = e_1^{-1}(z_1) + e_2^{-1}(z_2)$ Note that if the ratio $|Term_{r,\varphi,\varepsilon}|/|Cand_{r,\varphi,\varepsilon}|$ were in $\Omega(1/\log(1/\varepsilon))$, then the algorithm would still run in polynomial time. In practice, there is no oracle that solves all relative norm equations in polynomial time (or even checks if there is a solution to given relative norm equation). However, if one restricts the possible right hand sides of the relative norm equation, one can check the existence of the solution and find one in polynomial time. This motivates the following definition:

$$PolyTerm_{r,\varphi,\varepsilon} = \{z_1 \in Term_{r,\varphi,\varepsilon} : N_{K/\mathbb{Q}}((r-|z_1|^2)/(-b)) \text{ is a rational prime}\}$$

This gives the example following algorithm, which is very close to the procedure APPROXIMATE in FIG. 1:

(1) Pick random r from $nrd_{L_1,\ldots,L_M}$
(2) Pick random element $z_1$ from $Cand_{r,\varphi,\varepsilon}$
(3) Check if $z_1$ is in $PolyTerm_{r,\varphi,\varepsilon}$. If this is not the case return to Step 2.
(4) Find $z_2$ by solving relative norm equation $|z_2|_2 = (r-|z_1|^2)/(-b)$
(5) Return $q = e_1^{-1}(z_1) + e_2^{-1}(z_2)$ If the ratio $|PolyTerm_{r,\varphi,\varepsilon}|/|Cand_{r,\varphi,\varepsilon}|$ were in $\Omega(1/\log(1/\varepsilon))$ and one were drawing samples from $Cand_{r,\varphi,\varepsilon}$ sufficiently uniformly, the algorithm above would still run in polynomial time. In this case in the absence of the oracle for solving arbitrary norm equation. Note the above discussion implies, that $$\frac{|PolyTerm_{r,\varphi,\varepsilon}|}{|Cand_{r,\varphi,\varepsilon}|} = \frac{|PolyTerm_{ru^2,\varphi,\varepsilon}|}{|Cand_{ru^2,\varphi,\varepsilon}|} \text{ for any } u \in \mathbb{Z}_F^x.$$

For this reason, the ratio above is well defined for $r/(\mathbb{Z}_F^x)^2$. The conjecture that implies that the algorithm runs in polynomial time is the following:

Conjecture 4.8.

Keeping the notation introduced before in this section, for any r from $$nrd_{L_1,\ldots,L_M}/(\mathbb{Z}_F^x)^2 = \{r \in \mathbb{Z}_F : r\mathbb{Z}_F = \mathfrak{p}_1^{L_1}, \ldots, \mathfrak{p}_M^{L_M}, r \text{ is totally positive}\}/(\mathbb{Z}_F^x)^2$$

the ratio $|PolyTerm_{r,\varphi,\varepsilon}|/|Cand_{r,\varphi,\varepsilon}|$ is in $\Omega(1/\log(1/\varepsilon))$.

5. Relative Norm Equations

In this section, it is shown how a solution $z \in K$ to a relative norm equation of the form $N_{K/F}(z) = e$ between a CM field K and its totally real subfield $F = K \cap \mathbb{R}$ can be efficiently computed, provided such solutions exist at all for the given right hand side $e \in \mathbb{Z}_F$. The totally positive element e arises from the RANDOM-INTEGER-POINT step in lines 9 and 10 in the main algorithm (see FIG. 1). Formally, this concerns the following problem:

Problem 5.1

(CM Relative Norm Equation). Let K/F be a CM field of constant degree over $\mathbb{Q}$ and let e be a totally positive element of $\mathbb{Z}_F$. The task is to find an element z of $\mathbb{Z}_K$ such that $N_{K/F}(z)=zz^*=e$ in time polynomial in the bit-size of e, provided such an element z exists.

In the following paragraph, an example approach to solving a relative norm equation as in Problem 5.1 is described and pseudo-code implementations of IS-EASILY-SOLVABLE step in line 11 and FAST-SOLVE-NORM-EQ in line 12 of the main algorithm in FIG. 1 are given.

Relative norm equations of the form $N_{K/F}(z)=e$ have been studied in the literature before. Early approaches include various methods that proceed by establishing a bounding box that will contain a solution provided it exists and then checks the candidates in the bounding box. See, e.g., Zenon I. Borevich and Igor R. Shafarevich, "Number theory," volume 20 of Pure and Applied Mathematics. Academic Press (1967); Claus Fieker, Andreas Jurk, and Michael E. Pohst, "On solving relative norm equations in algebraic number fields," Math. Comput., 66(217):399-410 (1997); and Dennis A. Garbanati, "An algorithm for finding an algebraic number whose norm is a given rational number," J. Reine Angew. Math., 316:1-13, 1980; Michael E. Pohst and Hans Zassenhaus, Algorithmic Algebraic Number Theory, volume 30 of Encyclopedia of Mathematics and its Applications (Cambridge University Press, 1989). Unfortunately, these methods are exponential in the bit-size of the right hand side. Next, there is a method based on S-units. See, e.g., Henri Cohen, "Advanced Topics in Computational Number Theory," Graduate Texts in Mathematics (Springer, New York, 2000); and Denis Simon, "Norm equations in relative number fields using S-units," Mathematics of Computation, 71(239):1287-1305 (2002). This requires the factorization of the right hand side of the equation, along with precomputation of the relative class group of the extension K/F, and some additional data that is dependent on the right hand side. Therefore, it is not clear that the resulting algorithm runs in polynomial time. Relative norm equations have also been studied in the context of cryptanalysis of lattice based cryptography, e.g., of the NTRU system. Further, in Craig Gentry and Michael Szydlo, "Cryptanalysis of the Revised NTRU Signature Scheme," in International Conference on the Theory and Applications of Cryptographic Techniques (EUROCRYPT'02), pages 299-320 (2002), an algorithm is described to solve relative norm equations for cyclotomic fields over their totally real subfield. This algorithm uses Fermat's little theorem for ideals in $\mathbb{Z}_K$ in conjunction with LLL reduction to find a solution, which is known to exist in the context in which the algorithm is applied. See also Sanjam Garg, Craig Gentry, and Shai Halevi, "Candidate multilinear maps from ideal lattices," in International Conference on the Theory and Applications of Cryptographic Techniques (EUROCRYPT'13), pages 1-17 (2013). However, like Simon's S-unit based algorithm, the algorithm relies on some properties of the right hand side, and therefore does not seem to run in time that is a polynomial in the bit-size of the right hand side.

In embodiments of the disclosed technology, a different route is taken in which precompute a finite set of attributes of K/F that does not depend on the right hand side e. The example method reduces the problem for general right hand side to a bounded size instance. Furthermore, the approach leverages the fact that K is a CM field and that the right hand side is of a particular form, which are called benign integers. These are characterized in terms of a finite set $\mathcal{P}=\{\mathfrak{p}_1,\ldots,\mathfrak{p}_k\}\subset\mathbb{Z}_F$:

Definition 5.2

($\mathcal{P}$-Benign Integers). Let $\mathcal{P}$ be a set of prime ideals of $\mathbb{Z}_F$. An integer $e\in\mathbb{Z}_F$ is called benign if it is totally positive and the prime factorization of the ideal generated by e satisfies $$e\mathbb{Z}_F = \mathfrak{q}\prod_{\mathfrak{p}\in\mathcal{P}}\mathfrak{p}^{e(\mathfrak{p})}, \qquad (16)$$

where q is prime and $e(\mathfrak{p})\geq 0$ for all $\mathcal{P}\in\mathcal{P}$.

The primes in $\mathcal{P}$ are defined by the user parameter P in algorithm APPROXIMATE (FIG. 1) and are precomputed by the offline part of procedure IS-EASILY-SOLVABLE (FIG. 4).

5.1. Measuring the Bit-Size of the Input.

There are several natural ways to measure the bit-size of the algebraic numbers that are involved as the input and the output of a relative norm equation. These definitions are briefly discussed and it is shown that in the example approach they are all within a constant factor of each other.

Let $K/\mathbb{Q}$ be a Galois extension and let $B=\{b_1,\ldots,b_n\}$ be a basis for $\mathbb{Z}_K$ over $\mathbb{Q}$, where $n=[K:\mathbb{Q}]$, i.e., $\mathbb{Z}_K=\oplus_{i=1}^n b_i\mathbb{Z}$. Any $x\in\mathbb{Z}_K$ can then be represented as $x=\Sigma_{i=1}^n b_i x_i$ where $x_i\in\mathbb{Z}$, e.g., one can define the bit-size with respect to B as $\|x\|_B:=\Sigma_{i=1}^n|x_i|$. Alternatively, for CM fields, have $n=2d$ where $[F:\mathbb{Q}]=d$ and one can use the quadratic form $T_2(x)=\Sigma_{i=1}^d|\sigma_i(x)|^2$ as a measure for the bit-size of x. Also, one can use a notion of bit-size that is valid for general ideals $I\in\mathbb{Z}_K$ and not just for the principal ideals $e\mathbb{Z}_F$: following Jean-Francois Biasse and Claus Fieker, "A polynomial time algorithm for computing the HNF of a module over the integers of a number field," in International Symposium on Symbolic and Algebraic Computation (ISSAC'12), pages 75-82 (2012), a matrix $M\in\mathbb{Z}^{n\times n}$ is chosen for a basis of I expressed over an integral basis of $\mathbb{Z}_K$. If M is in Hermite Normal Form, then each entry can be bounded by $|\det(M)|=N_{K/\mathbb{Q}}(I)$, e.g., one can define $S(I):=n^2\log_2(N_{K/\mathbb{Q}}(I))$ as the bit-size of I. For principal ideals, the following definition is applied $S(x):=n\log_2(\max_i|x_i|)$.

It turns out that $T_2(x)$ and $S(x)$ are related. More precisely, the following result can be found (see, e.g., Jean-Francois Biasse and Claus Fieker, "A polynomial time algorithm for computing the HNF of a module over the integers of a number field," In International Symposium on Symbolic and Algebraic Computation (ISSAC'12), pages 75-82 (2012)):

Lemma 5.3.

Let $K/\mathbb{Q}$ be a CM field, let $x\in\mathbb{Z}_K$, and let $\Delta_K=\det(T_2(b_i,b_j))^2$ denote the discriminant of K. Then the bound $\frac{1}{2}\log_2(T_2(x))\leq\tilde{O}(S(x)/n+n^2+\log_2(\Delta_K))$ holds. Furthermore, one has that $S(x)\leq\tilde{O}(d(d+\frac{1}{2}\log_2(T_2(x))))$.

Next, a bound is established that allows to relate $T_2(x)$ to the bit-size of the expansion of x with respect to any given basis B.

Lemma 5.4.

Let $K/\mathbb{Q}$ be a CM field and let $B=\{b_1,\ldots,b_n\}$ be an integral basis for K over $\mathbb{Q}$, where $n=[K:\mathbb{Q}]$. For $x=\Sigma_{i=1}^n x_i b_i\in K$ define the bit size of x with respect to the basis B as $\|x\|_B := \sum_{i=1}^n |x_i|^2$. Let $M=[Tr(b_i b_j^*)]_{i,j=1,\ldots,n}$ be the Gram matrix of B and let $\lambda_{max}$ and $\lambda_{min}$ be the largest, respectively smallest eigenvalue of M. Then $$\lambda_{min}\|x\|_B/2 \leq T_2(x) \leq \lambda_{max}\|x\|_B/2.$$

Proof.

Let $x \in K$ and let $x=\sum_{i=1}^n x_i b_i$ be its expansion over the chosen basis. Recalling that $T_2(x) = {}^{Tr_{F/Q}}(xx^*) = {}^{Tr_{K/Q}}(xx^*)/2$ one can obtain that $T_2(x) = \sum_{i,j=1}^n x_i x_j^* Tr(b_i b_j^*)/2$. One can rewrite this as $T_2(x) = (x_1, \ldots, x_n) M(x_1, \ldots, x)^t/2$ where M is the integer valued, symmetric, and positive-definite matrix with entries $M_{i,j} = Tr(b_i b_j^*)$. By diagonalizing M in an eigenbasis, one sees that $\lambda_{min}\|x\|_B/2 \leq T_2(x) \leq \lambda_{max}\|x\|_B/2$ as claimed. □

In an example approach taken in this disclosure, the field K is considered to be a constant. This implies that quantities such as the degree $[K:\mathbb{Q}]$ or the discriminant $\Delta_F$ of the totally real subfield $F=K^+$ are constants. By choosing B to be an LLL-reduced basis, one can obtain from Lemma 5.4 that $T_2(x)$ and $\|x\|_B$ are related by a constant factor. See also Karim Belabas, "Topics in computational algebraic number theory," Journal de Theorie des Nombres, 16:19-63 (2004). To summarize, Lemmas 5.3 and 5.4 imply that all measures of bit-size considered in the following are within constant factors of each other.

5.2. Hermite Normal Form and Lifting of Ideals.

In order to represent ideals in rings of integers, Hermite normal forms are a useful tool. For example, see the result from Arne Storjohann and George Labahn, "Asymptotically fast computation of Hermite normal forms of integer matrices," in Proceedings of the 1996 International Symposium on Symbolic and Algebraic Computation, ISSAC '96, pages 259-266 (1996) that allows to give a polynomial bound on both, the complexity of computing a Hermite Normal Form (HNF) of an integer matrix, and the bit-size of the output. See also Arne Storjohann, "Algorithms for matrix canonical forms," PhD thesis, ETH Zurich (2000) for a discussion and comparison with other efficient algorithms to compute HNFs.

Theorem 5.5.

Let $A \in \mathbb{Z}\mathbb{Z}^{n \times m}$ be a rank r integer matrix and let $\|A\| := \max_{i,j}|A_{i,j}|$. There exists a deterministic algorithm that computes the HNF of A in time $\tilde{O}(m^\theta n \log\|A\|)$, where the $\tilde{O}$ notation ignores log-factors and $2 \leq \theta \leq 2.373$ is the exponent for matrix multiplication.

Next, a discussion will be presented of how to lift primes ideals in $\mathbb{Z}_F$ to prime ideals in $\mathbb{Z}_K$. Write $K=F(\theta)$, where $\theta$ is a primitive element. Recall that the conductor of K/F is defined as $\mathfrak{F} = \{x \in \mathbb{Z}_K : x\mathbb{Z}_K \subseteq \mathbb{Z}_F[\theta]\}$. It is well known that at least the prime ideals that are coprime with $\mathfrak{F}$ can be easily lifted via a reduction to factoring the minimal polynomial of $\theta$ over a suitable finite field as described below. See, e.g., Jurgen Neukirch, "Algebraic Number Theory", Ch. I, Prop. 8.3 (Springer, 1999); Daniel A. Marcus, "Number Theory," Ch. 3, Thm. 27 (Springer 1977); or Henri Cohen, "Advanced Topics in Computational Number Theory," Graduate Texts in Mathematics, Prop. 2.3.9 (Springer New York, 2000).

Being coprime with the conductor is equivalent to being coprime with $\mathbb{Z}_K/\mathbb{Z}_F[\theta]|$ which leaves only a finite set of primes for which it does not hold, e.g., these primes will be added to the exceptional set $\mathcal{P}$.

Theorem 5.6.

Let K/F be a Galois extension where $K=F(\theta)$. Denote by $g(X) \in F[X]$ the minimal polynomial of $\theta$ and by $\mathfrak{F}$ the conductor of K/F. Let $\mathfrak{p}$ be a prime ideal in $\mathbb{Z}_F$ that is coprime with $\mathfrak{F}$. Let $\mathbb{F} = \mathbb{Z}_F/\mathfrak{p}$ be the finite field corresponding to the residues mod $\mathfrak{p}$ and let $$\bar{g}(X) = \bar{g}_1(X)^{e_1} \ldots \bar{g}_r(X)^{e_r} \in \mathbb{F}[X]$$

be the factorization of $\bar{g}(X) = g(X) \mod \mathfrak{p}$ into irreducible polynomials $\bar{g}_i(X) = g_i(X) \mod \mathfrak{p} \in \mathbb{F}[X]$ where all $\bar{g}_i(X)$ are chosen to be monic polynomials. Then the ideals $$\mathfrak{P}_i := \mathfrak{p}\mathbb{Z}_K + g_i(\theta)\mathbb{Z}_K \quad (17)$$

are precisely the prime ideals of $\mathbb{Z}_K$ that are lying over $\mathfrak{p}$ and all these ideals are pairwise different.

Next, the time-complexity of computing the list of ideals $\mathfrak{P}_i$ lying over $\mathfrak{p}$ is analyzed. Factoring of a polynomial f(X) of degree n over a finite field $\mathbb{F}_q$ of size q is known to run in time polynomial in n and log(q). See, e.g., Joachim von zur Gathen and Jurgen Gerhard, "Modern Computer Algebra," Theorem 14.14 (Cambridge University Press, 2nd edition, 2003).

Theorem 5.7.

Let $\mathbb{F}_q$ be a finite field and let $f(X) \in \mathbb{F}_q[X]$ be a polynomial of degree n. Then there exists a probabilistic polynomial time algorithm that computes the factorization of $f(X) = \prod_{i=1}^k f_i(X)$ into irreducible polynomials over $\mathbb{F}_q$. The probability of success of the algorithm is at least ½ and the expected running time can be bounded by $\tilde{O}(n^2 \log q)$.

The algorithm in Theorem 5.7 proceeds in 3 stages, namely (i) squarefree factorization, (ii) equal degree factorization, and (iii) distinct degree factorization. As in the present case [K:F]=2, there are only two possibilities of possible splitting behavior of $\bar{g}(X)$: either a) this polynomial is irreducible which according to Theorem 5.6 corresponds to the case in which $\mathfrak{p}$ is inert as $g_i(\theta)=0$ and $\mathfrak{p}$ itself generates a prime ideal in $\mathbb{Z}_K$ or b) the polynomial splits as $\bar{g}(X) = \bar{g}_1(X)\bar{g}_2(X)$ where both factors are linear. This corresponds to the case where there are two ideals $\mathfrak{P}_1$ and $\mathfrak{P}_2$ lying over $\mathfrak{p}$. On account of Galois theory in this case, $\mathfrak{P}_2 = \mathfrak{P}_1^*$.

Using Theorem 5.7, one can obtain a refined version of Theorem 5.6 that bounds the running-time of finding the ideals lying over a given prime ideal $\mathfrak{p}$ in terms of the bit complexity of $\mathfrak{p}$.

Corollary 5.8.

Let K/F be a CM field where $K=F(\theta)$. Let $\mathfrak{p} \subseteq \mathbb{Z}_F$ be a prime ideal and let $n=S(\mathfrak{p})$ be the bit-size of $\mathfrak{p}$. Then there exists a polynomial time algorithm to compute all ideals $\mathfrak{P}$ lying over $\mathfrak{p}$. Furthermore, the bit-size of the $\mathfrak{P}$ is polynomial in n.

Proof.

Let $g(X) \in F[X]$ be the minimal polynomial of $\theta$ and let $\mathbb{F}_F := O_F/\mathfrak{p}$ be the finite field that arises as the residue field of $\mathfrak{p}$. Using Theorem 5.7, one sees that the factorization $\bar{g}(X) = \prod_{i=1}^r \bar{g}_i(X)$ can be computed into irreducibles in polynomial time in n. For each factor $\bar{g}_i$, a corresponding lifting $g_i(X)$ can be determined by considering the components in of $\mathbb{F}_q$ as elements of F while maintaining the same bit-size, e.g., one can obtain that the element $g_i(\theta)$ has a bit-size that is polynomial in n as well. Now, the 2-generator representation of $\mathfrak{P}$ is generated as in Eq. (17). Next, an HNF representation of this ideal is found: as $\theta$ obeys a quadratic equation F one can choose B={1, θ} as a basis of K/F. Hence, one can obtain a set of generators in the form $$H = \begin{pmatrix} A & 0 & a & b \\ 0 & A & c & d \end{pmatrix} \in \mathbb{Z}^{2d \times 4d}$$

where n=2d, A is an HNF for $\mathcal{P}$, and the matrix $$\begin{pmatrix} a & b \\ c & d \end{pmatrix}$$

is the expansion over $\mathbb{Z}$ of the linear map that describes the multiplication by $g_i(\theta)$ with respect to B. Note that all coefficients of H are bounded in bit-size by a polynomial in n. Theorem 5.5 can be used to compute an HNF H' for H, and hence the ideal $\mathfrak{P}$, in time polynomial in n. Theorem 5.5 also implies that the output size, e.g., all coefficients of H', are polynomial in n.

5.3. Outline of an Example Algorithm to Solve Relative Norm Equations.

Let K be a CM field over its totally real subfield $F:=K^+$ and denote by $\{\sigma_1, \ldots, \sigma_d\}$ the real embeddings of F into $\mathbb{R}$, e.g., [K:F]=2 and $[F:\mathbb{Q}]=d$. The extension K/F is Galois and its Galois group is generated by complex conjugation, e.g., Gal(K/F)=$\langle \tau \rangle$, where $\tau(x):=x^*$. Furthermore, denote by $\mathbb{Z}_F$ and $\mathbb{Z}_K$ the rings of integers in K and F, respectively. Recall that for an ideal $I \subseteq \mathbb{Z}_K$ the norm is defined as $N_{K/F}(I):=|\mathbb{Z}_K/I|$ which for principal ideals I=(x) coincides with the usual definition as the product of all Galois conjugates, i.e., $N_{K/F}((x))=x \cdot x^*$.

For a given element $e \in \mathbb{Z}_F$, one example approach to solving the relative norm equation $N_{K/F}(z)=e$ where $z \in \mathbb{Z}_K$ relies on the observation that if $I \cdot I^* = e\mathbb{Z}_F$ is a factorization of ideals in $\mathbb{Z}_F$ and η is an arbitrary non-zero element in the lattice generated by I, then $N_{K/F}(I) | N_{K/F}(\eta)$. This alone would not be a very useful property as potentially the quantity on the right might be unbounded. Using the fact that [K:F]=2 is constant and that K is a CM field, however, one will be able to show that for suitable η the quotient $N_{K/F}(\eta)/N_{K/F}(I)$ will be a constant that just depends on the CM field K and not on the right hand side e of the norm equation (5.1). Furthermore, it will be shown that one can find such z in polynomial time, provided that e is benign.

In the next two sections, it is shown that there exists a probabilistic algorithm that runs in polynomial time (with respect to the bit-size of the right hand side e) and finds an element z such that $N_{K/F}(z)=e$ or else reports that no such element exists. This is first shown for the case where e generates a prime ideal and then in a subsection section for the case of general benign e. The example algorithm proceeds in several stages:

Step 1 Determine whether the right hand side $e\mathbb{Z}_F$ is prime, respectively benign.

Step 2 If $e\mathbb{Z}_F$ is prime, respectively benign, extract $\mathfrak{q}$ from the prime decomposition eq. (16).

Step 3 Compute a prime ideal $\mathfrak{Q}$ lying over $\mathfrak{q}$ using Theorem 5.6.

Step 4 For all ideals $\mathfrak{p}_i$ in $\mathcal{P}$, precompute all ideals $\mathfrak{P}_{i,j}$ lying over them. This can be done offline.

Step 5 For all exponents $e_{i,j}$, where the tuple e is taken from a bounded set of candidates, compute $I:=\mathfrak{Q} \cdot \mathfrak{P}_{1,1}^{e_{1,1}} \cdots \mathfrak{P}_k^{e_{i_k,\ell_k}}$ and apply the following steps to all candidates. In the case of prime $e\mathbb{Z}_F$ this step can be omitted and $I:=\mathfrak{Q}$.

Step 6 Compute LLL reduced basis for lattice I to obtain an approximation η to the SVP for I.

Step 7 Compute the norm of η and compute $\gamma:=N_{K/F}(\eta)/N_{K/F}(I)$ and attempt to solve the norm equation for γ using a known method, such as the method described in Denis Simon, "Norm equations in relative number fields using S-units," Mathematics of Computation, 71(239):1287-1305 (2002). Let w be such that $N_K/F(w)=\gamma$.

Step 8 Output "fail" if no such solution exists. Otherwise, return a solution $z=\eta w \in \mathbb{Z}_K$.

Provided below is a proof that all steps can be performed by a classical algorithm whose runtime is polynomial in the bit-size of e. In the "Constructing the solution: prime case" Section (Section 5.5), this is shown for the somewhat simpler, however in practice frequently occurring, case where the right hand side $e\mathbb{Z}_F$ generates a prime ideal. Further, in the "Constructing the solution: general case" Section (Section 5.6), a discussion is provided of how the case of any benign e can be handled. Before proceeding with the proof, however, it is helpful to show another technical result, namely that it is indeed possible to find an element r as needed for Steps 6 and 7 such that the co-factor $\gamma:=N_{K/F}(\eta)/N_{K/F}(I)$ is bounded.

5.4. Bounding the Co-Factor.

Assuming that the norm equation $I \cdot I^* = e\mathbb{Z}_K$ is solvable implies that $I = \xi \mathbb{Z}_K$ for some element $\xi \in \mathbb{Z}_K$. It is now shown that one can find an element $\eta \in e\mathbb{Z}_K$ such that the quotient of the norms of I and $\eta \mathbb{Z}_K$ is a constant. Here, I is considered to be a 2d-dimensional $\mathbb{Z}$ lattice, where $d=[F:\mathbb{Q}]$. This means that there exists a basis $\{a_1, \ldots, a_{2d}\} \subset K$ such that $I=a_1\mathbb{Z}+\ldots+a_{2d}\mathbb{Z}$. Recall further that there is a quadratic form on I defined by $(x,y):=\text{Tr}_{K/\mathbb{Q}}(xy^*)$ and that the Gram matrix $G_{i,j}:=(a_i,a_j)$ is integer valued, i.e., $G \in \mathbb{Z}^{2d \times 2d}$. Furthermore, for the volume of the fundamental parallelepiped of I, the identity $\text{vol}(I)=\sqrt{\det(G)}$ holds. See, e.g., Daniele Micciancio and Sha Goldwasser, "Complexity of lattice problems: a cryptographic perspective," volume 671 of Springer International Series in Engineering and Computer Science (Springer, 2002).

The fact that $I=\xi\mathbb{Z}_K$ is principal is used in the following lemma to compute vol(I) in terms of the absolute norm of $\xi$:

Lemma 5.9.

For each $I=\xi\mathbb{Z}_K$, $\text{vol}(I)=\text{vol}(\mathbb{Z}_K) \cdot N_{K/\mathbb{Q}}(\xi)$.

Proof.

First, a basis $\{b_1, \ldots, b_{2d}\}$ of $\mathbb{Z}_k$ over $\mathbb{Z}$, i.e., $\mathbb{Z}_K = b_1\mathbb{Z}+\ldots+b_{2d}\mathbb{Z}$ is chosen. With respect to this basis, multiplication with the fixed element $\xi$ is a linear transformation $M_\xi$ defined via $M_\xi(x_1, \ldots, x_{2d})=\xi(b_1 x_1+\ldots+b_{2d}x_{2d})$, and the determinant of $M_\xi$ is equal to the norm $N_{K/\mathbb{Q}}(\xi)$. Note also, as K is a CM field, all Galois automorphisms $\sigma \in \text{Gal}(K/\mathbb{Q})$ come in complex conjugate pairs, i.e., $N_{K/\mathbb{Q}}(\xi) \geq 0$, i.e., $N_{K/\mathbb{Q}}(\xi)=|\det(M_\xi)|$.

By applying a base change to the Gram matrix G in which one goes from pairs of conjugates $\sigma_i, \bar{\sigma}_i$ to $\text{Re}(\sigma_i), \text{Im}(\sigma_i)$, where by convention the Galois automorphisms are ordered in such a way that the first d are pair-wise non-conjugates under complex conjugations, e.g., $\bar{\sigma}_i \neq \sigma_j$ for all $1 \leq i < j \leq d$.

For general $x_i \in K$ one can denote by $V(x_1, \ldots, z_{2d})$ the matrix $$V(x_1, \ldots, x_{2d}) = \begin{pmatrix} \text{Re}(\sigma_1(x_1)) & \ldots & \text{Re}(\sigma_1(x_{2d})) \\ \text{Im}(\sigma_1(x_1)) & \ldots & \text{Im}(\sigma_1(x_{2d})) \\ \vdots & \ddots & \vdots \\ \text{Re}(\sigma_d(x_1)) & \ldots & \text{Re}(\sigma_d(x_{2d})) \\ \text{Im}(\sigma_d(x_1)) & \ldots & \text{Im}(\sigma_d(x_{2d})) \end{pmatrix}.$$

Using this matrix, one can then express the volume of I as $\text{vol}(I)=\sqrt{\det(G)}=|\det(V(a_1, \ldots, a_{2d}))|$, where the set $\{a_i : i=1, \ldots, 2d\}$ forms a basis for I over $\mathbb{Z}$.

Next, one can observe that the matrices $V_I = V(a_1, \ldots, a_{2d})$ and $V\mathbb{Z}_K := V(b_1, \ldots, b_{2n})$ are related via $V_I = M_\xi V\mathbb{Z}_K$. From this, one can conclude that $$\text{vol}(I) = \sqrt{\det(G)} = |\det(V_I)| = |\det(M_\xi)| \cdot |\det(V\mathbb{Z}_K)| = {}^{N_{K/\mathbb{Q}}}(\xi) \cdot \text{vol}(\mathbb{Z}_K),$$

as claimed.

It is now shown how to find an element $\eta \in \xi \mathbb{Z}_K$ such that the quotient of the norms of I and $\eta \mathbb{Z}_K$ is a constant as mentioned in the beginning of this section.

Lemma 5.10.

Let $I = \xi \mathbb{Z}_K$ be an ideal in $\mathbb{Z}_K$ such that $I \cdot I^* = e \mathbb{Z}_K$. Then there exists $\eta \in \mathbb{Z}_K$ such that $N_{K/\mathbb{Q}}(\xi/\eta)$ is upper bounded by a constant $C_K$ that depends just on the extension $K/\mathbb{Q}$.

Proof.

As above, consider I as a lattice $I = a_1 \mathbb{Z} + \ldots + a_{2d} \mathbb{Z}$. Now use the LLL algorithm on the basis $\{a_1, \ldots, a_{2d}\} \subset \mathbb{R}^{2d}$. Using the LLL algorithm described in Phong Q. Nguyen and Damien Stehle, "Floating-point LLL revisited," in 24th Annual International Conference on the Theory and Applications of Cryptographic Techniques (EUROCRYPT'05), pages 215-233 (2005) it is known that the first vector $v = b_1$ in the LLL reduced basis $\{b_1, \ldots, b_{2d}\}$ for I satisfies the following bound:

$$\|v\| \leq (4/3)^{(2d-1)/4} \text{vol}(I)^{1/2d}.$$

As $I = \xi \mathbb{Z}_K$ is by assumption principal and $v \in I$, there exists an element $\eta \in \mathbb{Z}_K$ such that $v = \eta \xi$. In order to finish the proof of the lemma, it remains to show that the norm of $\eta$ is upper bounded by a constant that just depends on K alone and is in particular independent of the right hand side e of the norm equation:

$$N_{K/\mathbb{Q}}(\eta) = N_{K/\mathbb{Q}}(v)/N_{K/\mathbb{Q}}(\xi) =$$

$$\prod_{i=1}^d |\sigma_i(v)|^2 / N_{K/\mathbb{Q}}(\xi) \stackrel{AGM}{\leq} \left(\frac{1}{d}\sum_{i=1}^d |\sigma_i(v)|^2\right)^d / N_{K/\mathbb{Q}}(\xi) =$$

$$\left(\frac{1}{2d} Tr_{K/\mathbb{Q}}(vv^*)\right)^d / N_{K/\mathbb{Q}}(\xi) =$$

$$\left(\frac{1}{2d}\right)^d \|v\|^{2d} / N_{K/\mathbb{Q}}(\xi) \stackrel{LLL}{\leq} \left(\frac{1}{2d}\left(\frac{4}{3}\right)^{(2d-1)/2}\right)^d \text{vol}(I)/N_{K/\mathbb{Q}}(\xi) \stackrel{Lemma\ 5.9}{=}$$

$$\left(\frac{1}{2d}\left(\frac{4}{3}\right)^{(2d-1)/2}\right)^d N_{K/\mathbb{Q}}(\xi)\text{vol}(\mathbb{Z}_K)/N_{K/\mathbb{Q}}(\xi) =$$

$$\left(\frac{1}{2d}\left(\frac{4}{3}\right)^{(2d-1)/2}\right)^d \text{vol}(\mathbb{Z}_K) =: C_K$$

where the first inequality is the arithmetic-geometric-mean inequality (AGM) and v is the first basis vector obtained via LLL reduction for $\delta_{LLL} \equiv 1$ and $\eta_{LLL} \equiv \frac{1}{2}$ as in Phong Q. Nguyen and Damien Stehle, "Floating-point LLL revisited," in 24th Annual International Conference on the Theory and Applications of Cryptographic Techniques (EUROCRYPT'05), pages 215-233 (2005).

Using Lemma 5.10 will finally put one into a position to solve norm equations as in Problem 5.1 efficiently, in case e is a benign number as defined in Definition 5.2. In the "Constructing the solution: prime case" Section (Section 5.5) this result is established first for the case where $e \mathbb{Z}_F$ is a prime ideal itself as this case is relatively straightforward. Then, the more general case of benign e will be discussed in the "Constructing the solution: general case" Section (Section 5.6).

5.5. Constructing the Solution: Prime Case.

A proof of the following theorem is now provided, which is restated from the "High level description of the algorithm" Section (Section 4.1).

Theorem 4.4.

Given totally positive element e of F, there exists an algorithm for testing if the instance of integral relative norm equation in K/F $$zz^* = e, z \in \mathbb{Z}_K$$

can be solved in polynomial time in log $T_2(e)$ (procedure IS-EASILY-SOLVABLE, where $T_2(e) = \sum_{i=1}^d \sigma_k^2(e)$). If the test is passed, there exist another algorithm for deciding if the solution exists and finding it that runs in time polynomial in log $T_2(e)$ (procedure FAST-SOLVE-NORM-EQ). Procedure IS-EASILY-SOLVABLE returns true for at least those cases when the ideal $e \mathbb{Z}_F$ is prime.

Now, with all of these pieces in place, it possible to prove that the norm equations arising in the context of the example approximation method can be solved in time that is polynomial in the input size. First, proof is provided for the case where the right hand side e generates a prime ideal $\mathfrak{p} = e \mathbb{Z}_F$, then, proof is provided for the more general case of a benign integer e for the next section.

Proof (of Theorem 4.4).

Let $n = S(e)$ be the bit-size of the ideal generated by e. Next, a discussion will be provided for all Steps 1-7 described in Section 5.3 and it will be shown that all operations can be performed in time that is upper bounded by a polynomial in n.

In Step 1, one can run a test which is described in subroutine IS-EASILY-SOLVABLE shown in FIG. 5. The norm computations in lines 6 and 7 are clearly polynomial in n. Finally, for the primality test at the last line of the subroutine one can use for instance a probabilistic test such as Miller-Rabin or a deterministic test. See, e.g., Henri Cohen, "A Course in Computational Algebraic Number Theory," Graduate Texts in Mathematics (Springer, 1993) and Manindra Agrawal, Neeraj Kayal, and Nitin Saxena, "PRIMES," in P. Annals of Mathematics, 160(2):781-793 (2004).

Step 2 can be done by computing quotients of the form $(e)(\mathfrak{p}_i)^{-1}$ which can be done in polynomial time in the input bit-size and at an increase per division that is also at most polynomial. See, e.g., Jean-Francois Biasse and Claus Fieker, "A polynomial time algorithm for computing the HNF of a module over the integers of a number field" in International Symposium on Symbolic and Algebraic Computation (ISSAC'12), pages 75-82 (2012). Eventually this yields the prime ideal $\mathfrak{q}$.

This step is also done in subroutine IS-EASILY-SOLVABLE. All subsequent steps and line numbers refer to subroutine FAST-SOLVE-NORM-EQ shown in FIG. 5.

For Step 3, in line 12 of subroutine FAST-SOLVE-NORM-EQ, Theorem 5.6 can be used and the complexity analysis given in Corollary 5.8 can be used in order to compute an HNF for the ideal $\mathfrak{Q}$ lying over $\mathfrak{q}$ in polynomial time and almost polynomial increase of the bit-size.

Steps 4 in line 3 is an offline computation which does not count toward the cost of the online solution of the norm equation.

Step 5 does not have to be carried out, as by assumption in this subsection it is assumed that $\mathfrak{q}$ is prime (e.g., there is only one prime ideal $\mathfrak{Q}$ to consider). This step and the consequences for the subsequent steps in case e is benign but not prime are discussed in the next subsection.

Step 6 in line 13 involves the computation of a reduced lattice basis for the ideal corresponding to $\mathfrak{Q}$ from the HNF that was computed in Step 3. Using bounds on the complexity of the LLL algorithm one can see that the running time of this step is polynomial in the input size n and so is the bit-size of the short vector $\eta$ that is produced by this computation. See, e.g., Phong Q. Nguyen and Damien Stehle, "An LLL algorithm with quadratic complexity," SIAM Journal on Computing, 39(3):874-903 (2009).

For Step 7 in line 15, a method for solving norm equations can be used, such as Simon's S-unit based algorithm for which an implementation is available. See, e.g., Henri Cohen, "A Course in Computational Algebraic Number Theory," Graduate Texts in Mathematics (Springer, 1993). As the element $\gamma$ is constant and does not depend on the input size n one can assume that this computation can be done in constant time that does not affect the overall running time.

Finally, in Step 8, the case where there is no solution for $\gamma$ is considered, which then implies that there is no solution for e and combine $\eta$ and w using an ideal multiplication into the final solution z to the norm equation $N_{K/F}(z)=e$. This again can be done in polynomial time.

A pseudocode description of the Steps 3-8 is given in subroutine FAST-SOLVE-NORM-EQ shown in FIG. 5. From the above discussion of the steps it follows that the overall runtime is polynomial in the input size n=S(e) and by Lemma 5.3 therefore also polynomial in the bit-size log $T_2(e)$ as claimed.

5.6. Constructing the Solution: General Case.

Here, a brief discussion is provided of the implications of e being benign but not prime. In certain example implementations, this will involve a change in Step 5; for example, instead of only considering the prime ideals $\mathfrak{Q}$ lying over $\mathfrak{q}$, the procedure considers all ideals I that can be formed by multiplying $\mathfrak{Q}$ with the ideals lying over the various prime factors $\mathfrak{q}_i \in \mathcal{P}$. All ideals lying over $\mathcal{P}$ can be precomputed without any additional cost to the online part. Also, it is noted that even though the number of ideals to be considered grows significantly, this increase is still just a constant as for any given input parameter P of FAST-SOLVE-NORM-EQ in FIG. 5 the size of $\mathcal{P}=\mathcal{P}_0 \cup \mathcal{P}_1$ is constant. The prime ideals in $\mathcal{P}_0$ can be found by enumeration and those in $\mathcal{P}_1$ can be found by factoring the discriminant $\Delta_F$ which, as argued before, can be $\mathfrak{Q}$ done in polynomial time as F is constant. In order to compute I, one can now multiply $\mathfrak{Q}$ with all possible combinations of factors that are extensions $\mathfrak{P}$ of ideals in $\mathcal{P}$. Each such multiplication can be done in polynomial time with polynomial increase in bit-size. See Jean-Francois Biasse and Claus Fieker, "A polynomial time algorithm for computing the HNF of a module over the integers of a number field," in International Symposium on Symbolic and Algebraic Computation (ISSAC'12), pages 75-82 (2012). Then one can perform each of the subsequent Steps 6-7 as in the prime case and report success if any of the considered cases leads to a successful solution z and "failure" otherwise. Overall, also in case of benign right hand sides e, one can obtain a polynomial time classical algorithm to solve the norm equation $N_{K/F}(z)=e$.

5.7. Performance Improvement: Filtering Out Candidates Via the Hasse Principle.

It is possible to perform tests as to whether a solution to $N_{K/F}(z)=e$ over the rational elements of K (not necessarily elements in $\mathbb{Z}_K$) exists. A known test in this regard is the Hasse Norm Theorem that asserts that a global solution, e.g., a solution over K, exists if and only if a solution exists with respect to all local fields associated with K/F. See, e.g., Jurgen Neukirch, "Algebraic Number Theory," (Springer, 1999). More precisely:

Theorem 5.11

(Hasse Norm Theorem). Let K/F be a cyclic extension. An element $e \in F^x$ is a norm of an element in $K^x$ if and only it is a norm at every prime of F, including the infinite primes.

In practice, it is not necessary to check all primes of F, a finite set of primes is sufficient: as described in Vincenzo Acciaro and Jurgen Kluners, "Computing local Artin maps, and solvability of norm equations," J. Symb. Comput., 30(3):239-252 (2000), the only primes that need to be checked are a) the divisors of the conductor $\mathfrak{F}$ of K/F and b) all finite primes dividing the ideal $e\mathbb{Z}_F$. If e is benign, one can therefore efficiently compute the prime factorization and hence can perform this sufficient test for solvability of the norm equation. Note that this test can only be used in this one-sided sense as there are examples of degree 2 extensions K/F known where for $e \in \mathbb{Z}_F$ the equation $N_{K/F}(z)=e$ is solvable over K but not over $\mathbb{Z}_K$. In practice, the test is reasonably fast in order to eliminate some candidates e. Example pseudo-code for this test PASS-HASSE-SOLVABILITY-TEST is summarized in FIG. 6.

6. End to End Examples of Using the Framework

In this section, examples of using an exemplary implementation of the disclosed technology are provided. In two examples, an example implementation of the disclosed framework is applied to reproduce results on Clifford+T and V-basis gate sets. The exact synthesis framework disclosed in Vadym Kliuchnikov and Jon Yard, "A framework for exact synthesis," arXiv:1504.04350 (2015); U.S. Provisional Patent Application No. 62/146,182 filed on Apr. 10, 2015, and entitled "METHOD AND SYSTEM FOR QUANTUM CIRCUIT SYNTHESIS USING QUATERNION ALGEBRA"; and PCT International Application No. PCT/US2016/025958 filed on Apr. 5, 2016, and entitled "METHOD AND SYSTEM FOR QUANTUM CIRCUIT SYNTHESIS USING QUATERNION ALGEBRA" is used for the end to end compilation. For this reason, this discussion describes how to use this framework to reproduce previously known results on exact synthesis from Alex Bocharov, Yuri Gurevich, and Krysta M. Svore, "Efficient decomposition of single-qubit gates into V basis circuits," Physical Review A, 88(1):1-13 (July 2013); Vadym Kliuchnikov, Dmitri Maslov, and Michele Mosca, "Fast and efficient exact synthesis of single qubit unitaries generated by Clifford and T gates," Quantum Information and Computation, 13(7-8):0607-0630 (June 2013); and Vadym Kliuchnikov, Dmitri Maslov, and Michele Mosca, "Asymptotically optimal approximation of single qubit unitaries by Clifford and T circuits using a constant number of ancillary qubits," Physical Review Letters, 110(19):1-5 (December 2012), and also results on exact synthesis over Clifford+$R_z$ ($\pi/16$) (see Simon Forest, David Gosset, Vadym Kliuchnikov, and David McKinnon, "Exact synthesis of single-qubit unitaries over clifford-cyclotomic gate sets," Journal of Mathematical Physics, 56(8):082201 (2015)).

Two other examples correspond to approximating using gate sets Clifford+$R_z$($\pi/16$) and Clifford+T+V. No number-theoretic style approximation algorithms for this gate sets were known before. A brief summary of the examples is given in Table 1. Amongst other data, the table contains time needed for precomputation stage for all of the disclosed examples and the value of the additive constant appearing in Theorem 4.1. All the data about the example algorithm performance is based on an example implementation of exact synthesis (see, e.g., Vadym Kliuchnikov and Jon Yard, "A framework for exact synthesis," arXiv:1504.04350 (2015); U.S. Provisional Patent Application No. 62/146,182 filed on Apr. 10, 2015, and entitled "METHOD AND SYSTEM FOR QUANTUM CIRCUIT SYNTHESIS USING QUATERNION ALGEBRA"; and PCT International Application No. PCT/US2016/025958 filed on Apr. 5, 2016, and entitled "METHOD AND SYSTEM FOR QUANTUM CIRCUIT SYNTHESIS USING QUATERNION ALGEBRA".) and approximation frameworks using the computer algebra system MAGMA. The total number of lines of code needed for it implementation is about 2500. More examples of running approximation stage of the algorithm are provided in Section 7.

6.1. Clifford+T.

In this section, it is described how to obtain results from Peter Selinger, "Efficient Clifford+T approximation of single-qubit operators," (December 2012) within the example disclosed framework. Also discussed is the exact synthesis part using the framework introduced in Vadym Kliuchnikov and Jon Yard, "A framework for exact synthesis," arXiv:1504.04350 (2015); U.S. Provisional Patent Application No. 62/146,182 filed on Apr. 10, 2015, and entitled "METHOD AND SYSTEM FOR QUANTUM CIRCUIT SYNTHESIS USING QUATERNION ALGEBRA"; and PCT International Application No. PCT/US2016/025958 filed on Apr. 5, 2016, and entitled "METHOD AND SYSTEM FOR QUANTUM CIRCUIT SYNTHESIS USING QUATERNION ALGEBRA". This section follows the "Approximation methods based on exact synthesis" Section above (Section 2.2) and shows that Clifford+T can be described by totally definite quaternion algebra. Recall the following definition:

Definition 2.3.

a gate set $\mathcal{G}$ is described by quaternion algebra if the following data is defined:

TABLE 1

Summary of the results of running the algorithm for different gate sets. The quaternion algebra corresponding to the gate set is $Q = \left(\frac{a, b}{F}\right)$ where $F = \mathbb{Q}(\zeta_n) \cap \mathbb{R}$; $N_G$ is the number of generators to be used for exact synthesis; [L:L ∩ M] is the index of the intersection of L (the generalized Lipschitz order) and $\mathcal{M}$ (the maximal order used to define the gate set) in L; $N_{cnj}$ is the number of conjugacy classes of maximal orders in quaternion algebra Q; $t_{exact}$ is the time in seconds spent on precomputation required for the exact synthesis part of the example algorithm; $t_{approx}$ is the time in seconds spent on precomputation required for the approximation part; $C_{min}$ is the additive constant appearing in Theorem 4.1; $C_{min}/\log N(\mathfrak{p}_1)$ is the ratio between $C_{min}$ and the log of the norm of the ideal from S with the smallest norm (see Definition 2.3)

| GATE SET | n | a | b | $N_G$ | [L:L ∩ $\mathcal{M}$] | $N_{cnj}$ | $t_{approx}$ | $t_{exact}$ | $C_{min}$ | $C_{min}/\log N(\mathfrak{p}_1)$ |
|---|---|---|---|---|---|---|---|---|---|---|
| Clifford + T | 8 | −1 | −1 | 3 | 1 | 1 | 0.160 | 1.360 | 6.099 | 8.799 |
| V-basis | 4 | −1 | −1 | 6 | 1 | 1 | 0.070 | 0.700 | 2.079 | 1.292 |
| Clifford + $R_z$ ($\pi/8$) | 16 | −1 | −1 | 9 | 2 | 2 | 0.410 | 15.110 | 21.360 | 30.815 |
| Clifford + T + V | 8 | −1 | −1 | 29 | 1 | 1 | 0.170 | 5.680 | 6.099 | 8.799 |

(1) A quaternion gate set specification $\langle F, \sigma, a, b, \mathcal{M}, S \rangle$, (2) A set of canonical generators $\mathcal{G}_{\mathcal{M}, S}$ of $\mathcal{M}_S$, (3) A map Circuit as described by equation (1).

For Clifford+T gate set, one can choose:

$\mathcal{G} = \{R_\alpha(\pi/4), R_\alpha(\pi/2): \alpha = x, y, z\}$

It can separately be written $R_\alpha(\pi/2)$ because they generate Clifford group. Clifford gates are much cheaper in practice and typical cost function for Clifford+T gate set used in practice is:

$\cos t(R_\alpha(\pi/4)) = 1$, $\cos t(R_\alpha(\pi/2)) = 0$, $\alpha = x, y, z$.

Now consider the following quaternion gate set specification for Clifford+T:

$F = \mathbb{Q}(\zeta_8 + \zeta_8^{-1})$ where $\zeta_8 = e^{2i\pi/8}$, let also $\theta$ be a primitive element of F (in other words every element of F can be represented as $a_0 + a_1\theta$ where $a_0, a_1$ are rational numbers), embedding $\sigma: F \to \mathbb{R}$ is defined as $\sigma(\theta) = \sqrt{2}$, a=−1 and b=−1, maximal order $\mathcal{M}$ of quaternion algebra $$Q = \left(\frac{-1, -1}{F}\right)$$

is $$\mathbb{Z}_F + \frac{(i+1)\theta}{2}\mathbb{Z}_F + \frac{(j+1)\theta}{2}\mathbb{Z}_F + \frac{1+i+j+k}{2}\mathbb{Z}_F,$$

where $\mathbb{Z}_F=\mathbb{Z}[\sqrt{2}]$ is a ring of integers of F,

S={𝔭} where 𝔭=(2−θ)$\mathbb{Z}_F$ (note that 2−θ is totally positive element of F).

Note that the discriminant of $\mathcal{M}$ is equal to $\mathbb{Z}_F$, therefore $\mathbb{Z}$ is coprime to it. This implies that the set $\mathcal{M}_S$ is infinite.

Using notation $q_z=i$, $q_y=j$, $q_x=k$, one can obtain set $\mathcal{G}_Q$ based on the following correspondence $$q_{t,\alpha}=1+\theta(1-q_\alpha)/2 U_q(q_{t,\alpha})=R_\alpha(\pi/4)$$

$$q_{c,\alpha}=\theta(1-q_\alpha)/2 U_q(q_{c,\alpha})=R_\alpha(\pi/2)$$

where α=x,y,z.

The next step is to compute $\mathcal{G}_{\mathcal{M},S}$ using the algorithm from Vadym Kliuchnikov and Jon Yard, "A framework for exact synthesis," arXiv:1504.04350 (2015). One can find that quaternion algebra Q has a trivial two sided ideal class group and that the number of conjugacy classes of maximal orders of Q is one. In this case, the situation is relatively straightforward. The set $\mathcal{G}_{\mathcal{M},S}$ is equal to $gen_S(\mathcal{M}) \cup gen_u(\mathcal{M})$. The set $gen_S(\mathcal{M})$ comprises N(𝔭)+1=3 elements with reduced norm $a_0+a_1\theta$. The set $gen_u(\mathcal{M})$ comprises three generators of the finite group of units of maximal order $\mathcal{M}$ modulo units of $\mathbb{Z}_F$. The results of exemplary computations are the following:

$gen_S(\mathcal{M})=\{q_1,q_2,q_3\}$ where $q_1=½+i/2+(\theta-1)j/2+(\theta-1)k/2, q_2=(-\theta+2)/2-\theta j/2, q_3=(-\theta+2)j/2+\theta k/2.$ $gen_u(𝔭)=\{u_1,u_2,u_3\}$ where $u_1=½-i/2-j/2-k/2, u_2=-j, u_3=\theta/2-\theta j/2.$ Algorithmically, one can find that $u_1=q_{c,z}q_{c,x}$, $u_2=q_{c,y}^2$, and $u_3=q_{c,y}$. One sees that the unit group of $\mathcal{M}$ modulo units of $\mathbb{Z}_F$ corresponds to Clifford group. Next, one finds that $q_1=q_{t,x}q_{c,z}^2 q_{c,x}q_{c,z}$, $q_2=-q_{t,z}q_{c,z}^2 q_{c,x}q_{c,z}$ and $q_3=q_{t,y}q_{c,y}^3$ up to a unit of $\mathbb{Z}_F$. In general, the elements of set $gen_S(\mathcal{M})$ are defined up to right-hand side multiplication by a unit of $\mathcal{M}$. For this reason, one can choose $gen_S(\mathcal{M})=\{q_{t,\alpha}:\alpha=x,y,z\}$. The map Circuit becomes almost trivial in this case. In the next examples, this detail is omitted and $gen_S(𝔭)$ is written using generators convenient for the example application.

Note that nrd $q_{t,\alpha}\mathbb{Z}_F=𝔭$ therefore the cost vector corresponding to each $q_{t,\alpha}$ is (1). For all elements of the unit group the cost vector is (0). In this example original cost definition completely matches cost obtained based on cost vectors. Table 2, 5 shows the results of running the example circuit synthesis algorithm for Clifford+T gate set.

6.2. V-Basis.

In this section, a description of how to obtain results from Vadym Kliuchnikov and Jon Yard, "A framework for exact synthesis," arXiv:1504.04350 (2015) within the example framework is provided.

TABLE 2

Results of running the algorithm for Clifford + T. Approximation of rotation $R_z(0.1)$ with precision ε and cost vector ($L_1$).
All columns except $N_{tr,min}$ and $N_{tr,max}$ are averages over 1000 runs of the algorithm; $L'_1$ is the averaged T-count of the found circuits; $\rho(U_q, R_z(\phi))$ is the obtained quality of approximation; $N_{tr,min}$, $N_{tr,max}$, $N_{tr,avg}$ are minimum, maximum and average of the number of the main loop iterations in the procedure APPROXIMATE over all samples; $t_{exact}$ and $t_{approx}$ is time in seconds spent on approximation and exact synthesis stages of the algorithm.

| ε | $L_1$ | $L'_1$ | $\rho(U_q, R_z(\phi))$ | $N_{tr,min}$ | $N_{tr,max}$ | $N_{tr,avg}$ | $t_{exact}$ | $t_{approx}$ |
|---|---|---|---|---|---|---|---|---|
| $1 \cdot 10^{-5}$ | 76 | 75.06 | $8.62 \cdot 10^{-6}$ | 1 | 101 | 19.21 | 0.023 | 0.073 |
| $1 \cdot 10^{-6}$ | 89 | 87.88 | $8.65 \cdot 10^{-7}$ | 1 | 62 | 16.66 | 0.028 | 0.197 |
| $1 \cdot 10^{-7}$ | 102 | 100.88 | $8.66 \cdot 10^{-8}$ | 1 | 118 | 23.77 | 0.031 | 0.244 |
| $1 \cdot 10^{-8}$ | 116 | 114.94 | $8.67 \cdot 10^{-9}$ | 1 | 133 | 21.74 | 0.036 | 0.261 |
| $1 \cdot 10^{-9}$ | 129 | 127.94 | $8.66 \cdot 10^{-10}$ | 1 | 150 | 27.42 | 0.041 | 0.339 |
| $1 \cdot 10^{-10}$ | 142 | 141.06 | $8.64 \cdot 10^{-11}$ | 1 | 264 | 31.32 | 0.047 | 0.386 |
| $1 \cdot 10^{-15}$ | 209 | 208.02 | $8.7 \cdot 10^{-16}$ | 2 | 193 | 49.1 | 0.077 | 0.507 |
| $1 \cdot 10^{-25}$ | 341 | 339.88 | $8.67 \cdot 10^{-26}$ | 1 | 508 | 87.9 | 0.154 | 1.219 |
| $1 \cdot 10^{-30}$ | 408 | 407.04 | $8.67 \cdot 10^{-31}$ | 1 | 577 | 76.31 | 0.204 | 1.749 |

V-basis is defined using the following set $$G=\left\{\frac{1\pm 2iP}{\sqrt{5}}, iP: P \in \{X,Y,Z\}\right\}$$

A typical cost function is:

$$cost\left(\frac{1\pm 2iP}{\sqrt{5}}\right)=1, cost(iP)=0, \text{ for } P \in \{X,Y,Z\}$$

The quaternion gate set specification is: $\mathbb{Q}$

F=$\mathbb{Q}$, embedding σ:F→$\mathbb{R}$ is the only embedding of $\mathbb{Q}$ into $\mathbb{R}$, a=−1 and b=−1, maximal order $\mathcal{M}$ of quaternion algebra $$Q=\left(\frac{-1,-1}{\mathbb{Q}}\right) \text{ is } \mathbb{Z}+i\mathbb{Z}+j\mathbb{Z}+\frac{1+i+j+k}{2}\mathbb{Z},$$

S={𝔭} where 𝔭=5$\mathbb{Z}$.

Note that the discriminant of $\mathcal{M}$ is equal to 2$\mathbb{Z}$ and ideal $\mathbb{Z}$ is co-prime to it. This implies that the set $\mathcal{M}_S$ is infinite.

Using notation $q_z=i$, $q_y=j$, $q_x=k$, one can obtain set $\mathcal{G}_Q$ based on the following correspondence:

$$q_{V,\pm P}=1\pm 2q_P U_q(q_{V,\pm P})=(1\pm 2iP)/\sqrt{5}$$

$$U_q(q_P)=iP$$

where P∈{X,Y,Z}.

Similarly to the previous section, one can compute $\mathcal{G}_{\mathcal{M},S}$ using the algorithm from Vadym Kliuchnikov and Jon Yard, "A framework for exact synthesis," arXiv:1504.04350

TABLE 3

Results of running the algorithm for V basis. Approximation of rotation $R_z(0.1)$ with precision ε and cost vector ($L_1$). All columns except $N_{tr,min}$ and $N_{tr,max}$ are averages over 1000 runs of the algorithm; $L'_1$ is the average V-count of the found circuits; $\rho(U_q, R_z(\varphi))$ is the obtained quality of approximation; $N_{tr,min}$, $N_{tr,max}$, $N_{tr,avg}$ are minimum, maximum and average of the number of the main loop iterations in the procedure APPROXIMATE over all samples; $t_{exact}$ and $t_{approx}$ is time in seconds spent on approximation and exact synthesis stages of the algorithm.

| ε | $L_1$ | $L'_1$ | $\rho(U_q, R_z(\varphi))$ | $N_{tr,min}$ | $N_{tr,max}$ | $N_{tr,avg}$ | $t_{exact}$ | $t_{approx}$ |
|---|---|---|---|---|---|---|---|---|
| $1 \cdot 10^{-5}$ | 30 | 30 | $8.62 \cdot 10^{-6}$ | 1 | 609 | 75.16 | 0.013 | 0.059 |
| $1 \cdot 10^{-6}$ | 36 | 36 | $8.65 \cdot 10^{-7}$ | 1 | 622 | 94.88 | 0.017 | 0.074 |
| $1 \cdot 10^{-7}$ | 42 | 42 | $8.66 \cdot 10^{-8}$ | 1 | 647 | 105.97 | 0.021 | 0.095 |
| $1 \cdot 10^{-8}$ | 48 | 48 | $8.65 \cdot 10^{-9}$ | 1 | 808 | 123.1 | 0.024 | 0.109 |
| $1 \cdot 10^{-9}$ | 53 | 53 | $8.64 \cdot 10^{-10}$ | 1 | 919 | 136.14 | 0.028 | 0.123 |
| $1 \cdot 10^{-10}$ | 59 | 59 | $8.65 \cdot 10^{-11}$ | 1 | 1,065 | 140.34 | 0.033 | 0.131 |
| $1 \cdot 10^{-15}$ | 88 | 88 | $8.67 \cdot 10^{-16}$ | 1 | 1,470 | 227.13 | 0.058 | 0.225 |
| $1 \cdot 10^{-25}$ | 145 | 145 | $8.65 \cdot 10^{-26}$ | 1 | 3,064 | 380.11 | 0.129 | 0.435 |
| $1 \cdot 10^{-30}$ | 173 | 173 | $8.62 \cdot 10^{-31}$ | 1 | 3,389 | 436.57 | 0.178 | 0.546 |

(2015). One can again find that quaternion algebra Q has a trivial two sided ideal class group and that the number of conjugacy classes of maximal orders of Q is one. The set $\mathcal{G}^*_{\mathcal{M},S}$ is equal to $\text{gen}_S(\mathcal{M}) \cup \text{gen}_u(\mathcal{M})$. The set $\text{gen}_S(\mathcal{M})$ consists of $N(\mathfrak{p})+1=6$ elements with reduced norm 5. The set $\text{gen}_u(\mathcal{M})$ consists of two generators of the finite group of units of maximal order $\mathcal{M}$ modulo units of $\mathbb{Z}$. The results of the computations are the following:

$\text{gen}_S(\mathcal{M}) = \{q_{V,\pm P}: P \in \{X,Y,Z\}\}$ $\text{gen}_u(\mathcal{M}) = \{i, (i+j+k+1)/2\}$ One of the generators of the unit group cannot be expressed as a product of elements of $\mathbb{Z}_Q$. Indeed, all elements of $\mathbb{Z}_Q$ belong to the Lipschitz order $L = \mathbb{Z} + \mathbb{Z}_i + \mathbb{Z}_j + \mathbb{Z}_k$ and $(i+j+k+1)/2$ does not. However, the example approximation algorithm finds q from L. It is possible to show that (in this particular example) the unit of $\mathcal{M}$ obtained in the end of exact synthesis of q must belong to L and therefore belongs to the subgroup of the unit group of $\mathcal{M}$ that contained in L. After a simple computation, one finds that this subgroup is generated by i,j,k.

Note that nrd $q_{V,\pm P}\mathbb{Z} = \mathfrak{p}$ and the cost vector corresponding to each $q_{V,\pm P}$ is (1). For all elements of the unit group the cost vector is (0). Similarly to Clifford+T case original cost definition completely matches cost obtained based on cost vectors. Table 3, 5 show the results of running the example circuit synthesis algorithm for V-basis.

6.3. Clifford+

$R_z(\frac{\pi}{8})$

The approximation part of the result for this gate set is new. An exact synthesis algorithm for this gate set was first described in Simon Forest, David Gosset, Vadym Kliuchnikov, and David McKinnon, "Exact synthesis of single-qubit unitaries over clifford-cyclotomic gate sets," Journal of Mathematical Physics, 56(8):082201 (2015) in the language of SO(3) representation of unitary matrices over the ring $\mathbb{Z}[\zeta_{16}, \frac{1}{2}]$. It can be shown that the output of the approximation stage of the example algorithm can be converted to a unitary matrix over $\mathbb{Z}[\zeta_{16}, \frac{1}{2}]$. Therefore the algorithm developed in Simon Forest, David Gosset, Vadym Kliuchnikov, and David McKinnon, "Exact synthesis of single-qubit unitaries over clifford-cyclotomic gate sets," Journal of Mathematical Physics, 56(8):082201 (2015) can be applied instead of the exact synthesis algorithm for quaternions used here.

For Clifford+

$R_z(\frac{\pi}{8})$ gate set, one can choose:

$\mathbb{Z} = \{R_\alpha(\pm\pi/8), R_\alpha(\pm 3\pi/8), R_\alpha(\pi/4), R_\alpha(\pi/2): \alpha=x,y,z\}$ For this example, the quaternion gate set specification is:
$F = \mathbb{Q}(\zeta_{16} + \zeta_{16}^{-1})$ where $\zeta_{16} = e^{2i\pi/16}$, let also θ be a primitive element of F (in other words every element of F can be represented as $a_0 + \ldots + a_3\theta$ where $a_0, \ldots, a_3$ are rational numbers), embedding $\sigma: F \to \mathbb{R}$ is defined as $\sigma(\theta) = 2\cos(2\pi/16)$,
a=−1 and b=1,
maximal order $\mathcal{M}$ of quaternion algebra $Q = \left(\frac{-1,-1}{F}\right)$ $\mathbb{Z}_F + \frac{(i+1)\xi}{2}\mathbb{Z}_F + \frac{(j+1)\xi}{2}\mathbb{Z}_F + \frac{1+i+j+k}{2}\mathbb{Z}_F,$ where $\xi = \theta^2 - 2$, $\sigma(\xi) = \sqrt{2}$ and $\mathbb{Z}_F = \mathbb{Z}[2\cos(2\pi/16)]$ is a ring of integers of F, $S = \{\mathfrak{p}\}$ where $\mathfrak{p} = \theta\mathbb{Z}_F = (-\theta^3 + 4\theta^2 + \theta - 2)\mathbb{Z}_F$ (note that $-\theta^3 + 4\theta^2 + \theta - 2$ is totally positive element of F). The definition of maximal order $\mathcal{M}$ has essentially the same shape as the definition used for Clifford+T case. The only difference is that it defined using different ring of integers.

The discriminant of $\mathcal{M}$ is equal to $\mathbb{Z}_F$, therefore $\mathfrak{p}$ is coprime to it. This implies that the set $\mathcal{M}_S$ is infinite.

Using notation $q_z=i$, $q_y=j$, $q_x=k$, $\eta=\theta^3-3\theta$ (note $\sigma(\eta)=2\sin(\pi/8)$), one can obtain set $\mathcal{G}_Q$ based on the following correspondence:

$$q_{t,\alpha}=1+\xi(1-q_\alpha)/2 U_q(q_{t,\alpha})=R_\alpha(\pi/4)$$

$$q_{c,\alpha}=(1-q_\alpha)/2 U_q(q_{c,\alpha})=R_\alpha(\pi/2)$$

$$q_{1/8,\alpha}=\theta(1+(\theta-\eta q_\alpha)/2) U_q(q_{1/8,\alpha})=R_\alpha(\pi/8)$$

$$q_{3/8,\alpha}=\theta(1+(\eta-\theta q_\alpha)/2) U_q(q_{3/8,\alpha})=R_\alpha(3\pi/8)$$

where $\alpha \in \{x,y,z\}$.

Figure 16:
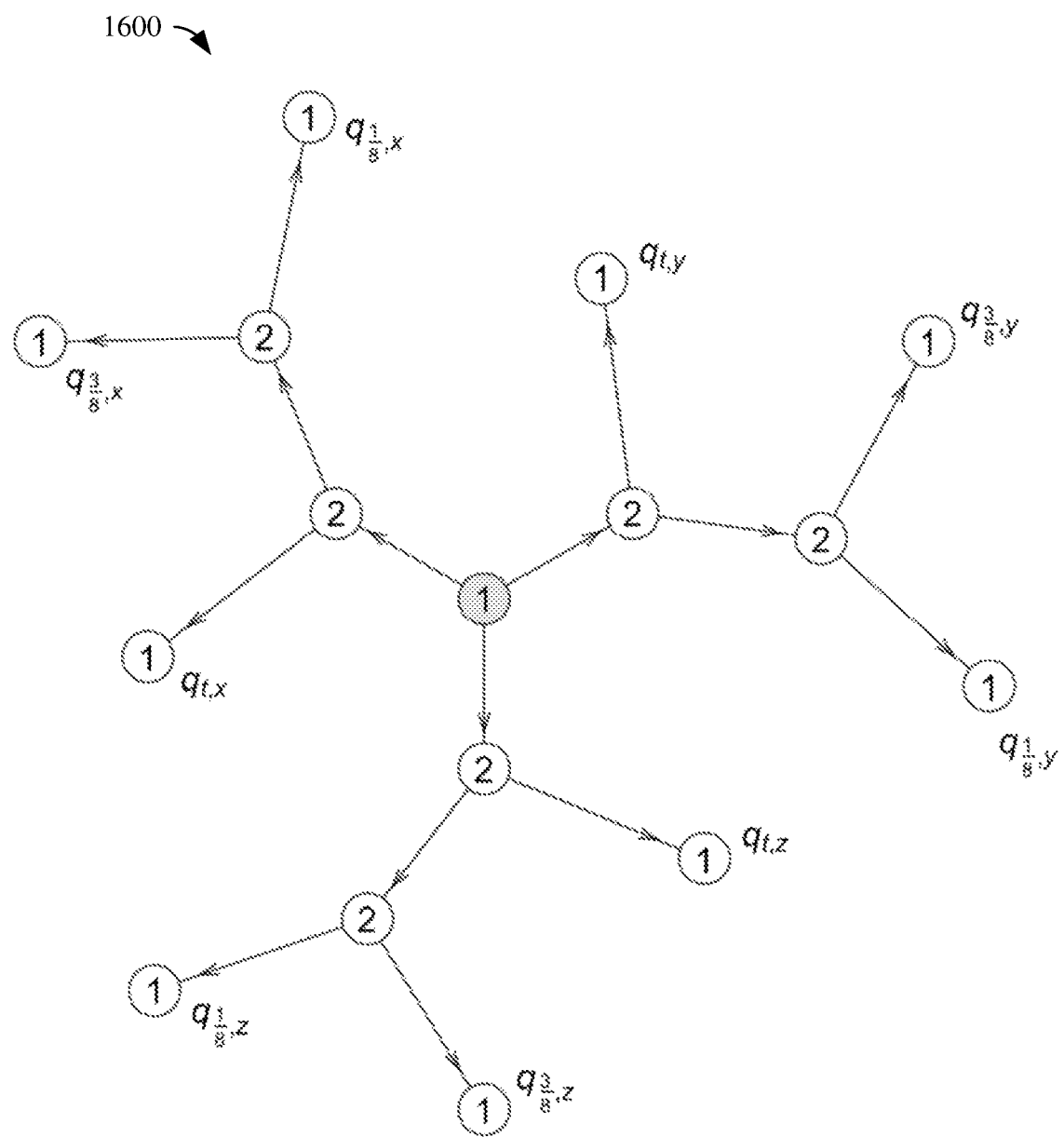
FIG. 16 is an example ideal principality graph.

The next step is to compute $\mathcal{G}_{\mathcal{M},S}$ using the algorithm from Vadym Kliuchnikov and Jon Yard, "A framework for exact synthesis," arXiv:1504.04350 (2015). One finds that quaternion algebra Q has a trivial two sided ideal class group and two different conjugacy classes of maximal orders of Q. The set $\mathcal{G}_{\mathcal{M},S}$ is equal to $\text{gen}_S(\mathcal{M}) \cup \text{gen}_u(\mathcal{M})$. The set $\text{gen}_u(\mathcal{M})$ consists of three generators of the finite group of units of maximal order $\mathcal{M}$ modulo units of $\mathbb{Z}$. As one has two conjugacy classes of maximal orders, it desirable to build an ideal principality graph (which is a tree in this case, see FIG. 16) to find the set $\text{gen}_S(\mathcal{M})$. The result of the computation is the following:

$\text{gen}_S(\mathcal{M})=\{q_{t,\alpha}, q_{1/8,\alpha}, q_{3/8,\alpha} : \alpha \in \{x,y,z\}\}$ $\text{gen}_u(\mathcal{M})=\{q_{c,\alpha} : \alpha \in \{x,y,z\}\}$ In particular, FIG. 16 is an ideal principality graph 1600 used to find generators for exact synthesis algorithm. The illustrated tree corresponds to quaternion gate set specification for Clifford+$R_z(\pi/8)$ gate set. See also Vadym Kliuchnikov and Jon Yard, "A framework for exact synthesis," arXiv:1504.04350 (2015)

This computation reproduces the result from Simon Forest, David Gosset, Vadym Kliuchnikov, and David McKinnon, "Exact synthesis of single-qubit unitaries over clifford-cyclotomic gate sets." Journal of Mathematical Physics, 56(8):082201 (2015) showing that all matrices over the ring $\mathbb{Z}[\zeta_{16}, 1/2]$ can be exactly represented using gate set $\mathcal{G}$. Because there are two conjugacy classes of maximal orders, the situation with the cost of generators becomes more interesting. For quaternions $q_{t,\alpha}$, $\text{nrd}(q_{t,\alpha})=\mathfrak{p}^2$ and their cost vector is (2). For other elements of $\text{gen}_S(\mathcal{M})$, $\text{nrd}(q_{1/8,\alpha})=\mathfrak{p}^3$ and $\text{nrd}(q_{3/8,\alpha})=\mathfrak{p}^3$ and their cost vector is (3). In the case when S contains only one prime ideal, the cost of each generator from $\text{gen}_u(\mathcal{M})$ is precisely equal to the distance from the root to corresponding node. Above cost values also reproduce results from Simon Forest, David Gosset, Vadym Kliuchnikov, and David McKinnon, "Exact synthesis of single-qubit unitaries over clifford-cyclotomic gate sets," Journal of Mathematical Physics, 56(8):082201 (2015).

Note that while approximating, one only has control over the overall value of the cost vector. If one requested cost L, then the result can have any number $L_t$ of the T gates and any number $L_{1/8,3/8}$ of $R_z(\pi/8)$ and $R_z(3\pi/8)$ rotations as soon as $L=2L_t+3L_{1/8,3/8}$. As usual, the cost of Clifford gates is assumed to be zero.

Another interesting aspect of this example is that the generalized Lipschitz order is not contained in maximal order M above. Orders in a totally definite quaternion algebra can be given a structure of the lattice using bilinear form $\text{Tr}_{F/\mathbb{Q}}(q_1 q_2^*)$. One can find that the index of sub-lattice $L \cap M$ in L is two. This means that half of the points from L belongs $L \cap M$. In the example approximation algorithm, the result is tested to determine if it is in M in the end. If this is not the case, the procedure tries again. Experiments show that the procedure produces a quaternion in $L \cap M$ in half of the experiments. Tables 4, 5 show the results of running the example circuit synthesis algorithm for Clifford+$R_z(\pi/8)$ gate set.

6.4. Clifford+T+V.

For Clifford+T+V gate set, one can choose set G to be:

$\mathcal{G}=\{R_\alpha(\pi/4), R_\alpha(\pm 2a\tan(2)), R_\alpha(\pi/2) : \alpha=x,y,z\}$ It is not difficult to check that $R_\alpha(\pm 2a\tan(2))$ correspond to 6 V gates.

TABLE 4

Results of running the example algorithm for Clifford + $R_z(\pi/8)$. Part 1. Approximation of rotation $R_z(0.1)$ with precision $\varepsilon$ and cost vector ($L_1$). All columns except $N_{tr,min}$ and $N_{tr,max}$ are averages over 1000 runs of the algorithm; ($L'_1$) is a cost vector of a found circuit; $\rho(U_q, R_z(\varphi))$ is the obtained quality of approximation; $N_{tr,min}$, $N_{tr,max}$, $N_{tr,avg}$ are minimum, maximum and average of the number of the main loop iterations in the procedure APPROXIMATE over all samples; $t_{exact}$ and $t_{approx}$ is time in seconds spent on approximation and exact synthesis stages of the algorithm.

| $\varepsilon$ | $L_1$ | $L'_1$ | $\rho(U_q, R_z(\varphi))$ | $N_{tr,min}$ | $N_{tr,max}$ | $N_{tr,avg}$ | $t_{exact}$ | $t_{approx}$ |
|---|---|---|---|---|---|---|---|---|
| $1 \cdot 10^{-5}$ | 98 | 96 | $8.65 \cdot 10^{-6}$ | 1 | 151 | 19.56 | 0.064 | 0.860 |
| $1 \cdot 10^{-6}$ | 111 | 108.98 | $8.66 \cdot 10^{-7}$ | 1 | 171 | 21.94 | 0.075 | 0.951 |
| $1 \cdot 10^{-7}$ | 124 | 121.95 | $8.66 \cdot 10^{-8}$ | 1 | 168 | 22.69 | 0.085 | 1.049 |
| $1 \cdot 10^{-8}$ | 138 | 136.03 | $8.67 \cdot 10^{-9}$ | 1 | 217 | 24.59 | 0.098 | 1.207 |
| $1 \cdot 10^{-9}$ | 151 | 148.96 | $8.66 \cdot 10^{-10}$ | 1 | 207 | 27.75 | 0.108 | 1.349 |
| $1 \cdot 10^{-10}$ | 164 | 161.92 | $8.65 \cdot 10^{-11}$ | 1 | 223 | 29.62 | 0.118 | 1.541 |
| $1 \cdot 10^{-15}$ | 231 | 229.01 | $8.66 \cdot 10^{-16}$ | 1 | 267 | 40.74 | 0.168 | 2.057 |
| $1 \cdot 10^{-25}$ | 364 | 361.93 | $8.66 \cdot 10^{-26}$ | 1 | 422 | 59.35 | 0.273 | 4.647 |
| $1 \cdot 10^{-30}$ | 430 | 428.04 | $8.66 \cdot 10^{-31}$ | 1 | 466 | 68.1 | 0.329 | 6.551 |

TABLE 5

Results of running the example algorithm for Clifford + $R_z(\pi/8)$.
Part 2. Approximation of rotation $R_z(0.1)$ with precision $\varepsilon$
and cost vector ($L_1$). All columns except $N_{L\cap M}$, $L'_t$, $L'_{1/8,3/8}$
are averages over 1000 runs of the algorithm;
$N_{L\cap M}$ is the number of outputs of the procedure APPROXIMATE
that are in the maximal order $\mathcal{M}$; ($L'_1$) is a cost vector of a
found circuit; $\rho(U_q, R_z(\phi))$ is the obtained quality of
approximation; $L'_t$ is the number of T gates in the
resulting circuit (averaged over outputs of the procedure
APPROXIMATE that are in the maximal order $\mathcal{M}$);
$L'_{1/8,3/8}$ is the number of $R_z(\pi/8)$ and $R_z(3\pi/8)$ gates
in the resulting circuit
(averaged in the same way as $L'_t$).

| $\varepsilon$ | $L_1$ | $L'_1$ | $\rho(U_q, R_z(\phi))$ | $L'_t$ | $L'_{1/8,3/8}$ | $N_{L\cap M}$ |
|---|---|---|---|---|---|---|
| $1 \cdot 10^{-5}$ | 98 | 96 | $8.65 \cdot 10^{-6}$ | 19.49 | 19.01 | 509 |
| $1 \cdot 10^{-6}$ | 111 | 108.98 | $8.66 \cdot 10^{-7}$ | 22.48 | 21.34 | 518 |
| $1 \cdot 10^{-7}$ | 124 | 121.95 | $8.66 \cdot 10^{-8}$ | 25.26 | 23.81 | 478 |
| $1 \cdot 10^{-8}$ | 138 | 136.03 | $8.67 \cdot 10^{-9}$ | 28.09 | 26.62 | 484 |
| $1 \cdot 10^{-9}$ | 151 | 148.96 | $8.66 \cdot 10^{-10}$ | 30.83 | 29.1 | 480 |
| $1 \cdot 10^{-10}$ | 164 | 161.92 | $8.65 \cdot 10^{-11}$ | 32.74 | 32.15 | 517 |
| $1 \cdot 10^{-15}$ | 231 | 229.01 | $8.66 \cdot 10^{-16}$ | 46.38 | 45.42 | 491 |
| $1 \cdot 10^{-25}$ | 364 | 361.93 | $8.66 \cdot 10^{-26}$ | 73.27 | 71.8 | 474 |
| $1 \cdot 10^{-30}$ | 430 | 428.04 | $8.66 \cdot 10^{-31}$ | 85.94 | 85.39 | 528 |

The gate set specification is similar to Clifford+T case except for the set S.

$F=\mathbb{Q}(\zeta_8+\zeta_8^{-1})$ where $\zeta_8=e^{2i\pi/8}$, let also $\theta$ be a primitive element of F (in other words every element of F can be represented as $a_0+a_1\theta$ where $a_0, a_1$ are rational numbers), embedding $\sigma: F \to \mathbb{R}$ is defined as $\sigma(\theta)=\sqrt{2}$,
a=−1 and b=−1,
maximal order $\mathcal{M}$ of quaternion algebra $$Q = \left(\frac{-1, -1}{F}\right)$$

is $$\mathbb{Z}_F + \frac{(i+1)\theta}{2}\mathbb{Z}_F + \frac{(j+1)\theta}{2}\mathbb{Z}_F + \frac{1+i+j+k}{2}\mathbb{Z}_F,$$

where $\mathbb{Z} = \mathbb{Z}[\sqrt{2}]$ is a ring of integers of F,
$S=\{\mathfrak{p}_1, \mathfrak{p}_2\}$ where $\mathfrak{p}_1=(2-\theta)\mathbb{Z}_F$ and $\mathfrak{p}_2=5\mathbb{Z}_F$.

Using notation $q_z=i$, $q_y=j$, $q_x=k$, one can obtain set $\mathbb{Z}_Q$ based on the following correspondence $q_{t,\alpha}=1+\theta(1-q_\alpha)/2 U_q(q_{t,\alpha})=R_\alpha(\pi/4)$ $q_{v,\pm\alpha}=1 \mp 2q_\alpha U_q(q_{v,\pm\alpha})=R_\alpha(\pm 2a \tan(2))$ $q_{c,\alpha}=\theta(1-q_\alpha)/2 U_q(q_{c,\alpha})=R_\alpha(\pi/2)$ where $\alpha=x, y, z$.

The next step is to compute $\mathcal{G}_{\mathcal{M},S}$ using the algorithm from Vadym Kliuchnikov and Jon Yard, "A framework for exact synthesis," arXiv:1504.04350 (2015). One can find that quaternion algebra Q has a trivial two sided ideal class group and that the number of conjugacy classes of maximal orders of Q is one. The set $\mathcal{G}_{\mathcal{M},S}$ is equal to $gen_S(\mathcal{M}) \cup gen_u(\mathbb{Z})$. The set $gen_S(\mathcal{M})$ consists of $N(\mathfrak{p}_1)+1=3$ elements with reduced norm $2-\theta$ and $N(\mathfrak{p}_2)+1=26$ elements with reduced norm 5. The set $gen_u(\mathcal{M})$ consists of three generators of the finite group of units of maximal order $\mathcal{M}$ modulo units of $\mathbb{Z}_F$ and is the same as in Clifford+T case because maximal order $\mathcal{M}$ is the same.

Here, the set $gen_S(\mathcal{M})$ is discussed in more detail. One can find that it contains quaternions corresponding to $R_\alpha(\pi/4)$ gates and all 6 V gates. One is then left with 20 quaternions with reduced norm 5 that were not in the set $\mathcal{G}_Q$. These can be expressed in terms of elements of $\mathcal{G}_Q$. The following equivalence relation on quaternions can then be introduced:

$q_1 \sim q_2$ if and only if $q_1=u_1 q_2 u_2$ for $u_1, u_2$-units of M

In this case, it means that corresponding unitaries are equivalent up to a Clifford and therefore will have the same cost of implementation. There are four equivalence classes in $gen_S(\mathcal{M})$ corresponding to the relation ~. Two of them are $\{q_{t,\alpha}:\alpha\in\{x,y,z\}\}$ and $\{q_{v,\pm\alpha}:\alpha\in\{x,y,z\}\}$. The remaining twenty quaternions with reduced norm 5 split into two classes $c_1$ and $c_2$ of size 8 and 12. Next, one can find that all quaternions from $c_2$ are equal to $u_1 q_{t,\alpha(1)} q_{v,\pm\alpha(2)} u_2 q_{t,\alpha(3)}^{-1}$ where $u_1, u_2$ are units
of $\mathcal{M}$, $\alpha(k)\in\{x,y,z\}$, k=1,2,3.

The quaternions from the set $c_1$ can be expressed as $u_1 q_{t,\alpha(1)} q_{t,\alpha(2)} q_{v,\pm\alpha(3)} u_2 q_{t,\alpha(4)}^{-1} q_{t,\alpha(5)}^{-1}$ where $u_1, u_2$
are units of $\mathcal{M}$, $\alpha(k)\in\{x,y,z\}$ k=1,...,5.

TABLE 6

Results of running the example algorithm for Clifford + T + V. Approximation
of rotation $R_z(0.1)$ with precision $\varepsilon$ and cost vector ($L_1$, $L_2$). All columns
except $N_{tr,min}$ and $N_{tr,max}$ are averages over 1000 runs of the algorithm;
($L'_1$, $L'_2$) is a cost vector of a found circuit; $\rho(U_q, R_z(\phi))$ is the obtained quality
of approximation; $N_{tr,min}$, $N_{tr,max}$, $N_{tr,avg}$ are minimum, maximum and average
of the number of the main loop iterations in the procedure APPROXIMATE
over all samples; $t_{exact}$ and $t_{approx}$ is time in seconds spent on approximation
and exact synthesis stages of the algorithm.

| $\varepsilon$ | $L_1$ | $L_2$ | $L'_1$ | $L'_2$ | $\rho(U_q, R_z(\phi))$ | $N_{tr,min}$ | $N_{tr,max}$ | $N_{tr,avg}$ | $t_{exact}$ | $t_{approx}$ |
|---|---|---|---|---|---|---|---|---|---|---|
| $1 \cdot 10^{-5}$ | 30 | 10 | 29.06 | 10 | $8.65 \cdot 10^{-6}$ | 1 | 149 | 18.31 | 0.075 | 0.070 |
| $1 \cdot 10^{-6}$ | 36 | 12 | 35.02 | 12 | $8.64 \cdot 10^{-7}$ | 1 | 158 | 25.07 | 0.089 | 0.241 |
| $1 \cdot 10^{-7}$ | 42 | 14 | 40.98 | 14 | $8.65 \cdot 10^{-8}$ | 1 | 204 | 28.59 | 0.107 | 0.277 |
| $1 \cdot 10^{-8}$ | 48 | 16 | 47 | 16 | $8.66 \cdot 10^{-9}$ | 1 | 210 | 32.97 | 0.129 | 0.366 |
| $1 \cdot 10^{-9}$ | 51 | 17 | 50.02 | 17 | $8.65 \cdot 10^{-10}$ | 1 | 223 | 29.32 | 0.140 | 0.367 |
| $1 \cdot 10^{-10}$ | 57 | 19 | 55.99 | 19 | $8.66 \cdot 10^{-11}$ | 1 | 347 | 37.59 | 0.155 | 0.429 |
| $1 \cdot 10^{-15}$ | 84 | 28 | 83.03 | 28 | $8.66 \cdot 10^{-16}$ | 1 | 383 | 52.66 | 0.233 | 0.559 |

TABLE 6-continued

Results of running the example algorithm for Clifford + T + V. Approximation of rotation $R_z(0.1)$ with precision ε and cost vector $(L_1, L_2)$. All columns except $N_{tr,min}$ and $N_{tr,max}$ are averages over 1000 runs of the algorithm; $(L'_1, L'_2)$ is a cost vector of a found circuit; $\rho(U_q, R_z(\varphi))$ is the obtained quality of approximation; $N_{tr,min}$, $N_{tr,max}$, $N_{tr,avg}$ are minimum, maximum and average of the number of the main loop iterations in the procedure APPROXIMATE over all samples; $t_{exact}$ and $t_{approx}$ is time in seconds spent on approximation and exact synthesis stages of the algorithm.

| ε | $L_1$ | $L_2$ | $L'_1$ | $L'_2$ | $\rho(U_q, R_z(\varphi))$ | $N_{tr,min}$ | $N_{tr,max}$ | $N_{tr,avg}$ | $t_{exact}$ | $t_{approx}$ |
|---|---|---|---|---|---|---|---|---|---|---|
| $1 \cdot 10^{-25}$ | 135 | 45 | 133.96 | 45 | $8.65 \cdot 10^{-26}$ | 1 | 702 | 83.11 | 0.408 | 1.306 |
| $1 \cdot 10^{-30}$ | 162 | 54 | 161.05 | 54 | $8.66 \cdot 10^{-31}$ | 1 | 618 | 101.72 | 0.508 | 1.978 |

In practice it can be more beneficial to design circuits for all 26 gates corresponding to quaternions with norm 5 directly, because T gates are usually expensive to implement. Table 6 shows the results of running the example circuit synthesis algorithm for Clifford+T+V gate set.

7. Other Examples of Using Approximation Algorithm

In this section, results of running an example implementation of the disclosed approximation algorithm for a series of quaternion gate sets specification are provided. Recall that the quaternion gate set specification is:
Definition 2.2.
A quaternion gate set specification is a tuple $\langle F, \sigma, a, b, \mathcal{M}, S \rangle$ where:
F is a totally real number field and σ is an embedding of F into $\mathbb{R}$
a, b are elements of F that define the quaternion algebra $$\left(\frac{a,b}{F}\right)$$

over F
$\mathcal{M}$ is a maximal order of $$\left(\frac{a,b}{F}\right)$$

$S = \{ \mathfrak{p}_1, \ldots, \mathfrak{p}_M \}$ is a set of prime ideals of F The family of examples is parametrized by even integer n. Number field F corresponds to the real subfield of cyclotomic field $\mathbb{Q}(\zeta_n + \zeta_n^{-1})$ with primitive element θ. Element a of F is chosen such that relative extension F(a) is a cyclotomic field, b=−1. The approximation part of the example algorithm is independent on maximal order $\mathcal{M}$, so there was no restriction to any specific choice of $\mathcal{M}$. Set S contains one prime ideal above 2. If there is more than one such ideal, it was chosen at random. The tables below summarize the series of examples using an implementation of the disclosed algorithm.

TABLE 7

| n | a | b | $t_{approx}$ | $C_{min}$ | $C_{min}/\log N (\mathfrak{p}_1)$ |
|---|---|---|---|---|---|
| 8 | −1 | −1 | 0.150 | 6.099 | 8.799 |
| 10 | θ-3 | −1 | 0.080 | 4.812 | 3.471 |
| 12 | −1 | −1 | 0.100 | 7.100 | 10.244 |

TABLE 7-continued

| n | a | b | $t_{approx}$ | $C_{min}$ | $C_{min}/\log N (\mathfrak{p}_1)$ |
|---|---|---|---|---|---|
| 14 | $\theta^2-4$ | −1 | 0.140 | 9.590 | 4.612 |
| 16 | −1 | −1 | 0.430 | 21.360 | 30.815 |
| 18 | $\theta^2-4$ | −1 | 0.130 | 10.679 | 5.136 |
| 20 | −1 | −1 | 0.260 | 20.598 | 14.859 |
| 22 | $\theta^2-4$ | −1 | 0.680 | 24.440 | 7.052 |
| 24 | −1 | −1 | 0.290 | 21.766 | 31.402 |
| 26 | $\theta^2-4$ | −1 | 0.460 | 34.891 | 8.389 |
| 28 | −1 | −1 | 0.540 | 40.915 | 19.676 |
| 30 | $\theta^2-4$ | −1 | 0.320 | 17.027 | 6.141 |
| 32 | −1 | −1 | 1.180 | 71.573 | 103.259 |
| 34 | $\theta^2-4$ | −1 | 1.060 | 59.243 | 21.367 |
| 36 | −1 | −1 | 0.440 | 41.956 | 20.177 |
| 38 | $\theta^2-4$ | −1 | 1.350 | 72.404 | 11.606 |
| 40 | −1 | −1 | 1.250 | 67.612 | 48.772 |
| 42 | $\theta^2-4$ | −1 | 0.480 | 35.413 | 8.515 |
| 44 | −1 | −1 | 2.730 | 97.529 | 28.141 |

This table (and the tables below) summarize the results of running offline part of the example algorithm: n is the number of example in the family described above; $t_{approx}$ is the time in seconds spent on the offline stage required for the approximation part; $C_{min}$ is the additive constant appearing in Theorem 4.1; C/log N($\mathfrak{p}_1$) is the ratio between $C_{min}$ and the log of the norm of the ideal in S. Next, tables are shown with the averages over 100 runs of the example algorithm with different target precisions ε and target cost vector ($L_1$) and target angle φ=0.1 for each example for n=8, 10, . . . , 44. All columns of the tables except $N_{tr,min}$ and $N_{tr,max}$ are averages over 100 runs of the algorithm; $\rho(U_q, R_z(\varphi))$ is the obtained quality of approximation; $N_{tr,min}, N_{tr,max}, N_{tr,avg}$ are minimum, maximum and average of the number of the main loop iterations in the procedure APPROXIMATE over all samples; $t_{approx}$ is time in seconds spent on online part of the approximation stage of the algorithm.

TABLE 8

| ε | $L_1$ | $\rho(U_q, R_z((\varphi))$ | $N_{tr,min}$ | $N_{tr,max}$ | $N_{tr,avg}$ | $t_{approx}$ |
|---|---|---|---|---|---|---|
| n = 8 | | | | | | |
| $1 \cdot 10^{-5}$ | 76 | $8.65 \cdot 10^{-6}$ | 1 | 128 | 19.03 | 0.073 |
| $1 \cdot 10^{-6}$ | 89 | $8.69 \cdot 10^{-7}$ | 1 | 112 | 26.29 | 0.212 |
| $1 \cdot 10^{-7}$ | 102 | $8.66 \cdot 10^{-8}$ | 1 | 163 | 29.55 | 0.242 |
| $1 \cdot 10^{-8}$ | 116 | $8.63 \cdot 10^{-9}$ | 1 | 151 | 31.67 | 0.271 |
| $1 \cdot 10^{-9}$ | 129 | $8.62 \cdot 10^{-10}$ | 2 | 195 | 31.49 | 0.327 |
| $1 \cdot 10^{-10}$ | 142 | $8.67 \cdot 10^{-11}$ | 1 | 186 | 36.84 | 0.376 |
| $1 \cdot 10^{-15}$ | 209 | $8.66 \cdot 10^{-16}$ | 1 | 299 | 52.42 | 0.478 |
| $1 \cdot 10^{-25}$ | 341 | $8.68 \cdot 10^{-26}$ | 2 | 354 | 78.44 | 1.111 |
| $1 \cdot 10^{-30}$ | 408 | $8.69 \cdot 10^{-31}$ | 1 | 397 | 98.67 | 1.750 |
| n = 10 | | | | | | |
| $1 \cdot 10^{-5}$ | 37 | $8.61 \cdot 10^{-6}$ | 1 | 102 | 19.43 | 0.099 |
| $1 \cdot 10^{-6}$ | 44 | $8.62 \cdot 10^{-7}$ | 1 | 160 | 42.21 | 0.277 |

TABLE 8-continued

| $\varepsilon$ | $L_1$ | $\rho(U_q, R_z((\varphi))$ | $N_{tr,min}$ | $N_{tr,max}$ | $N_{tr,avg}$ | $t_{approx}$ |
|---|---|---|---|---|---|---|
| $1 \cdot 10^{-7}$ | 50 | $8.68 \cdot 10^{-8}$ | 1 | 271 | 49.29 | 0.389 |
| $1 \cdot 10^{-8}$ | 57 | $8.64 \cdot 10^{-9}$ | 1 | 139 | 25.76 | 0.350 |
| $1 \cdot 10^{-9}$ | 64 | $8.68 \cdot 10^{-10}$ | 2 | 292 | 62.61 | 0.558 |
| $1 \cdot 10^{-10}$ | 70 | $8.62 \cdot 10^{-11}$ | 1 | 312 | 71.45 | 0.681 |
| $1 \cdot 10^{-15}$ | 104 | $8.64 \cdot 10^{-16}$ | 2 | 570 | 108.9 | 0.935 |
| $1 \cdot 10^{-25}$ | 170 | $8.67 \cdot 10^{-26}$ | 1 | 1,321 | 185.05 | 2.295 |
| $1 \cdot 10^{-30}$ | 203 | $8.64 \cdot 10^{-31}$ | 1 | 509 | 90.78 | 2.589 |
| | | | $n = 12$ | | | |
| $1 \cdot 10^{-5}$ | 78 | $8.68 \cdot 10^{-6}$ | 1 | 67 | 17.96 | 0.069 |
| $1 \cdot 10^{-6}$ | 90 | $8.65 \cdot 10^{-7}$ | 1 | 76 | 19.69 | 0.200 |
| $1 \cdot 10^{-7}$ | 104 | $8.66 \cdot 10^{-8}$ | 1 | 105 | 27.02 | 0.233 |
| $1 \cdot 10^{-8}$ | 118 | $8.68 \cdot 10^{-9}$ | 1 | 174 | 26.97 | 0.291 |
| $1 \cdot 10^{-9}$ | 130 | $8.61 \cdot 10^{-10}$ | 1 | 146 | 27.91 | 0.317 |
| $1 \cdot 10^{-10}$ | 144 | $8.67 \cdot 10^{-11}$ | 1 | 149 | 33.79 | 0.371 |
| $1 \cdot 10^{-15}$ | 210 | $8.59 \cdot 10^{-16}$ | 1 | 238 | 46.1 | 0.461 |
| $1 \cdot 10^{-25}$ | 344 | $8.66 \cdot 10^{-26}$ | 1 | 351 | 71.82 | 1.164 |
| $1 \cdot 10^{-30}$ | 410 | $8.64 \cdot 10^{-31}$ | 2 | 527 | 87.47 | 1.633 |
| | | | $n = 14$ | | | |
| $1 \cdot 10^{-5}$ | 27 | $8.65 \cdot 10^{-6}$ | 1 | 87 | 20.43 | 0.163 |
| $1 \cdot 10^{-6}$ | 32 | $8.63 \cdot 10^{-7}$ | 1 | 206 | 29.84 | 0.497 |
| $1 \cdot 10^{-7}$ | 36 | $8.67 \cdot 10^{-8}$ | 1 | 157 | 31.2 | 0.538 |
| $1 \cdot 10^{-8}$ | 41 | $8.67 \cdot 10^{-9}$ | 1 | 198 | 36.99 | 0.708 |
| $1 \cdot 10^{-9}$ | 45 | $8.65 \cdot 10^{-10}$ | 1 | 256 | 37.85 | 0.783 |
| $1 \cdot 10^{-10}$ | 49 | $8.62 \cdot 10^{-11}$ | 1 | 199 | 39.5 | 0.807 |
| $1 \cdot 10^{-15}$ | 72 | $8.66 \cdot 10^{-16}$ | 1 | 235 | 51.54 | 1.107 |
| $1 \cdot 10^{-25}$ | 116 | $8.66 \cdot 10^{-26}$ | 1 | 638 | 85.51 | 2.615 |
| $1 \cdot 10^{-30}$ | 138 | $8.64 \cdot 10^{-31}$ | 5 | 459 | 111.86 | 4.064 |

TABLE 9

| $\varepsilon$ | $L_1$ | $\rho(U_q, R_z((\varphi))$ | $N_{tr,min}$ | $N_{tr,max}$ | $N_{tr,avg}$ | $t_{approx}$ |
|---|---|---|---|---|---|---|
| | | | $n = 16$ | | | |
| $1 \cdot 10^{-5}$ | 98 | $8.66 \cdot 10^{-6}$ | 1 | 110 | 22.16 | 0.816 |
| $1 \cdot 10^{-6}$ | 111 | $8.66 \cdot 10^{-7}$ | 1 | 99 | 19.03 | 0.911 |
| $1 \cdot 10^{-7}$ | 124 | $8.67 \cdot 10^{-8}$ | 1 | 116 | 22.55 | 0.987 |
| $1 \cdot 10^{-8}$ | 138 | $8.66 \cdot 10^{-9}$ | 1 | 126 | 22.24 | 1.077 |
| $1 \cdot 10^{-9}$ | 151 | $8.67 \cdot 10^{-10}$ | 1 | 86 | 24.06 | 1.192 |
| $1 \cdot 10^{-10}$ | 164 | $8.66 \cdot 10^{-11}$ | 1 | 241 | 38.3 | 1.504 |
| $1 \cdot 10^{-15}$ | 231 | $8.67 \cdot 10^{-16}$ | 1 | 221 | 34.33 | 1.856 |
| $1 \cdot 10^{-25}$ | 364 | $8.69 \cdot 10^{-26}$ | 2 | 352 | 58.02 | 4.336 |
| $1 \cdot 10^{-30}$ | 430 | $8.67 \cdot 10^{-31}$ | 1 | 456 | 69.24 | 6.612 |
| | | | $n = 18$ | | | |
| $1 \cdot 10^{-5}$ | 28 | $8.67 \cdot 10^{-6}$ | 1 | 77 | 22.13 | 0.379 |
| $1 \cdot 10^{-6}$ | 32 | $8.63 \cdot 10^{-7}$ | 1 | 133 | 34.03 | 0.445 |
| $1 \cdot 10^{-7}$ | 37 | $8.61 \cdot 10^{-8}$ | 1 | 45 | 12.65 | 0.549 |
| $1 \cdot 10^{-8}$ | 41 | $8.69 \cdot 10^{-9}$ | 1 | 81 | 16.9 | 0.667 |
| $1 \cdot 10^{-9}$ | 45 | $8.65 \cdot 10^{-10}$ | 1 | 103 | 16.36 | 0.653 |
| $1 \cdot 10^{-10}$ | 50 | $8.67 \cdot 10^{-11}$ | 3 | 162 | 39.05 | 0.720 |
| $1 \cdot 10^{-15}$ | 72 | $8.67 \cdot 10^{-16}$ | 1 | 358 | 49.58 | 0.944 |
| $1 \cdot 10^{-25}$ | 116 | $8.66 \cdot 10^{-26}$ | 1 | 476 | 82.59 | 2.280 |
| $1 \cdot 10^{-30}$ | 139 | $8.66 \cdot 10^{-31}$ | 1 | 226 | 45.13 | 3.827 |
| | | | $n = 20$ | | | |
| $1 \cdot 10^{-5}$ | 50 | $8.64 \cdot 10^{-6}$ | 1 | 49 | 12.23 | 0.833 |
| $1 \cdot 10^{-6}$ | 56 | $8.62 \cdot 10^{-7}$ | 1 | 37 | 10.13 | 0.876 |
| $1 \cdot 10^{-7}$ | 62 | $8.65 \cdot 10^{-8}$ | 1 | 72 | 14.3 | 0.974 |
| $1 \cdot 10^{-8}$ | 70 | $8.63 \cdot 10^{-9}$ | 1 | 76 | 15.4 | 1.151 |
| $1 \cdot 10^{-9}$ | 76 | $8.66 \cdot 10^{-10}$ | 1 | 82 | 16.41 | 1.225 |
| $1 \cdot 10^{-10}$ | 82 | $8.68 \cdot 10^{-11}$ | 1 | 176 | 18.24 | 1.366 |
| $1 \cdot 10^{-15}$ | 116 | $8.66 \cdot 10^{-16}$ | 1 | 124 | 21.75 | 1.916 |
| $1 \cdot 10^{-25}$ | 182 | $8.66 \cdot 10^{-26}$ | 1 | 154 | 26.96 | 4.207 |
| $1 \cdot 10^{-30}$ | 216 | $8.65 \cdot 10^{-31}$ | 1 | 352 | 41.98 | 6.611 |
| | | | $n = 22$ | | | |
| $1 \cdot 10^{-5}$ | 21 | $8.67 \cdot 10^{-6}$ | 1 | 51 | 13.38 | 1.544 |
| $1 \cdot 10^{-6}$ | 23 | $8.69 \cdot 10^{-7}$ | 1 | 71 | 13.04 | 1.634 |
| $1 \cdot 10^{-7}$ | 26 | $8.65 \cdot 10^{-8}$ | 1 | 78 | 22.48 | 1.863 |
| $1 \cdot 10^{-8}$ | 29 | $8.66 \cdot 10^{-9}$ | 1 | 148 | 21.94 | 2.321 |
| $1 \cdot 10^{-9}$ | 31 | $8.66 \cdot 10^{-10}$ | 2 | 77 | 28.86 | 2.612 |
| $1 \cdot 10^{-10}$ | 34 | $8.66 \cdot 10^{-11}$ | 1 | 105 | 31.44 | 2.423 |

TABLE 9-continued

| $\varepsilon$ | $L_1$ | $\rho(U_q, R_z((\varphi))$ | $N_{tr,min}$ | $N_{tr,max}$ | $N_{tr,avg}$ | $t_{approx}$ |
|---|---|---|---|---|---|---|
| $1 \cdot 10^{-15}$ | 47 | $8.65 \cdot 10^{-16}$ | 1 | 117 | 30.2 | 3.692 |
| $1 \cdot 10^{-25}$ | 74 | $8.64 \cdot 10^{-26}$ | 1 | 246 | 56.32 | 8.760 |
| $1 \cdot 10^{-30}$ | 87 | $8.64 \cdot 10^{-31}$ | 1 | 329 | 65.86 | 12.830 |

TABLE 10

| $\varepsilon$ | $L_1$ | $\rho(U_q, R_z((\varphi))$ | $N_{tr,min}$ | $N_{tr,max}$ | $N_{tr,avg}$ | $t_{approx}$ |
|---|---|---|---|---|---|---|
| | | | $n = 24$ | | | |
| $1 \cdot 10^{-5}$ | 98 | $8.65 \cdot 10^{-6}$ | 1 | 50 | 11.88 | 0.815 |
| $1 \cdot 10^{-6}$ | 112 | $8.66 \cdot 10^{-7}$ | 1 | 82 | 14.89 | 0.922 |
| $1 \cdot 10^{-7}$ | 126 | $8.68 \cdot 10^{-8}$ | 1 | 61 | 13.42 | 1.046 |
| $1 \cdot 10^{-8}$ | 138 | $8.65 \cdot 10^{-9}$ | 1 | 91 | 17.72 | 1.155 |
| $1 \cdot 10^{-9}$ | 152 | $8.68 \cdot 10^{-10}$ | 1 | 120 | 19.03 | 1.340 |
| $1 \cdot 10^{-10}$ | 166 | $8.66 \cdot 10^{-11}$ | 1 | 159 | 23.67 | 1.240 |
| $1 \cdot 10^{-15}$ | 232 | $8.65 \cdot 10^{-16}$ | 1 | 146 | 23.65 | 1.919 |
| $1 \cdot 10^{-25}$ | 364 | $8.64 \cdot 10^{-26}$ | 2 | 192 | 37.63 | 4.528 |
| $1 \cdot 10^{-30}$ | 432 | $8.67 \cdot 10^{-31}$ | 1 | 287 | 47.19 | 6.778 |
| | | | $n = 26$ | | | |
| $1 \cdot 10^{-5}$ | 20 | $8.66 \cdot 10^{-6}$ | 1 | 116 | 26.32 | 2.984 |
| $1 \cdot 10^{-6}$ | 22 | $8.66 \cdot 10^{-7}$ | 1 | 153 | 35.34 | 3.472 |
| $1 \cdot 10^{-7}$ | 24 | $8.66 \cdot 10^{-8}$ | 1 | 133 | 36.1 | 3.787 |
| $1 \cdot 10^{-8}$ | 27 | $8.65 \cdot 10^{-9}$ | 1 | 135 | 26.2 | 3.539 |
| $1 \cdot 10^{-9}$ | 29 | $8.67 \cdot 10^{-10}$ | 1 | 160 | 29.87 | 4.035 |
| $1 \cdot 10^{-10}$ | 31 | $8.66 \cdot 10^{-11}$ | 2 | 130 | 36.41 | 4.600 |
| $1 \cdot 10^{-15}$ | 42 | $8.67 \cdot 10^{-16}$ | 1 | 291 | 55.91 | 7.531 |
| $1 \cdot 10^{-25}$ | 64 | $8.66 \cdot 10^{-26}$ | 1 | 454 | 73.41 | 15.297 |
| $1 \cdot 10^{-30}$ | 75 | $8.66 \cdot 10^{-31}$ | 1 | 454 | 56.26 | 19.222 |
| | | | $n = 28$ | | | |
| $1 \cdot 10^{-5}$ | 42 | $8.66 \cdot 10^{-6}$ | 1 | 76 | 17.85 | 2.784 |
| $1 \cdot 10^{-6}$ | 47 | $8.66 \cdot 10^{-7}$ | 1 | 66 | 14.99 | 2.548 |
| $1 \cdot 10^{-7}$ | 51 | $8.68 \cdot 10^{-8}$ | 1 | 85 | 22.34 | 2.846 |
| $1 \cdot 10^{-8}$ | 56 | $8.66 \cdot 10^{-9}$ | 1 | 128 | 20.5 | 3.168 |
| $1 \cdot 10^{-9}$ | 60 | $8.67 \cdot 10^{-10}$ | 1 | 162 | 23.79 | 3.299 |
| $1 \cdot 10^{-10}$ | 64 | $8.66 \cdot 10^{-11}$ | 1 | 135 | 31.42 | 3.772 |
| $1 \cdot 10^{-15}$ | 87 | $8.66 \cdot 10^{-16}$ | 1 | 224 | 31.28 | 5.903 |
| $1 \cdot 10^{-25}$ | 131 | $8.66 \cdot 10^{-26}$ | 1 | 204 | 43.22 | 12.796 |
| $1 \cdot 10^{-30}$ | 153 | $8.65 \cdot 10^{-31}$ | 1 | 263 | 45.78 | 17.147 |
| | | | $n = 30$ | | | |
| $1 \cdot 10^{-5}$ | 23 | $8.65 \cdot 10^{-6}$ | 1 | 67 | 11.67 | 0.625 |
| $1 \cdot 10^{-6}$ | 27 | $8.67 \cdot 10^{-7}$ | 1 | 61 | 14.29 | 0.825 |
| $1 \cdot 10^{-7}$ | 30 | $8.7 \cdot 10^{-8}$ | 1 | 75 | 13.18 | 0.874 |
| $1 \cdot 10^{-8}$ | 33 | $8.63 \cdot 10^{-9}$ | 1 | 63 | 16.27 | 0.982 |
| $1 \cdot 10^{-9}$ | 37 | $8.68 \cdot 10^{-10}$ | 1 | 70 | 19.81 | 1.189 |
| $1 \cdot 10^{-10}$ | 40 | $8.64 \cdot 10^{-11}$ | 1 | 156 | 20.87 | 1.250 |
| $1 \cdot 10^{-15}$ | 56 | $8.67 \cdot 10^{-16}$ | 1 | 154 | 31.02 | 1.574 |
| $1 \cdot 10^{-25}$ | 90 | $8.66 \cdot 10^{-26}$ | 1 | 197 | 36.21 | 3.900 |
| $1 \cdot 10^{-30}$ | 106 | $8.65 \cdot 10^{-31}$ | 1 | 210 | 49.94 | 5.623 |

TABLE 11

| $\varepsilon$ | $L_1$ | $\rho(U_q, R_z((\varphi))$ | $N_{tr,min}$ | $N_{tr,max}$ | $N_{tr,avg}$ | $t_{approx}$ |
|---|---|---|---|---|---|---|
| | | | $n = 32$ | | | |
| $1 \cdot 10^{-5}$ | 170 | $8.66 \cdot 10^{-6}$ | 1 | 133 | 30.76 | 8.326 |
| $1 \cdot 10^{-6}$ | 183 | $8.66 \cdot 10^{-7}$ | 1 | 182 | 35.13 | 8.556 |
| $1 \cdot 10^{-7}$ | 197 | $8.66 \cdot 10^{-8}$ | 1 | 415 | 36.98 | 10.075 |
| $1 \cdot 10^{-8}$ | 210 | $8.66 \cdot 10^{-9}$ | 1 | 191 | 31.61 | 10.317 |
| $1 \cdot 10^{-9}$ | 223 | $8.66 \cdot 10^{-10}$ | 1 | 178 | 41.23 | 11.530 |
| $1 \cdot 10^{-10}$ | 237 | $8.66 \cdot 10^{-11}$ | 4 | 237 | 48.6 | 12.149 |
| $1 \cdot 10^{-15}$ | 303 | $8.66 \cdot 10^{-16}$ | 1 | 198 | 40.82 | 16.668 |
| $1 \cdot 10^{-25}$ | 436 | $8.66 \cdot 10^{-26}$ | 1 | 302 | 61.2 | 32.528 |
| $1 \cdot 10^{-30}$ | 502 | $8.66 \cdot 10^{-31}$ | 1 | 346 | 69.61 | 42.645 |
| | | | $n = 34$ | | | |
| $1 \cdot 10^{-5}$ | 38 | $8.65 \cdot 10^{-6}$ | 1 | 238 | 33.2 | 7.857 |
| $1 \cdot 10^{-6}$ | 42 | $8.66 \cdot 10^{-7}$ | 1 | 251 | 39.74 | 9.701 |
| $1 \cdot 10^{-7}$ | 45 | $8.66 \cdot 10^{-8}$ | 1 | 162 | 36.29 | 9.778 |

TABLE 11-continued

| $\varepsilon$ | $L_1$ | $\rho(U_q, R_z((\varphi))$ | $N_{tr,min}$ | $N_{tr,max}$ | $N_{tr,avg}$ | $t_{approx}$ |
|---|---|---|---|---|---|---|
| $1 \cdot 10^{-8}$ | 48 | $8.65 \cdot 10^{-9}$ | 1 | 133 | 34.7 | 9.225 |
| $1 \cdot 10^{-9}$ | 52 | $8.66 \cdot 10^{-10}$ | 1 | 206 | 37.21 | 10.723 |
| $1 \cdot 10^{-10}$ | 55 | $8.66 \cdot 10^{-11}$ | 1 | 198 | 45.27 | 13.598 |
| $1 \cdot 10^{-15}$ | 72 | $8.66 \cdot 10^{-16}$ | 1 | 441 | 46.66 | 18.113 |
| $1 \cdot 10^{-25}$ | 105 | $8.66 \cdot 10^{-26}$ | 1 | 254 | 54.74 | 35.632 |
| $1 \cdot 10^{-30}$ | 122 | $8.66 \cdot 10^{-31}$ | 1 | 394 | 77.65 | 51.990 |
| | | n = 36 | | | | |
| $1 \cdot 10^{-5}$ | 44 | $8.65 \cdot 10^{-6}$ | 1 | 109 | 19.75 | 2.746 |
| $1 \cdot 10^{-6}$ | 48 | $8.65 \cdot 10^{-7}$ | 1 | 72 | 19.58 | 2.746 |
| $1 \cdot 10^{-7}$ | 52 | $8.66 \cdot 10^{-8}$ | 1 | 105 | 23.99 | 2.879 |
| $1 \cdot 10^{-8}$ | 56 | $8.66 \cdot 10^{-9}$ | 1 | 60 | 19.23 | 3.048 |
| $1 \cdot 10^{-9}$ | 62 | $8.66 \cdot 10^{-10}$ | 1 | 152 | 30.17 | 3.880 |
| $1 \cdot 10^{-10}$ | 66 | $8.66 \cdot 10^{-11}$ | 1 | 160 | 28.35 | 4.004 |
| $1 \cdot 10^{-15}$ | 88 | $8.67 \cdot 10^{-16}$ | 1 | 211 | 38.6 | 6.212 |
| $1 \cdot 10^{-25}$ | 132 | $8.66 \cdot 10^{-26}$ | 1 | 241 | 48.72 | 12.719 |
| $1 \cdot 10^{-30}$ | 154 | $8.66 \cdot 10^{-31}$ | 1 | 311 | 61.65 | 18.355 |
| | | n = 38 | | | | |
| $1 \cdot 10^{-5}$ | 19 | $8.66 \cdot 10^{-6}$ | 1 | 149 | 26.57 | 13.018 |
| $1 \cdot 10^{-6}$ | 21 | $8.66 \cdot 10^{-7}$ | 1 | 136 | 27.4 | 15.025 |
| $1 \cdot 10^{-7}$ | 22 | $8.66 \cdot 10^{-8}$ | 1 | 208 | 39.52 | 15.637 |
| $1 \cdot 10^{-8}$ | 24 | $8.66 \cdot 10^{-9}$ | 3 | 191 | 38.08 | 17.399 |
| $1 \cdot 10^{-9}$ | 25 | $8.66 \cdot 10^{-10}$ | 1 | 157 | 35.81 | 18.434 |
| $1 \cdot 10^{-10}$ | 27 | $8.66 \cdot 10^{-11}$ | 1 | 180 | 39.61 | 19.639 |
| $1 \cdot 10^{-15}$ | 34 | $8.66 \cdot 10^{-16}$ | 1 | 327 | 54.22 | 27.450 |
| $1 \cdot 10^{-25}$ | 49 | $8.67 \cdot 10^{-26}$ | 2 | 361 | 65.16 | 56.848 |
| $1 \cdot 10^{-30}$ | 56 | $8.66 \cdot 10^{-31}$ | 1 | 459 | 71.79 | 73.107 |

TABLE 12

| $\varepsilon$ | $L_1$ | $\rho(U_q, R_z((\varphi))$ | $N_{tr,min}$ | $N_{tr,max}$ | $N_{tr,avg}$ | $t_{approx}$ |
|---|---|---|---|---|---|---|
| | | n = 40 | | | | |
| $1 \cdot 10^{-5}$ | 82 | $8.66 \cdot 10^{-6}$ | 1 | 82 | 16.13 | 8.625 |
| $1 \cdot 10^{-6}$ | 90 | $8.65 \cdot 10^{-7}$ | 1 | 79 | 18.79 | 9.455 |
| $1 \cdot 10^{-7}$ | 96 | $8.66 \cdot 10^{-8}$ | 1 | 89 | 16.4 | 9.899 |
| $1 \cdot 10^{-8}$ | 102 | $8.66 \cdot 10^{-9}$ | 1 | 79 | 19.49 | 10.597 |
| $1 \cdot 10^{-9}$ | 110 | $8.66 \cdot 10^{-10}$ | 1 | 107 | 19.77 | 12.147 |
| $1 \cdot 10^{-10}$ | 116 | $8.67 \cdot 10^{-11}$ | 1 | 131 | 16.77 | 11.968 |
| $1 \cdot 10^{-15}$ | 150 | $8.66 \cdot 10^{-16}$ | 1 | 130 | 25.94 | 18.669 |
| $1 \cdot 10^{-25}$ | 216 | $8.66 \cdot 10^{-26}$ | 1 | 181 | 35.68 | 33.633 |
| $1 \cdot 10^{-30}$ | 250 | $8.66 \cdot 10^{-31}$ | 1 | 153 | 36.82 | 48.701 |
| | | n = 42 | | | | |
| $1 \cdot 10^{-5}$ | 20 | $8.66 \cdot 10^{-6}$ | 1 | 82 | 11.88 | 2.396 |
| $1 \cdot 10^{-6}$ | 22 | $8.66 \cdot 10^{-7}$ | 1 | 64 | 14.22 | 2.547 |
| $1 \cdot 10^{-7}$ | 25 | $8.65 \cdot 10^{-8}$ | 1 | 73 | 17.03 | 2.646 |
| $1 \cdot 10^{-8}$ | 27 | $8.66 \cdot 10^{-9}$ | 1 | 101 | 16.12 | 2.950 |
| $1 \cdot 10^{-9}$ | 29 | $8.67 \cdot 10^{-10}$ | 1 | 68 | 15.15 | 3.109 |
| $1 \cdot 10^{-10}$ | 31 | $8.66 \cdot 10^{-11}$ | 1 | 75 | 18.68 | 3.420 |
| $1 \cdot 10^{-15}$ | 42 | $8.68 \cdot 10^{-16}$ | 1 | 173 | 22.95 | 5.191 |
| $1 \cdot 10^{-25}$ | 64 | $8.66 \cdot 10^{-26}$ | 1 | 131 | 33.37 | 11.135 |
| $1 \cdot 10^{-30}$ | 75 | $8.66 \cdot 10^{-31}$ | 1 | 223 | 35.94 | 15.043 |
| | | n = 44 | | | | |
| $1 \cdot 10^{-5}$ | 42 | $8.66 \cdot 10^{-6}$ | 1 | 150 | 22.14 | 22.552 |
| $1 \cdot 10^{-6}$ | 46 | $8.66 \cdot 10^{-7}$ | 1 | 141 | 25.34 | 25.966 |
| $1 \cdot 10^{-7}$ | 48 | $8.66 \cdot 10^{-8}$ | 1 | 104 | 24.45 | 27.323 |
| $1 \cdot 10^{-8}$ | 50 | $8.66 \cdot 10^{-9}$ | 1 | 112 | 29.35 | 27.838 |
| $1 \cdot 10^{-9}$ | 54 | $8.66 \cdot 10^{-10}$ | 1 | 141 | 24.78 | 31.356 |
| $1 \cdot 10^{-10}$ | 56 | $8.66 \cdot 10^{-11}$ | 1 | 122 | 28.01 | 33.021 |
| $1 \cdot 10^{-15}$ | 70 | $8.66 \cdot 10^{-16}$ | 1 | 163 | 27.98 | 44.929 |
| $1 \cdot 10^{-25}$ | 96 | $8.66 \cdot 10^{-26}$ | 1 | 207 | 41 | 81.426 |
| $1 \cdot 10^{-30}$ | 108 | $8.66 \cdot 10^{-31}$ | 2 | 141 | 38.83 | 105.410 |

8. Further Implementation Details

In FIG. 11 and FIG. 12, pseudo-code is provided for the versions of procedures UNIT-ANDJUST (FIG. 11) and RANDOM-INTEGER-POINT (FIG. 12) that can be used in implementations of the disclosed algorithm. They are useful to reproduce values of additive constant listed in Section 6 and Section 7. They both rely on the Nearest Plane Algorithm shown in FIG. 10). For given target vector t, the Nearest Plane algorithm finds unique lattice vector Bv inside t+C(B*). See Section 3.5 for the definition of C(B*) and other related definitions.

Figure 18:
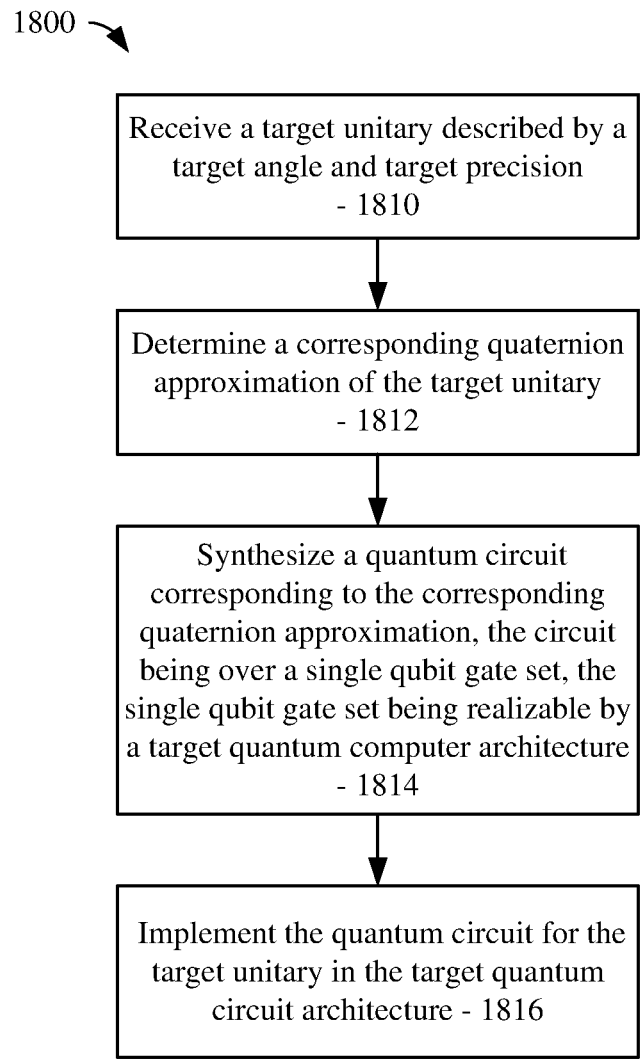
FIG. 18 is a flow chart showing an example synthesis process for producing a gate set in accordance with embodiments of the disclosed technology.

9. Example Overall Quantum Computer Gate Set Generation and Implementation Techniques FIG. 18 is a flow chart 1800 showing an example synthesis process for producing a gate set in accordance with embodiments of the disclosed technology. The process can be performed, for instance, by a quantum computer synthesis tool adapted for use in a quantum computer design and implementation process and implemented by one or more computing devices. Although the process in FIG. 18 is described with respect to a single qubit gate sets, the size and complexity of the input design and/or resulting gate sets can vary. In certain example embodiments, for instance, the process of FIG. 18 (or any of the processes disclosed herein) is used as part of a synthesis process generating a gate set description specifying 500 or more, 1000 or more, or 2500 or more gates. The particular operations or sequence should not be construed as limiting, as they can be performed alone or in any combination or subcombination with one another. Additionally, the illustrated operations can be performed together with one or more other operations. Still further, the identified operations need not be performed by a single software module, but can be implemented using multiple modules or software tools, which collectively perform the illustrated method.

At 1810, a target unitary described by a target angle and target precision is received (e.g., input, buffered into memory, or otherwise prepared for further processing).

At 1812, a corresponding quaternion approximation of the target unitary is determined. In particular embodiments, the corresponding quaternion approximation describes the target unitary in quaternion algebra. In some embodiments, and as discussed in detail above, the synthesis procedure can further comprise determining a cost vector for the target unitary (e.g., a cost vector describing a limit on a size of the single qubit gate set resulting from the synthesis procedure). In such embodiments, the act of determining the corresponding quaternion approximation can comprise finding one or more corresponding quaternion approximations that satisfy the cost vector. In some embodiments, the determining the corresponding quaternion approximation of the target unitary comprises selecting a first integer for use as a first quaternion element in the quaternion approximation, the first integer being selected so that a distance threshold to a $R_x$, $R_y$, or $R_z$ rotation is satisfied. In such embodiments, a second integer for use as a second quaternion element in the quaternion approximation can also be selected, the second integer being selected so that, in combination with the first integer, the quaternion approximation produces a single qubit gate set that satisfies a cost threshold or gate set size limit. In particular implementations, the first integer and the second integer are selected from a ring of integers of the CM-field K. In particular implementations, the determining a corresponding quaternion approximation of the target unitary comprises finding a quaternion from the generalized Lipschitz order that has the following two properties: (1) $d(U_q, R_z(\varphi)) \leq \varepsilon$; and (2) $nrd(q)\mathbb{Z}_F = \mathbb{Z}_1^{L_1} \ldots \mathbb{Z}_M^{L_M}$, where $d = \sqrt{1 - |Tr(U_q^d R_z(\varphi)|/2}$, $\mathbb{Z}_1, \ldots, \mathbb{Z}_M$ are the appropriate prime ideals of $\mathbb{Z}_F$, and $L_1, \ldots, L_M \in \mathbb{Z}$ are their respective multiplicities in the decomposition of $\mathrm{nrd}(q)\mathbb{Z}_F$.

At 1814, the corresponding quaternion approximation is synthesized to produce a quantum circuit, the quantum circuit being over a single qubit gate set, get unitary, the single qubit gate set being realizable by a target quantum computer architecture. The single qubit gate set can be a Clifford+T basis gate set, a Clifford+$e^{i\pi Z/12}$ basis gate set, a Clifford+$e^{i\pi Z/16}$ basis gate set, a V-basis gate set, or any other single qubit base set expressible in terms of totally definite quaternion algebra.

At 1816, the quantum circuit is implemented in a target quantum circuit architecture. For instance, such implementation can be performed by a quantum circuit controller coupled to the target quantum circuit architecture and configured to implement the single qubit gate set for the target unitary in the target quantum circuit architecture. For example, embodiments as described in FIG. 21 can be used.

Figure 19:
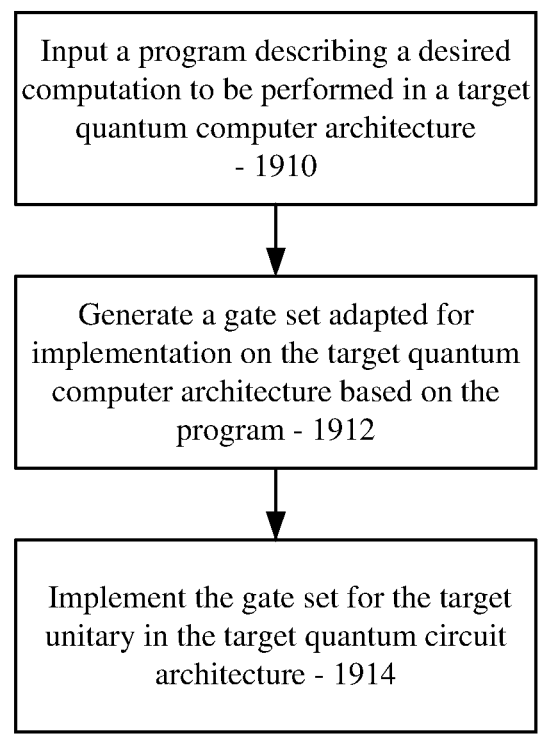
FIG. 19 is a flow chart showing another example synthesis process for producing a gate set in accordance with embodiments of the disclosed technology.

FIG. 19 is a flow chart 1900 showing another example synthesis process for producing a gate set in accordance with embodiments of the disclosed technology. The process can be performed, for instance, by a quantum computer synthesis tool adapted for use in a quantum computer design and implementation process and implemented by one or more computing devices. The size and complexity of the input design and/or resulting gate sets can vary. In certain example embodiments, for instance, the process of FIG. 19 (or any of the processes disclosed herein) generates a gate set description specifying 500 or more, 1000 or more, or 2500 or more gates. The particular operations or sequence should not be construed as limiting, as they can be performed alone or in any combination or subcombination with one another. Additionally, the illustrated operations can be performed together with one or more other operations. Still further, the identified operations need not be performed by a single software module, but can be implemented using multiple modules or software tools, which collectively perform the illustrated method.

At 1910, a program describing a desired computation to be performed in a target quantum computer architecture is input (e.g., buffered into memory or otherwise prepared for further processing).

At 1912, a gate set adapted for implementation on the target quantum computer architecture is generated based on the program. In the illustrated embodiment, the generating of the gate set includes generating a single qubit circuit for one or more respective unitaries used to perform the desired computation. Further, and as discussed in detail above, the generating the single qubit circuit comprises identifying a target unitary, and determining a corresponding quaternion approximation of the target unitary using a process in which one or more of the elements in the corresponding quaternion approximation are randomly selected.

At 1914, the gate set is implemented in a target quantum circuit architecture. For instance, such implementation can be performed by a quantum circuit controller coupled to the target quantum circuit architecture and configured to implement the gate set in the target quantum circuit architecture. For example, embodiments as described in FIG. 21 can be used.

In particular implementations, the determining the corresponding quaternion approximation of the target unitary comprises randomly selecting one or more values for use in the corresponding quaternion approximation from a constrained body of values that guarantees that a norm equation is solvable, and solving the norm equation to determine at least another one of the elements in the corresponding quaternion approximation. Further, in some implementations, the at least another one of the elements in the corresponding quaternion approximation is z, where $z \in K$, and wherein the norm equation for z is $z(z^*)=e$, where e is an element of the totally real subfield F.

In some implementations, the determining the corresponding quaternion approximation of the target unitary comprises randomly sampling points from subsets of a ring of integers, and using the randomly selected sampling points as quaternion elements in the quaternion approximation. For example, the ring of integers can be a ring of integers of the CM-field K.

In certain implementations, the determining the corresponding quaternion approximation of the target comprises: partitioning a convex body of complex numbers into convex subsets, the partitioning being performed such that each subset has a lattice point corresponding to $\mathbb{Z}_K$; randomly selecting one of the subsets; selecting a lattice point corresponding to $\mathbb{Z}_K$ from the randomly selected subset; and using the selected lattice point as an element in the quaternion approximation.

Figure 20:
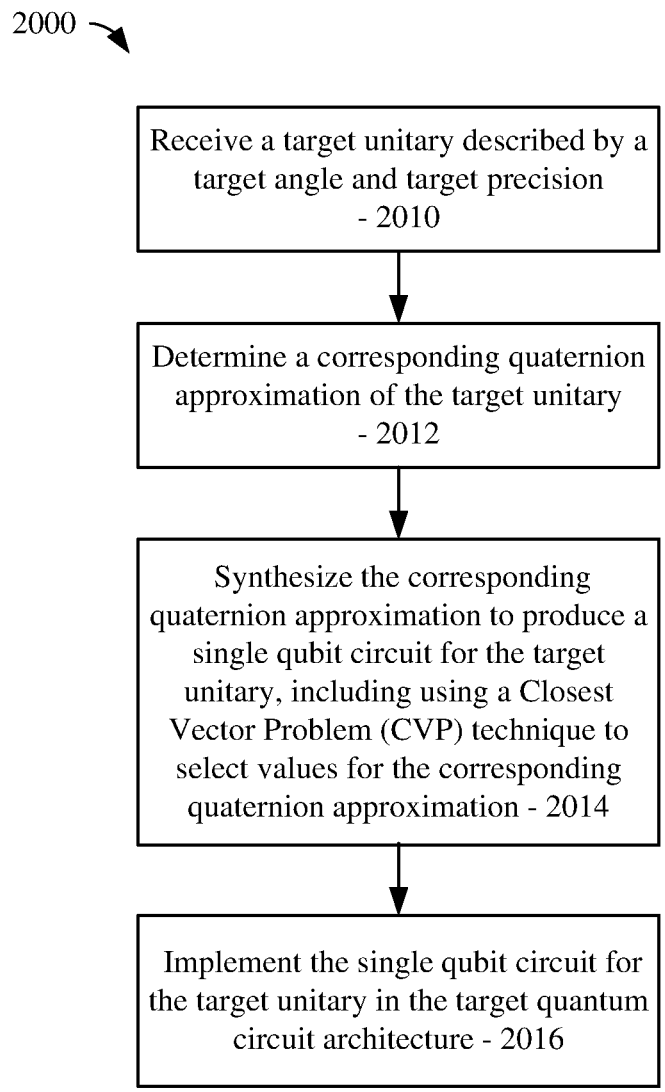
FIG. 20 is a flow chart showing another example synthesis process for producing a gate set in accordance with embodiments of the disclosed technology.

FIG. 20 is a flow chart 2000 showing another example synthesis process for producing a gate set in accordance with embodiments of the disclosed technology. The process can be performed, for instance, by a quantum computer synthesis tool adapted for use in a quantum computer design and implementation process and implemented by one or more computing devices. Although the process in FIG. 20 is described with respect to a single qubit gate sets, the size and complexity of the input design and/or resulting gate sets can vary. In certain example embodiments, for instance, the process of FIG. 20 (or any of the processes disclosed herein) is used as part of a synthesis process generating a gate set description specifying 500 or more, 1000 or more, or 2500 or more gates. The particular operations or sequence should not be construed as limiting, as they can be performed alone or in any combination or subcombination with one another. Additionally, the illustrated operations can be performed together with one or more other operations. Still further, the identified operations need not be performed by a single software module, but can be implemented using multiple modules or software tools, which collectively perform the illustrated method.

At 2010, a target unitary described by a target angle and target precision is received (e.g., input, buffered into memory, or other prepared for further processing).

At 2012, a corresponding quaternion approximation of the target unitary is determined.

At 2014, the corresponding quaternion approximation is synthesized to produce a single qubit circuit for the target unitary, the single qubit circuit being realizable by a quantum computer architecture.

Further, in the illustrated embodiment and as discussed in detail above, the act of determining the corresponding quaternion approximation of the target unitary uses a Closest Vector Problem (CVP) technique to select values for the corresponding quaternion approximation. In some embodiments, the determining the corresponding quaternion approximation of the target unitary comprises selecting values from a Hermite-Korkine-Zolotarev, Block-Korkine-Zolotarev, Lenstra-Lenstra-Lovasz, or other size-reduced basis as an element in the corresponding quaternion approximation. In certain embodiments, the determining the corresponding quaternion approximation of the target unitary comprises using a Lenstra-Lenstra-Lovasz or other lattice basis reduction technique.

At 2016, the single qubit circuit for the target unitary is implemented in a target quantum circuit architecture. For instance, such implementation can be performed by a quantum circuit controller coupled to the target quantum circuit architecture and configured to implement the single qubit gate set for the target unitary in the target quantum circuit architecture. For example, embodiments as described in FIG. 21 can be used.

10. Representative Computing Environments

Figure 21:
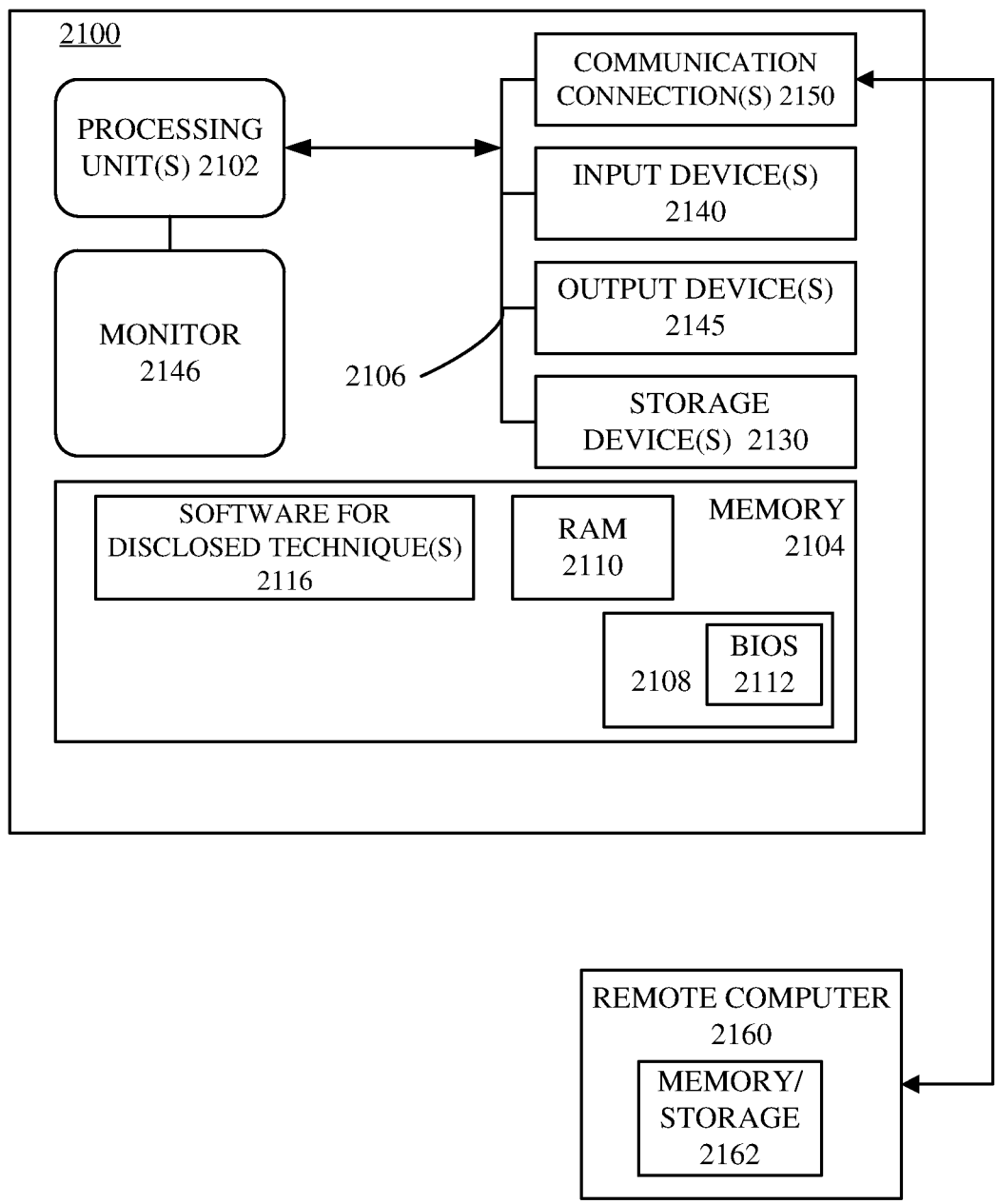
FIG. 21 is a block diagram showing a representative computing environment in which aspects of the disclosed technology can be implemented.

FIG. 21 and the following discussion are intended to provide a brief, general description of an exemplary computing environment in which the disclosed technology may be implemented. Although not required, the disclosed technology is described in the general context of computer executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 21, an exemplary system for implementing the disclosed technology includes a general purpose computing device in the form of an exemplary conventional PC 2100, including one or more processing units 2102, a system memory 2104, and a system bus 2106 that couples various system components including the system memory 2104 to the one or more processing units 2102. The system bus 2106 may be any of several types of bus structures including a memory bus or memory controller, a peripheral bus, and/or a local bus using any of a variety of bus architectures. The exemplary system memory 2104 includes read only memory (ROM) 2108 and random access memory (RAM) 2110. A basic input/output system (BIOS) 2112, containing the basic routines that help with the transfer of information between elements within the PC 2100, is stored in ROM 2108. As shown in FIG. 21, the system memory 2104 stores computer-executable instructions for performing any of the disclosed techniques (e.g., determining quaternion approximations, quaternion mappings, defining special unitaries, finding gate sets, algebraic computations, and exact/approximate circuit synthesis) in respective memory portions (shown generally as executable software 2116 for performing any embodiment of the disclosed synthesis techniques)).

The exemplary PC 2100 further includes one or more storage devices 2130, such as a hard disk drive for reading from and writing to a hard disk, a magnetic disk drive for reading from or writing to a removable magnetic disk, and/OR an optical disk drive for reading from or writing to a removable optical disk (such as a CD-ROM or other optical media). Such storage devices can be connected to the system bus 2106 by a hard disk drive interface, a magnetic disk drive interface, and/or an optical drive interface, respectively. The drives and their associated computer readable media provide nonvolatile storage of computer-readable instructions, data structures, program modules, and other data for the PC 2100. Other types of computer-readable media which can store data that is accessible by a PC, such as magnetic cassettes, flash memory, digital video disks, CDs, DVDs, RAMs, NVRAMs, ROMs, and the like, may also be used in the exemplary operating environment. As used herein, the terms storage, memory, and computer-readable media do not include or encompass propagating carrier waves or signals per se.

A number of program modules may be stored in the storage devices 2130, including an operating system, one or more application programs, other program modules, and program data. Storage of results of quantum syntheses and instructions for obtaining such syntheses (e.g., instructions for performing any embodiment of the disclosed technology) can be stored in the storage devices 2130. A user may enter commands and information into the PC 2100 through one or more input devices 2140 such as a keyboard and a pointing device such as a mouse. Other input devices may include a digital camera, microphone, joystick, game pad, satellite dish, scanner, or the like. These and other input devices are often connected to the one or more processing units 2102 through a serial port interface that is coupled to the system bus 2106, but may be connected by other interfaces such as a parallel port, game port, or universal serial bus (USB). A monitor 2146 or other type of display device is also connected to the system bus 2106 via an interface, such as a video adapter. Other peripheral output devices, such as speakers and printers (not shown), may be included. In some cases, a user interface is displayed so that a user can input a circuit for synthesis, and verify successful synthesis.

The PC 2100 may operate in a networked environment using logical connections to one or more remote computers, such as a remote computer 2160. In some examples, one or more network or communication connections 2150 are included. The remote computer 2160 may be another PC, a server, a router, a network PC, or a peer device or other common network node, and typically includes many or all of the elements described above relative to the PC 2100, although only a memory storage device 2162 has been illustrated in FIG. 21. The personal computer 2100 and/or the remote computer 2160 can be connected to a logical a local area network (LAN) and a wide area network (WAN). Such networking environments are commonplace in offices, enterprise wide computer networks, intranets, and the Internet.

When used in a LAN networking environment, the PC 2100 is connected to the LAN through a network interface. When used in a WAN networking environment, the PC 2100 typically includes a modem or other means for establishing communications over the WAN, such as the Internet. In a networked environment, program modules depicted relative to the personal computer 2100, or portions thereof, may be stored in the remote memory storage device or other locations on the LAN or WAN. The network connections shown are exemplary, and other means of establishing a communications link between the computers may be used.

Figure 22:
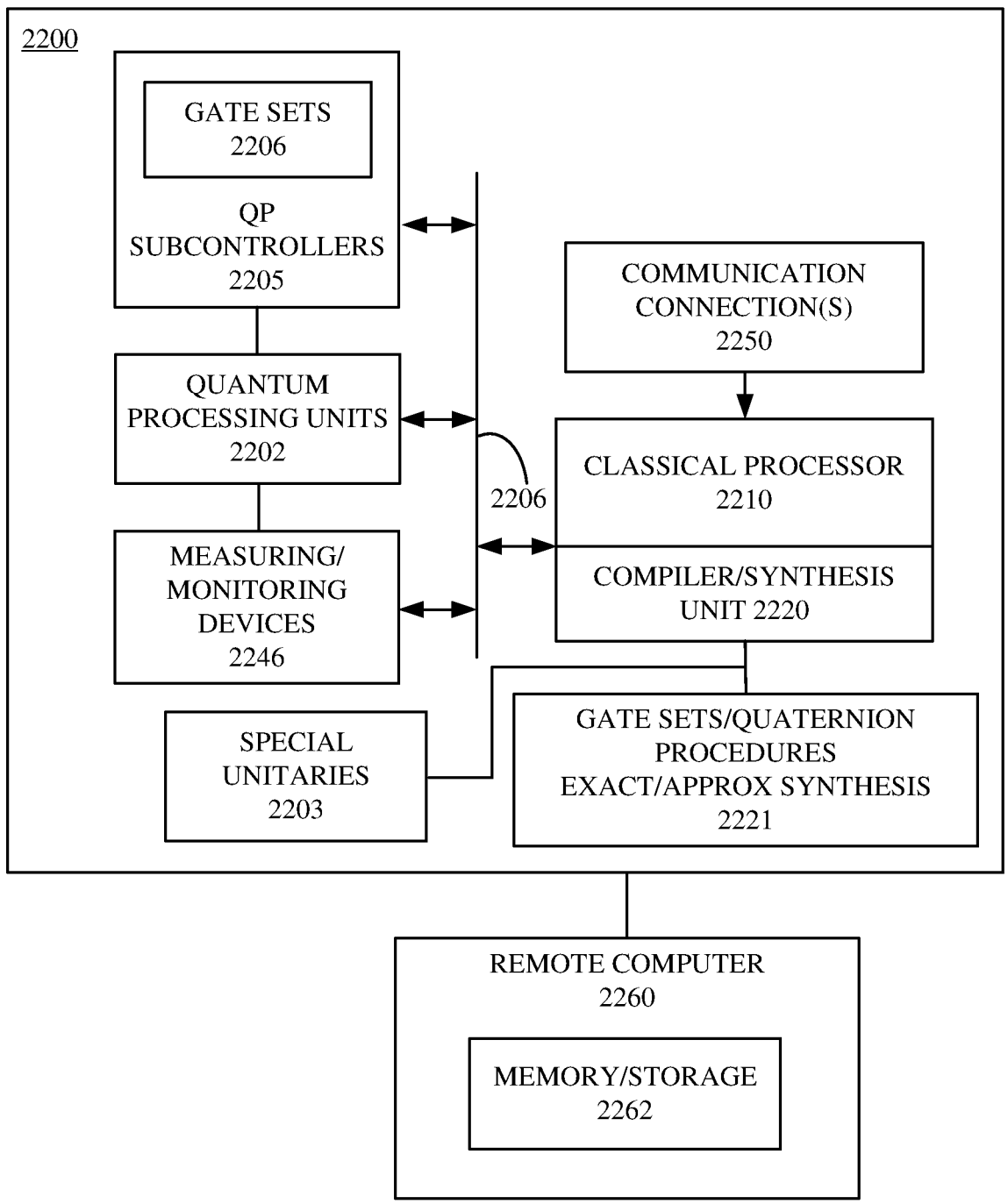
FIG. 22 is a block diagram showing an exemplary system for implementing the disclosed technology, including quantum processing units and quantum controllers for implementing circuit created using embodiments of the disclosed technology.

With reference to FIG. 22, an exemplary system for implementing the disclosed technology includes computing environment 2200, where synthesis (compilation) into implementable gate sets (e.g., using any of the disclosed embodiments) is separated from the quantum processing that consumes the compiled circuits. The environment includes one or more quantum processing unit(s) 2202 and one or more monitoring/measuring device(s) 2246. The quantum processing unit(s) execute quantum circuits that are synthesized by synthesis/compiler unit 2220 (e.g., configured to perform any of the disclosed procedures) using one or more classical processor(s) 2210. The synthesized/compiled quantum circuits are downloaded into or used to program or configure the quantum processing unit(s) 2202 (e.g., via control lines (quantum bus) 2206). Synthesis procedures according to any of the disclosed embodiments (e.g., synthesis procedures associated with quaternion approximations and gate sets are stored in a memory 2221, and special unitaries or procedures associated with such unitaries are stored in a memory 2203.

With reference to FIG. 22, synthesis (or compilation) is the process of translating a high-level description of a quantum algorithm into gate sets (e.g., a sequence of quantum circuits. Such high-level descriptions may be stored, as the case may be, on one or more external computer(s) 2260 outside the computing environment 2200 utilizing one or more memory and/or storage device(s) 2262, then downloaded as necessary into the computing environment 2200 via one or more communication connection(s) 2250. Gate sets (circuits) 2206 defined using gate sets from quaternion algebra based synthesis (according to any of the disclosed embodiments) are coupled to the quantum processor 2202.

The quantum processing unit(s) can be one or more of, but are not limited to: (a) a superconducting quantum computer; (b) an ion trap quantum computer; or (c) a fault-tolerant architecture for quantum computing (e.g., a topological quantum computer using Majorana zero modes). The synthesized gate sets (e.g., using any of the disclosed embodiments) can be sent into (or otherwise applied to) the quantum processing unit(s) via control lines 2206 at the control of the classical processor 2210 and/or synthesis unit 2220. In the illustrated example, the desired quantum computing process is implemented with the aid of one or more QP subcontrollers 2205 that are specially adapted to control a corresponding one of the quantum processor(s) 2202. For instance, in one example, the classical processor 2210 and/or synthesis unit 2220 facilitates implementation of the compiled quantum circuit by sending instructions to one or more memories (e.g., lower-temperature memories), which then pass the instructions to low-temperature control unit(s) (e.g., QP subcontroller(s) 2205) that transmit, for instance, pulse sequences representing the gates to the quantum processing unit(s) 2202 for implementation. In other examples, the QP subcontroller(s) 2205 operate to provide appropriate magnetic fields, encoded operations, or other such control signals to the quantum processing unit(s) 2202 to implement the operations of the compiled quantum computer circuit description. The classical processor 2210 can further interact with measuring/monitoring devices (e.g., readout devices) 2246 to help control and implement the desired quantum computing process (e.g., by reading or measuring out data results from the quantum processing units once available, etc.)

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

What is claimed is:

1. A quantum circuit synthesizer system, comprising:
a processor; and
at least one memory coupled to the processor and having stored thereon processor-executable instructions for a quantum computer synthesis procedure that comprises:
receiving a target unitary described by a target angle and target precision;
determining a corresponding quaternion approximation of the target unitary; and
synthesizing a quantum circuit corresponding to the quaternion approximation, the circuit being over a single qubit gate set, the single qubit gate set being realizable by a target quantum computer architecture, wherein the determining a corresponding quaternion approximation of the target unitary comprises finding a quaternion from an order of a totally definite quaternion algebra defined over a totally real number field F that has the following two properties:

$$d(U_q, R_z(\varphi)) \leq \varepsilon; \quad (1) \text{ and}$$

$$nrd(q)\mathbb{Z}_F = \mathfrak{p}_1^{L_1} \ldots \mathfrak{p}_M^{L_M}, \quad (2)$$

wherein d is a distance function, $\mathfrak{p}_1, \ldots, \mathfrak{p}_M$ are the appropriate prime ideals of $\mathbb{Z}_{F_1}$, $L_1, \ldots, L_M \in \mathbb{Z}$ are their respective multiplicities in the decomposition of $nrd(q)\mathbb{Z}_F$, and nrd(q) is a reduced norm of a quaternion q.

2. The quantum circuit synthesizer system of claim 1, wherein the synthesis procedure further comprises determining a cost vector for the target unitary, and
wherein the determining the corresponding quaternion approximation comprises finding one or more corresponding quaternion approximations that satisfy the cost vector, wherein the cost vector describes a limit on a size of the single qubit gate set resulting from the synthesis procedure.

3. The quantum circuit synthesizer system of claim 1, wherein the distance function d is $$d = \sqrt{1 - |Tr(U_q^d R_z(\varphi))|/2}.$$

4. The quantum circuit synthesizer system of claim 1, wherein the single qubit gate set is a Clifford+$e^{i\pi Z/12}$ basis gate set, a Clifford+$e^{i\pi Z/16}$ basis gate set, a V-basis gate set, or any other single qubit base set expressible in terms of totally definite quaternion algebra.

5. The quantum circuit synthesizer system of claim 1, further comprising a quantum circuit controller coupled to the target quantum circuit architecture and configured to implement the quantum circuit in the target quantum circuit architecture.

6. A quantum circuit synthesizer system, comprising:
a processor; and
at least one memory coupled to the processor and having stored thereon processor-executable instructions for a quantum computer synthesis procedure that comprises:
receiving a target unitary described by a target angle and target precision;
determining a corresponding quaternion approximation of the target unitary; and
synthesizing a quantum circuit corresponding to the quaternion approximation, the circuit being over a single qubit gate set, the single qubit gate set being realizable by a target quantum computer architecture, wherein the determining the corresponding quaternion approximation of the target unitary comprises:

selecting a first algebraic integer for use as a first quaternion element in the quaternion approximation, the first algebraic integer being selected so that a distance threshold to a Rx, Ry, or Rz rotation is satisfied.

7. The quantum circuit synthesizer system of claim 6, wherein the determining the corresponding quaternion approximation of the target unitary further comprises:

selecting a second algebraic integer for use as a second quaternion element in the quaternion approximation, the second algebraic integer being selected so that, in combination with the first algebraic integer, the quaternion approximation produces a quaternion that satisfies a cost limit and the corresponding unitary satisfies the distance threshold.

8. A method, comprising:

by a quantum computer synthesis tool adapted for use in a quantum computer design and implementation process and implemented by one or more computing devices:

inputting a program describing a desired computation to be performed in a target quantum computer architecture;

generating a gate set adapted for implementation on the target quantum computer architecture based on the program, wherein the generating includes generating a single qubit circuit for one or more respective unitaries used to perform the desired computation, wherein the generating the single qubit circuit comprises:

identifying a target unitary, and determining a corresponding quaternion approximation of the target unitary using a process in which one or more of the elements in the corresponding quaternion approximation are randomly selected, wherein the determining the corresponding quaternion approximation of the target unitary comprises:

randomly selecting one or more values for use in the corresponding quaternion approximation from a constrained body of values that guarantees that a norm equation is solvable; and solving the norm equation to determine at least another one of the elements in the corresponding quaternion approximation.

9. The method of claim 8, wherein the at least another one of the elements in the corresponding quaternion approximation is z, where z is an algebraic integer from K and wherein the norm equation for Z is $Z(Z^*)=e_1$, where e is an element of the totally real subfield F.

10. A method, comprising:

by a quantum computer synthesis tool adapted for use in a quantum computer design and implementation process and implemented by one or more computing devices:

inputting a program describing a desired computation to be performed in a target quantum computer architecture;

generating a gate set adapted for implementation on the target quantum computer architecture based on the program, wherein the generating includes generating a single qubit circuit for one or more respective unitaries used to perform the desired computation, wherein the generating the single qubit circuit comprises:

identifying a target unitary, and determining a corresponding quaternion approximation of the target unitary using a process in which one or more of the elements in the corresponding quaternion approximation are randomly selected, wherein the determining the corresponding quaternion approximation of the target unitary comprises:

randomly sampling points from subsets of a ring of integers; and using the randomly selected sampling points as quaternion elements in the quaternion approximation.

11. A method, comprising:

by a quantum computer synthesis tool adapted for use in a quantum computer design and implementation process and implemented by one or more computing devices:

inputting a program describing a desired computation to be performed in a target quantum computer architecture;

generating a gate set adapted for implementation on the target quantum computer architecture based on the program, wherein the generating includes generating a single qubit circuit for one or more respective unitaries used to perform the desired computation, wherein the generating the single qubit circuit comprises:

identifying a target unitary, and determining a corresponding quaternion approximation of the target unitary using a process in which one or more of the elements in the corresponding quaternion approximation are randomly selected, wherein the determining the corresponding quaternion approximation of the target comprises:

partitioning a convex body of complex numbers into convex subsets, the partitioning being performed such that each subset has a lattice point corresponding to $\mathbb{Z}_K$;

randomly selecting one of the subsets;

selecting a lattice point corresponding to $\mathbb{Z}_K$ from the randomly selected subset; and using the selected lattice point as an element in the quaternion approximation.

12. One or more computer-readable memory or storage devices storing computer-executable instructions which when executed by a computer cause the computer to perform a quantum computer synthesis procedure comprising:

receiving a target unitary described by a target angle and target precision; determining a corresponding quaternion approximation of the target unitary; synthesizing the corresponding quaternion approximation to produce a single qubit circuit for the target unitary, the single qubit circuit being realizable by a quantum computer architecture, wherein the determining the corresponding quaternion approximation of the target unitary uses a Closest Vector Problem (CVP) technique to select values for the corresponding quaternion approximation.

13. The one or more computer-readable memory or storage devices of claim 12, wherein the determining the corresponding quaternion approximation of the target unitary comprises selecting values from a size-reduced basis as an element in the corresponding quaternion approximation.

* * * * *